US007480565B2

(12) United States Patent
Ikeuchi et al.

(10) Patent No.: US 7,480,565 B2
(45) Date of Patent: Jan. 20, 2009

(54) MAP INFORMATION PROCESSING DEVICE

(75) Inventors: Tomoya Ikeuchi, Tokyo (JP); Masaharu Umezu, Tokyo (JP); Makoto Mikuriya, Tokyo (JP); Mitsuo Shimotani, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 248 days.

(21) Appl. No.: 10/567,870

(22) PCT Filed: Apr. 13, 2005

(86) PCT No.: PCT/JP2005/007173

§ 371 (c)(1),
(2), (4) Date: Feb. 10, 2006

(87) PCT Pub. No.: WO2006/008859

PCT Pub. Date: Jan. 26, 2006

(65) Prior Publication Data

US 2006/0217879 A1 Sep. 28, 2006

(30) Foreign Application Priority Data

Jul. 16, 2004 (JP) ............................ 2004-210201
Jan. 21, 2005 (JP) ............................ 2005-014489

(51) Int. Cl.
*G01C 21/34* (2006.01)
(52) U.S. Cl. ............... 701/208; 340/995.19; 340/995.1; 340/995.18
(58) Field of Classification Search ................. 701/208, 701/209, 210; 370/474; 340/990, 995.19, 340/995.2, 995.1, 995.18; *G01C 21/34*
See application file for complete search history.

(56) References Cited

U.S. PATENT DOCUMENTS

| 5,911,773 | A | * | 6/1999 | Mutsuga et al. ............. 701/200 |
| 5,911,775 | A | * | 6/1999 | Tanimoto ..................... 701/210 |
| 6,173,232 | B1 | | 1/2001 | Nanba et al. |
| 6,202,024 | B1 | | 3/2001 | Yokoyama et al. |
| 6,263,276 | B1 | | 7/2001 | Yokoyama et al. |
| 6,282,492 | B1 | * | 8/2001 | Gorai et al. .................. 701/209 |
| 6,728,633 | B2 | * | 4/2004 | Mikuriya et al. ............. 701/208 |
| 7,403,852 | B2 | * | 7/2008 | Mikuriya et al. ............. 701/208 |

(Continued)

FOREIGN PATENT DOCUMENTS

JP 2-137096 A 5/1990

(Continued)

*Primary Examiner*—Tuan C To
(74) *Attorney, Agent, or Firm*—Birch, Stewart, Kolasch & Birch, LLP

(57) ABSTRACT

A map information processing apparatus includes an intersecting determining means (20) for determining intersection points where a new road detected by a new road detecting means (19) intersects either roads included in map information or roads previously detected by a new road detecting means, other than start and end points of the new road, a road update information generating means (21) for generating road update information including information for updating new road information and road information included in the map information based on new road information about the detected new road and intersection information indicating the intersection points determined by the intersecting determining means, and a road information updating means (24) for updating the road information included in the map information based on the road update information, and for writing the new road information into a new road information storage means (16*b*).

40 Claims, 55 Drawing Sheets

U.S. PATENT DOCUMENTS

| | | | |
|---|---|---|---|
| 2004/0066330 A1* | 4/2004 | Knockeart et al. | 342/357.07 |
| 2004/0104842 A1* | 6/2004 | Drury et al. | 342/357.13 |
| 2005/0049783 A1* | 3/2005 | Hunzinger | 701/208 |
| 2005/0102098 A1* | 5/2005 | Montealegre et al. | 701/209 |

FOREIGN PATENT DOCUMENTS

| | | |
|---|---|---|
| JP | 2-168111 A | 6/1990 |
| JP | 5-10775 A | 1/1993 |
| JP | 6-887732 A | 3/1994 |
| JP | 6-180747 A | 6/1994 |
| JP | 6-273186 A | 9/1994 |
| JP | 7-83692 A | 3/1995 |
| JP | 9-222851 A | 8/1997 |
| JP | 9-287968 A | 11/1997 |
| JP | 10-19589 A | 1/1998 |
| JP | 10-141968 A | 5/1998 |
| JP | 10-197269 A | 7/1998 |
| JP | 10-253373 A | 9/1998 |
| JP | 11-23299 A | 1/1999 |
| JP | 11-339182 A | 12/1999 |
| JP | 2000-310544 A | 11/2000 |
| JP | 2001-56230 A | 2/2001 |
| JP | 2001-84491 A | 3/2001 |
| JP | 2001-124575 A | 5/2001 |
| JP | 2001-289653 A | 10/2001 |
| JP | 2001-304885 A | 10/2001 |
| JP | 2002-98535 A | 4/2002 |
| JP | 2002-148054 A | 5/2002 |
| JP | 2002-174528 A | 6/2002 |
| JP | 2002-243469 A | 8/2002 |
| JP | 2003-194558 A | 7/2003 |
| JP | 2003-337027 A | 11/2003 |

* cited by examiner

FIG.9

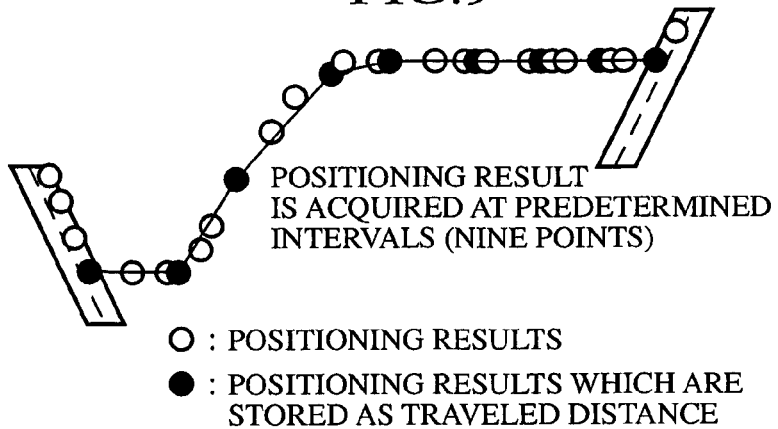

POSITIONING RESULT IS ACQUIRED AT PREDETERMINED INTERVALS (NINE POINTS)

○ : POSITIONING RESULTS
● : POSITIONING RESULTS WHICH ARE STORED AS TRAVELED DISTANCE

FIG.10

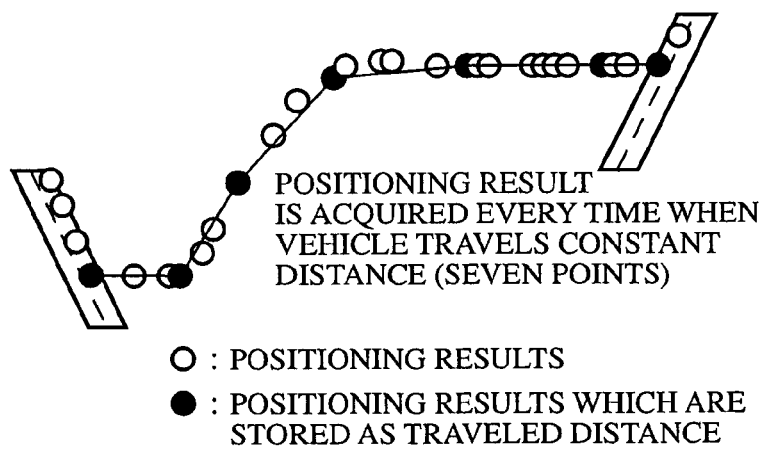

POSITIONING RESULT IS ACQUIRED EVERY TIME WHEN VEHICLE TRAVELS CONSTANT DISTANCE (SEVEN POINTS)

○ : POSITIONING RESULTS
● : POSITIONING RESULTS WHICH ARE STORED AS TRAVELED DISTANCE

FIG.11

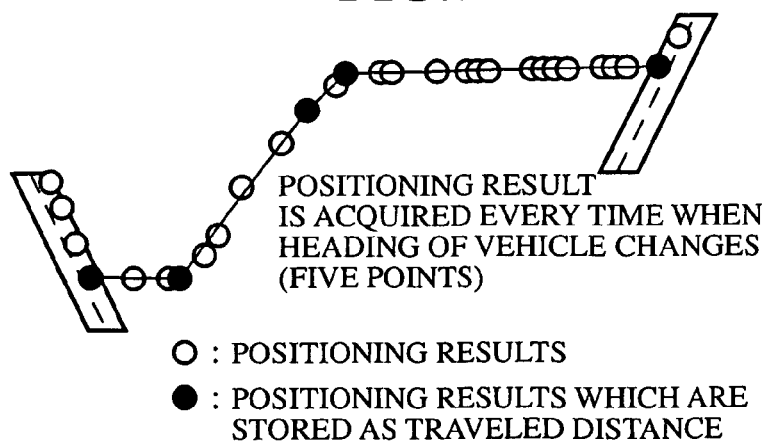

POSITIONING RESULT IS ACQUIRED EVERY TIME WHEN HEADING OF VEHICLE CHANGES (FIVE POINTS)

○ : POSITIONING RESULTS
● : POSITIONING RESULTS WHICH ARE STORED AS TRAVELED DISTANCE

MAP INFORMATION PROCESSING DEVICE

FIELD OF THE INVENTION

The present invention relates to a map information processing apparatus. More particularly, it relates to a technology for detecting a new road and incorporating the new road into map information.

BACKGROUND OF THE INVENTION

Conventionally, a navigation apparatus which is mounted in a vehicle is known. In such a navigation apparatus, a map information processing apparatus displays a map on a display based on map information prestored therein. The driver can certainly arrive at the destination in a short time without getting lost since he or she can drive the vehicle while checking the current position of the vehicle by seeing the map displayed on the display.

By the way, such a navigation apparatus which detects a new road from a travel history when a vehicle in which the navigation apparatus is mounted has traveled a road which does not exist in map information stored therein, and which adds the new road to the map information stored therein is known (for example, refer to patent reference 1). When detecting a new road which is not included in the map information based on a route traveled by the vehicle, this navigation apparatus generates update information including a traveled path corresponding to the new road, adds it to the existing road information, and also links the start and end points of the detected new road to the existing map information.

Patent reference 1: JP,2002-243469,A

However, while the technology disclosed by above-mentioned patent reference 1 makes it possible to link the start and end points of a newly-detected road to existing roads, it cannot handle intersections at which the newly-detected road crosses existing roads, other than the start and end points, and hence cannot update the map information so that the map information includes information about intersections at which the newly-detected road crosses existing roads, other than the start and end points of the newly-detected road. Therefore, a problem with the related art technology is that route searching and route guidance which conform to actual road configurations cannot be carried out.

The present invention is made in order to solve the above-mentioned problem, and it is therefore an object of the present invention to provide a map information processing apparatus that can carry out route searching and route guidance which conform to actual road configurations.

DISCLOSURE OF THE INVENTION

A map information processing apparatus in accordance with the present invention includes: a position detecting means for detecting a position of the map information processing apparatus itself; a map information storage means for storing map information including road information; a map information acquiring means for acquiring the map information from said map information storage means; a new road detecting means for determining whether or not a road corresponding to the position of the map information processing apparatus detected by said position detecting means is a new road which does not exist in the road information included in the map information acquired by said map information acquiring means; a new road information storage means for storing new road information; an intersecting judging means for identifying intersection points where the new road detected by said new road detecting means intersects either roads included in the map information acquired by said map information acquiring means or roads previously detected by said new road detecting means, other than start and end points of the new road; a road update information generating means for generating new road information indicating the new road detected by said new road detecting means, and for generating road update information including information for updating said new road information stored in said new road information storage means and the road information included in the map information stored in said map information storage means; and a road information updating means for updating the road information included in the map information stored in said map information storage means, and road information included in the new road information stored in said new road information storage means based on the road update information generated by said road update information generating means, and for writing the new road information into said new road information storage means.

Since the map information processing apparatus in accordance with the present invention can use information about intersections where a newly-detected road intersects existing roads, other than the start and end points of the newly-detected road, the map information processing apparatus can carry out route searching and route guidance which conform to actual road configurations.

BRIEF DESCRIPTION OF THE FIGURES

FIG. 9 is a diagram for explaining a process of acquiring time series data showing a traveled path at fixed intervals by the map information processing apparatus in accordance with embodiment 1 of the present invention;

FIG. 10 is a diagram for explaining a process of acquiring time series data showing a traveled path every time when a vehicle travels a certain distance by the map information processing apparatus in accordance with embodiment 1 of the present invention;

FIG. 11 is a diagram for explaining a process of acquiring time series data showing a traveled path every time when the vehicle changes its heading by the map information processing apparatus in accordance with embodiment 1 of the present invention;

FIG. 29 is a flow chart showing a start process at a time when the map information processing apparatus in accordance with embodiment 8 of the present invention is powered on;

PREFERRED EMBODIMENTS OF THE INVENTION

Figure 1:
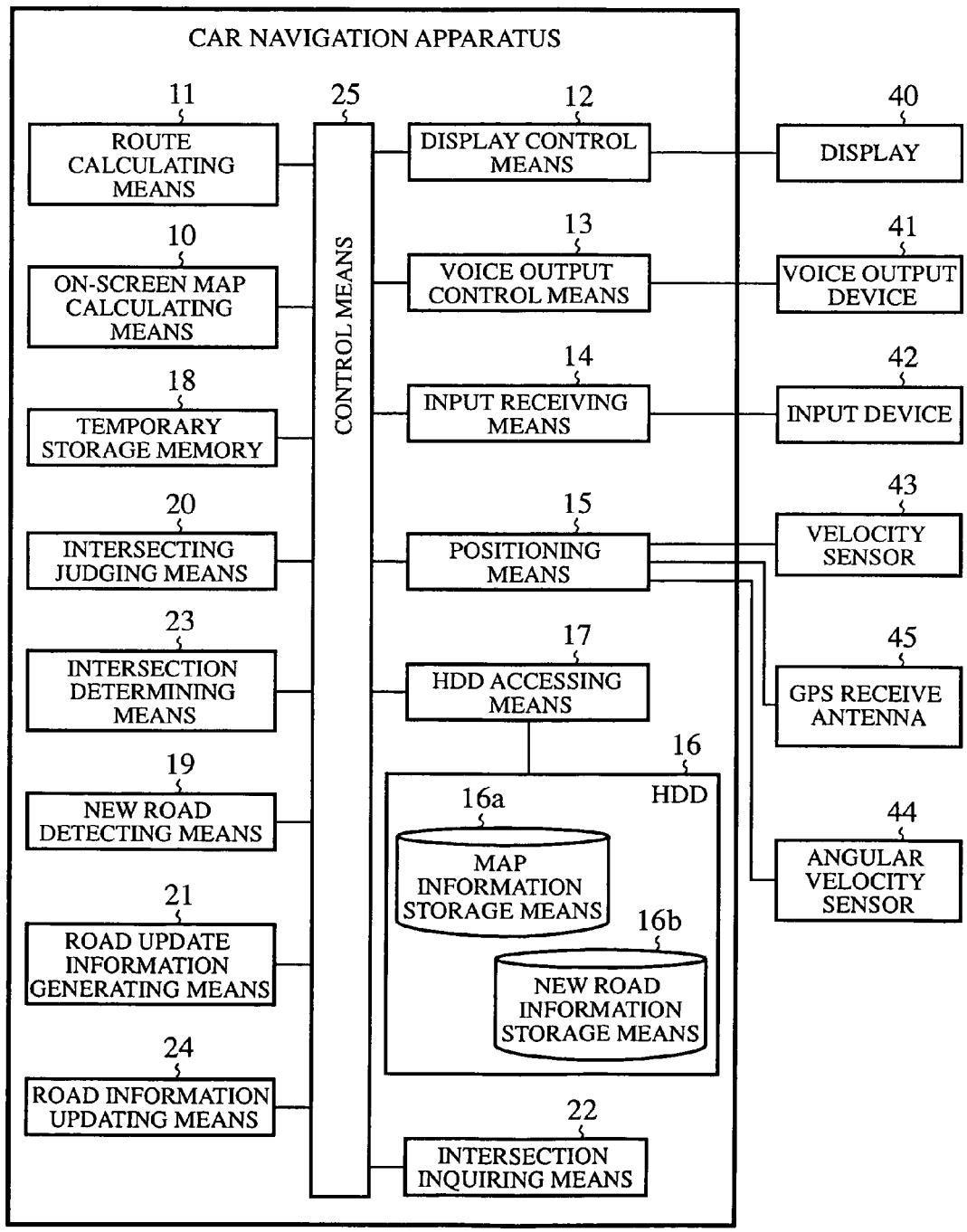
FIG. 1 is a block diagram showing the structure of a map information processing apparatus in accordance with embodiment 1 of the present invention.

Hereafter, in order to explain this invention in greater detail, the preferred embodiments of the present invention will be described with reference to the accompanying drawings. The same components or like components are designated by the same reference numerals throughout the following embodiments.

Embodiment 1

FIG. 1 is a block diagram showing the structure of a map information processing apparatus in accordance with embodiment 1 of the present invention. This map information processing apparatus is provided with a car navigation apparatus, and a display 40, a voice output device 41, an input device 42, a velocity sensor 43, an angular velocity sensor 44, and a GPS (Global Positioning System) receive antenna 45 which are connected to the car navigation apparatus.

The car navigation apparatus is provided with an on-screen map calculating means 10, a route calculating means 11, a display control means 12, a voice output control means 13, an input receiving means 14, a positioning means 15, an HDD (Hard Disk Drive) 16, an HDD accessing means 17, a temporary storage memory 18, a new road detecting means 19, an intersecting judging means 20, a road update information generating means 21, an intersection inquiring means 22, an intersection determining means 23, a road information updating means 24, and a control means 25.

The on-screen map calculating means 10 calculates a map image for display from map information and new road information. The route calculating means 11 calculates a recommended route between two arbitrary points. The display control means 12 converts both the map image for display calculated by the on-screen map calculating means 10 and the recommended route calculated by the route calculating means 11 into an image having a form which can be displayed on the display 40, and sends it to the display 40. The voice output control means 13 converts both voice information which is to be provided to a driver for guidance to a destination according to the recommended route calculated by the route calculating means 11, and voice information which is to be provided to the driver in order to inform the driver of information included in the map information into voice information having a form which can be handled by the voice output device 41, and sends it to the voice output device 41. The input receiving means 14 receives an input signal from the external input device 42.

The positioning means 15 corresponds to a position detecting means of the present invention. This positioning means 15 determines the current position of the map information processing apparatus itself (the map information processing apparatus itself means a vehicle in which the map information processing apparatus is mounted, and the same goes for other embodiments) based on signals from the velocity sensor 43, angular velocity sensor 44, and GPS receive antenna 45, compares the determined current position of the vehicle with the road information stored in the HDD 16, and determines which location of which road expressed by the road information corresponds to the current position of the vehicle. The positioning means 15 then sends the positioning result to both the display map calculating means 10 and the route calculation means 11 when the on-screen map calculating means 10 carries out calculations in order to display a map of an area including the current position of the vehicle, and when the route calculation means 11 calculates a recommended route extending from the current position of the vehicle to an input point.

The HDD 16 corresponds to a map information storage means and a new road information storage means of the present invention. This HDD 16 is provided with a map information storage means 16*a* for storing the map information, and a new road information storage means 16*b* for storing the new road information. The map information storage means 16*a* stores the map information including the road information when the map information processing apparatus is shipped. The map information is generated in units of areas in the form of meshes, which are separated by both lines parallel to the latitude lines and lines parallel to the longitude lines. These areas are called "meshes."

When the vehicle has traveled a road which does not exist in original map information which was stored when the map information processing apparatus was shipped, new road information indicating the road is added to the new road information storage means 16*b*. The new road information is also generated and stored in units of areas in the form of meshes, like the map information. The HDD accessing means 17 carries out control operations for accessing the HDD 16. The temporary storage memory 18 consists of a volatile memory, for example, and is used in order to store various kinds of information temporarily.

The new road detecting means 19 detects a new road which does not exist in the map information. The details of this new road detecting means 19 will be mentioned below. The intersecting judging means 20 judges whether or not the detected new road intersects one or more existing roads. The details of this intersecting judging means 20 will be mentioned below. The road update information generating means 21 generates road update information for updating the map information. The details of this road update information generating means 21 will be mentioned below.

The intersection inquiring means 22 inquires of the user whether a point which is generated, as a temporary intersection (will be mentioned below in detail), by the road update information generating means 21 is a normal grade crossing or a crossing with an overpass or underpass. The details of this intersection inquiring means 22 will be mentioned below. When the recommended route calculated by the route calculating means 11 contains a right or left turn at the temporary intersection, the intersection determining means 23 generates a screen display for the inquiry to provide it for the user, and allows the user to input the configuration of the temporary intersection selectively. The details of this intersection determining means 23 will be mentioned below.

The road information updating means 24 updates the map information and new road information stored in the HDD 16 based on the road update information generated by the road update information generating means 21. The details of this road information update means 24 will be mentioned below. The control means 25 controls the on-screen map calculating means 10, route calculating means 11, display control means 12, voice output control means 13, input receiving means 14, positioning means 15, and HDD accessing means 17 according to a procedure which is programmed beforehand.

When carrying out processing using road information about a road (referred to as "an existing road" from here on) included in the map information or new road information stored in the HDD 16, each of the on-screen map calculating means 10, route calculating means 11, voice output control means 13, and positioning means 15 reads map information and new road information about a map area corresponding to a mesh which is to be used in the processing from the HDD 16 by using the HDD accessing means 17, and uses the read information after storing it in the temporary storage memory 18.

The display 40 connected to the car navigation apparatus displays an image based on both a map image for display and information about the recommended route which are sent thereto from the display control means 12. The voice output device 41 outputs both voice data which is used for guidance to the destination according to the recommended route and information included in the map information via voice. The input device 42 inputs a map area which is to be displayed on the display 40, and the start and endpoints which are to be used to calculate the recommended route. The input device 42 can consist of input buttons installed in a main panel which is arranged on a front face of the car navigation apparatus, a remote controller for sending out input signals which are the same as those generated by the input buttons, a touch panel disposed on the screen of the display 40, or a microphone for voice input with which the user can operate the car navigation apparatus by voice. As an alternative, the input device 42 can consist of a combination of two or more of these components.

The velocity sensor 43 corresponds to a velocity detecting means of the present invention, and detects the velocity of the vehicle. The velocity of the vehicle which is detected by this velocity sensor 43 is sent to the positioning means 15. The angular velocity sensor 44 detects a change in the heading of the vehicle. The change in the heading of the vehicle which is detected by the angular velocity sensor 44 is sent to the positioning means 15. The GPS receive antenna 45 receives electric waves sent from the GPS satellites. GPS signals acquired by receiving the electric waves with this GPS receive antenna 45 are sent to the positioning means 15.

Next, the operation of the map information processing apparatus in accordance with embodiment 1 of the present invention which is constructed as mentioned above will be explained.

A process of generating and adding road information which is not yet stored, as new road information or map information, in the HDD 16 to the new road information stored in the HDD 16 by using the new road detecting means 19, intersecting judging means 20, road update information generating means 21, and road information updating means 24 will be explained.

Figure 2:
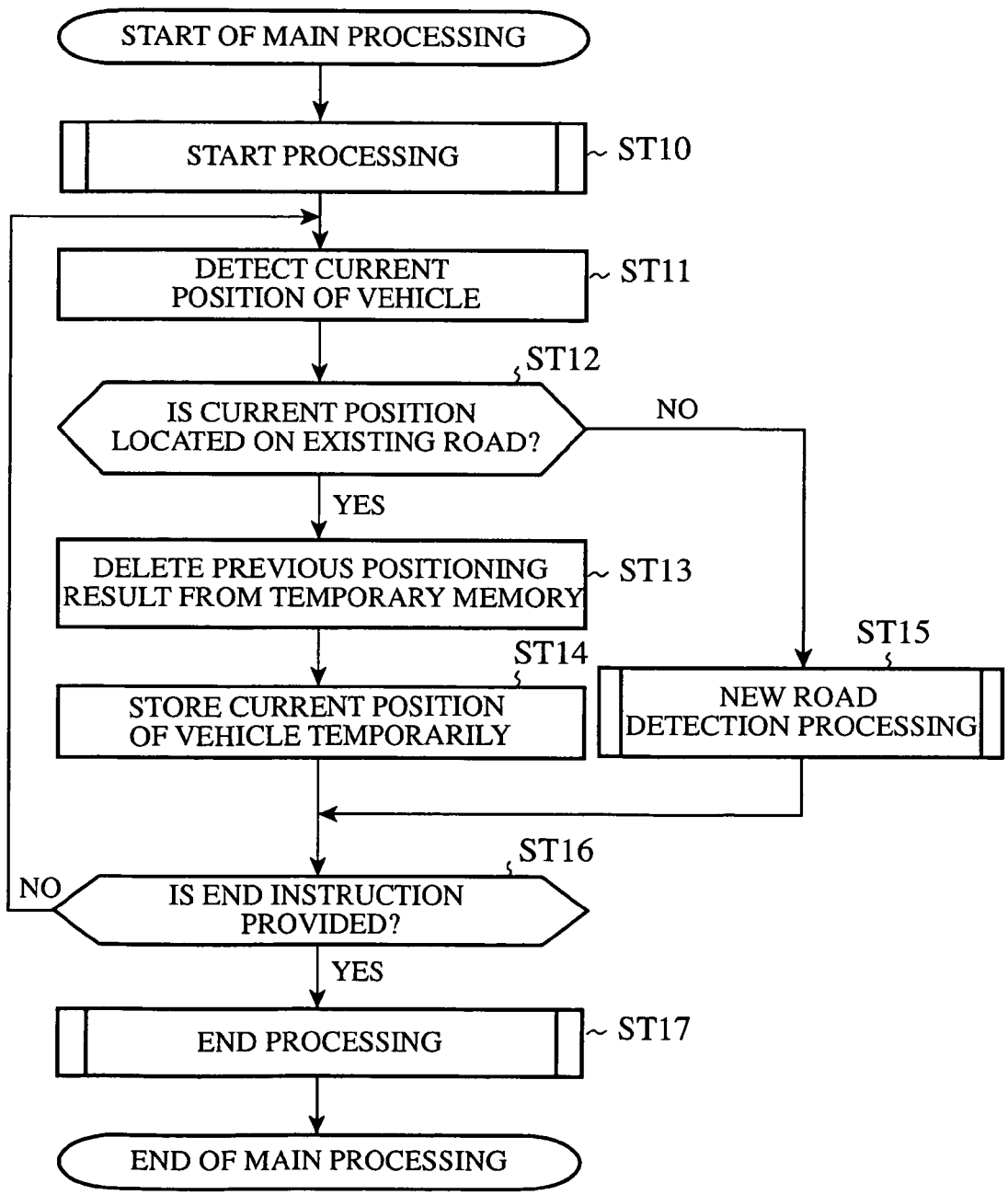
FIG. 2 is a flow chart showing main processing for positioning which is carried out by the map information processing apparatus in accordance with embodiment 1 of the present invention.

FIG. 2 is a flow chart showing main processing for positioning which is carried out by the map information processing apparatus. In this main processing, a start process is carried out first (in step ST10). In this start process, an initialization process of restoring the map information processing apparatus to its previous state in which it was ended the last time is carried out. After this start process is completed, the positioning means 15 detects the current position of the vehicle (in step ST11). The positioning means 15 then checks to see whether or not the current position of the vehicle detected in this step ST11 is located on an existing road (in step ST12). When the positioning means determines that the current position of the vehicle is not located on any existing road, the new road detecting means carries out new road detecting processing (in step ST15). This new road detecting processing will be mentioned below. After that, the control means advances the sequence to step ST16.

When the positioning means, in above-mentioned step ST12, determines that the current position of the vehicle is located on an existing road, the previous positioning result is deleted from the temporary storage memory 18 (in step ST13). The current position of the vehicle obtained through the newest positioning processing is then stored in the temporary storage memory 18 (in step ST14). The control means checks to see whether or not an instruction for ending the main processing is provided (in step ST16). When determining that the instruction for ending the main processing is not provided, the control means returns the sequence to step ST11 and repeats the above-mentioned processes. On the other hand, when, in step ST16, determining that the instruction for ending the main processing is provided, the control means carries out an end process (in step ST17). As a result, the main processing for positioning by the map information processing apparatus is ended.

Figure 3:
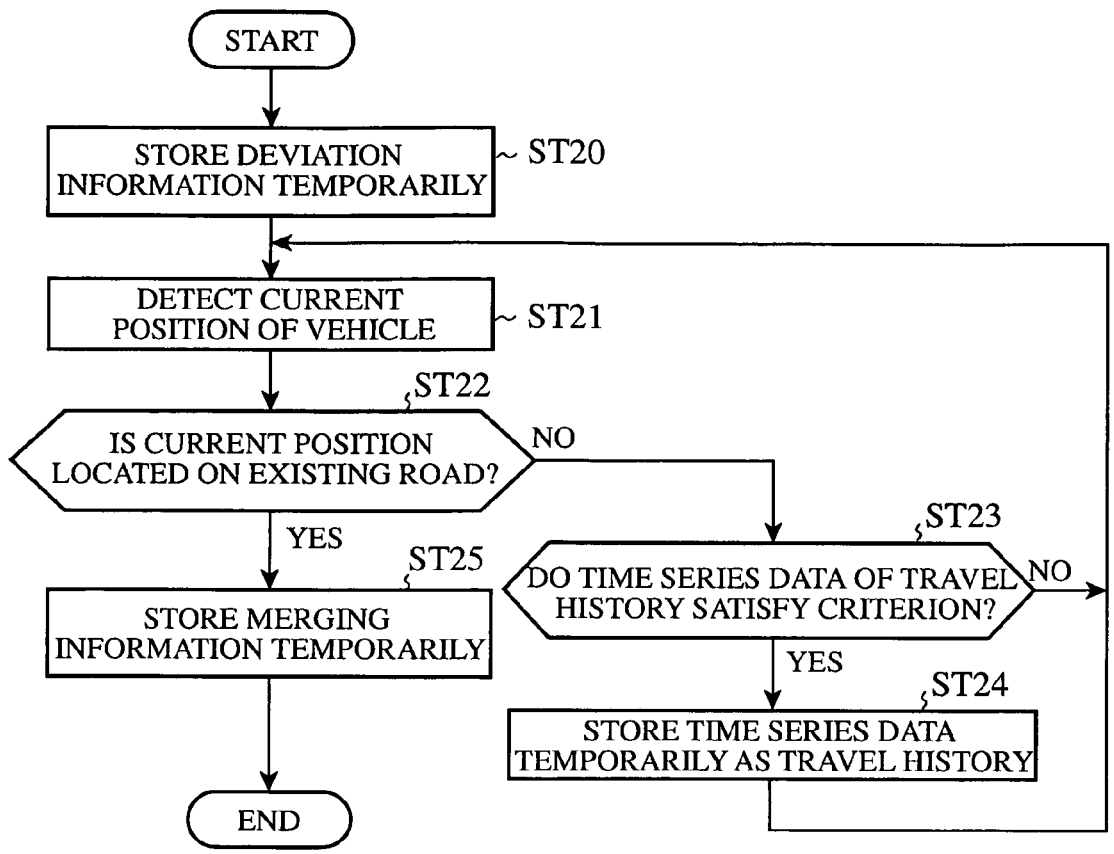
FIG. 3 is a flow chart showing details of new road detecting processing carried out in step ST15 of FIG. 2.

Next, the details of the new road detecting processing which is carried out by the new road detecting means 19 in step ST15 of FIG. 2 will be explained with reference to a flow chart of FIG. 3.

In the new road detecting processing, deviation information is stored temporarily in the temporary storage memory 18 first (in step ST20). When the vehicle deviates from any existing road, deviation information consisting of information indicating the existing road and the position of the vehicle at the time when the vehicle deviates from the existing road is generated (the deviation information will be mentioned below in detail). The positioning means 15 then detects the current position of the vehicle (in step ST21). The positioning means 15 further checks to see whether the current position of the vehicle detected in step ST21 is located on an existing road (in step ST22).

When the positioning means, in this step ST22, determines that the current position of the vehicle is not located on any existing road, the new road detecting means recognizes that the vehicle is traveling a new road. The new road detecting means then checks to see whether the current position of the vehicle satisfies a criterion of travel history time-series data (in step ST23). The criterion of travel history time-series data is a criterion by which to judge whether the current position of the vehicle obtained by the positioning means 15 has to be stored as a travel history (the details of the criterion will be mentioned below).

When, in above-mentioned step ST23, determining that the current position of the vehicle satisfies the criterion of travel history time-series data, the new road detecting means temporarily stores the current position of the vehicle, as a travel history, in the temporary storage memory 18 (in step ST24). After that, the new road detecting means returns the sequence to step ST21. On the other hand, when, in above-mentioned step ST23, determining that the current position of the vehicle does not satisfy the criterion of travel history time-series data, the new road detecting means returns the sequence to step ST21 without temporarily storing the current position of the vehicle, as a travel history, in the temporary storage memory 18. After that, the new road detecting means repeatedly carries out the processes of steps ST22 to ST24.

When, in step ST22, determining that the current position of the vehicle exists on an existing road while repeatedly carrying out the processes of above-mentioned steps ST22 to ST24, the new road detecting means recognizes that the new road which the vehicle was traveling has merged with the existing road, and temporarily stores merging information in the temporary storage memory 18 (in step ST25). The merging information consists of information indicating the existing road and the position of the vehicle at the time when the vehicle entered the existing road from the new road. After carrying out the above-mentioned processes, the new road detecting means ends the new road detecting processing.

Figure 4:
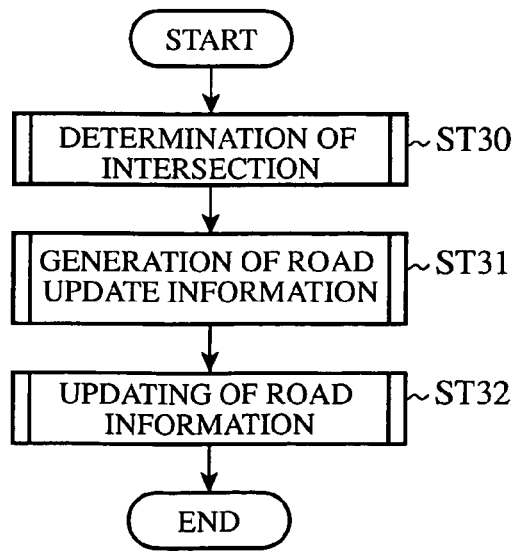
FIG. 4 is a flowchart showing processing which is carried out after the new road detecting processing is carried out in step ST15 of FIG. 2.

After the above-mentioned new road detecting processing is completed, the map information processing apparatus sequentially carries out intersecting judging processing (in step ST30), road update information generation processing (in step ST31), and road information update processing (in step ST32), as shown in a flow chart of FIG. 4. Hereafter, these processings will be explained in detail.

First, the intersecting judging processing which is carried out by the intersecting judging means 20 in step ST30 of FIG. 4 will be explained with reference to a flow chart shown in FIG. 5.

After starting the intersecting judging processing, the intersecting judging means divides the detected new road into two or more segments first (in step ST40). The intersecting judging means then checks to see whether or not the intersection identification is completed for all the segments into which the new road is divided (in step ST41). When determining that the intersection identification is completed for all the segments into which the new road is divided, the intersecting judging means ends the intersecting judging processing. When, in above-mentioned step ST41, determining that the intersection identification is not completed for all the segments into which the new road is divided, the intersecting judging means selects one segment from segments on which the intersection identification has not been performed yet (in step ST42). The intersecting judging means then extracts existing roads in the vicinity of the selected segment from both map information and new road information which correspond to a mesh in which the new road is contained (in step ST43). The intersecting judging means further checks to see whether or not a process of judging whether the selected segment intersects each of all the extracted existing roads in the vicinity of the segment is completed (in step ST44). When determining that the intersection identification is completed for all the extracted existing roads, the intersecting judging means returns the sequence to step ST41 in which it determines if there is another segment on which the intersection identification has not been performed yet again.

When determining that the intersection identification is not completed for all the extracted existing roads in above-mentioned step ST44, the intersecting judging means selects a road from all extracted existing roads in the vicinity of the new road on which the intersection identification has not been performed yet (in step ST45). The intersecting judging means then calculates a positional relationship between the selected segment and the selected neighboring road (in step ST46). The intersecting judging means checks to see whether the selected segment and selected neighboring road intersect based on the calculation result obtained in step ST46 (in step ST47). When determining that the selected segment and selected neighboring road do not intersect, the intersecting judging means returns the sequence to step ST44 in which it determines if there is another neighboring road on which the intersection identification has not been performed yet again.

When, in above-mentioned step ST47, determining that the selected segment and selected neighboring road intersect, the intersecting judging means temporarily stores the coordinates of the intersection and information specifying the neighboring road, as intersection information, in the temporary storage memory 18 (in step ST48). After that, the intersecting judging means returns the sequence to step ST41 in which it repeats the above-mentioned processes. When then completing the above-mentioned intersection identification for all the segments, the intersecting judging means ends the intersecting judging processing.

Figure 6:
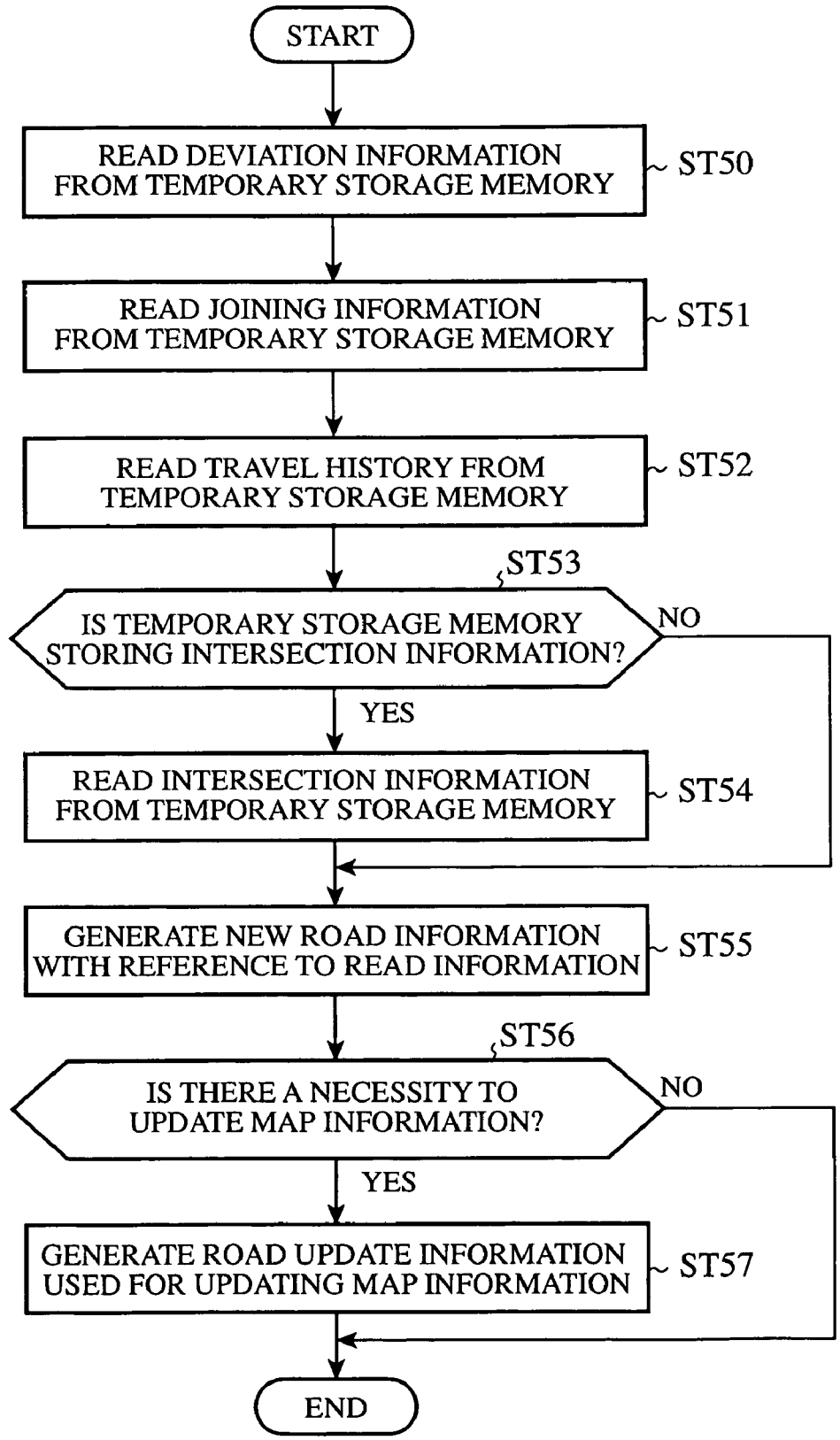
FIG. 6 is a flow chart showing a process of setting the configuration of a temporary intersection which is carried out by a map information processing apparatus in accordance with embodiment 24 of the present invention.

Next, road update information generation processing which is carried out by the road update information generating means 21 in step ST31 of FIG. 4 will be explained with reference to a flow chart shown in FIG. 6.

In the road update information generation processing, the road update information generating means reads the deviation information from the temporary storage memory 18 first (in step ST50). The road update information generating means then reads the merging information from the temporary storage memory 18 (in step ST51). The road update information generating means further reads the travel history from the temporary storage memory 18 (in step ST52). The road update information generating means then checks to see whether or not intersection information is stored in the temporary storage memory 18 (in step ST53). When determining that intersection information is stored, the road update information generating means reads the intersection information from the temporary storage memory 18 (in step ST54). On the other hand, when determining that no intersection information is stored in the temporary storage memory, the road update information generating means skips the process of step ST54.

The road update information generating means then generates new road information based on the deviation information, merging information, travel history, and intersection information which are read in steps ST50 to ST54 (in step ST55). The road update information generating means then checks to see whether or not there is a necessity to update the map information (in step ST56). When determining that there is a necessity to update the map information, the road update information generating means generates road update information for updating the map information based on the intersection information (in step ST57). On the other hand, when, in step ST56, determining that there is no necessity to update the map information, the road update information generating means skips the process of step ST57. The road update information generating means then ends the road update information generation processing.

Figure 7:
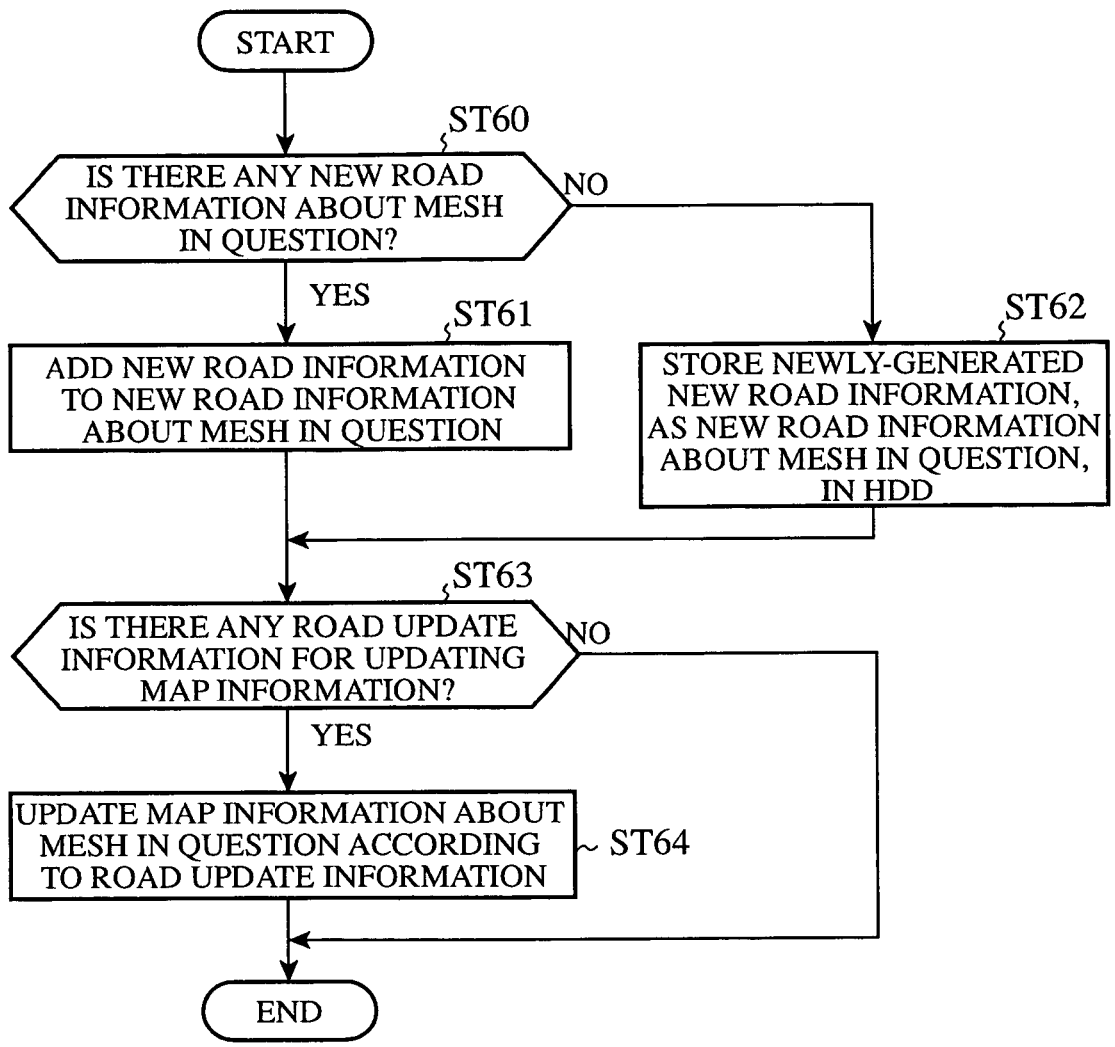
FIG. 7 is a flow chart showing the details of road information update processing shown in FIG. 4.

Next, road information update processing which is carried out by the road information updating means 24 in step ST32 of FIG. 4 will be explained with reference to a flow chart shown in FIG. 7.

In the road information update processing, the road information updating means checks to see whether new road information corresponding to a mesh in which the detected new road is located exists in the HDD 16 first (in step ST60). When determining that new road information corresponding to the mesh exists in the HDD, the road information updating means adds newly-generated new road information to the new road information about the mesh which exists in the HDD 16 (in step ST61). On the other hand, when determining that no new road information which corresponding to the mesh exists in the HDD, the road information updating means stores the newly-generated new road information, as new road information about the mesh, in the HDD (in step ST62).

The road information updating means then checks to see whether or not road update information for modifying the map information corresponding to the mesh, which is stored in the HDD 16, has been generated (in step ST63). When determining that road update information for modifying the map information corresponding to the mesh has been generated, the road information updating means updates the map information according to the road update information (in step ST64). On the other hand, when determining that no road update information for modifying the map information corresponding to the mesh has been generated, the road information updating means skips the process of step ST64. The road information updating means then ends the road information update processing.

Figure 8:
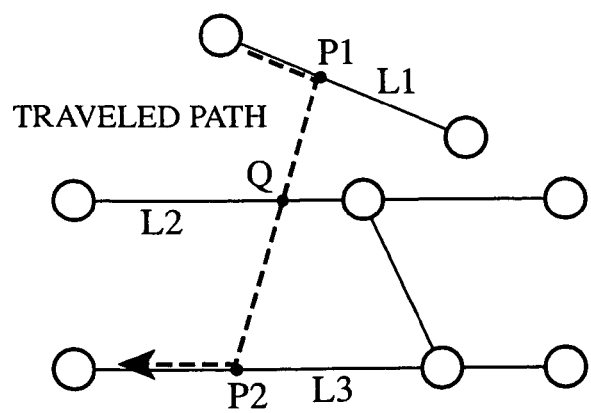
FIG. 8 is a diagram for explaining a process of detecting, generating, and adding a new road of the map information processing apparatus in accordance with embodiment 1 of the present invention.

Next, the detection, generation, and addition of a new road will be explained using a concrete example of travel of the vehicle. FIG. 8 shows a part of road information which consists of existing roads included in a certain mesh. In the figure, each road is expressed by nodes (round marks) each showing an intersection, and a link (i.e., a segment between two round marks) showing a road between two intersections. What is expressed by connections of roads using such nodes and links is called a road network. Assuming that the vehicle deviates from a link L1 at a point P1 while traveling the link L1, crosses a link L2 at a point Q, and enters a link L3 at a point P2, as shown by a dotted line in the road network of FIG. 8, a process of adding a new road which is not contained in existing roads will be explained.

While the vehicle is traveling the link L1, the positioning means 15 calculates the current position of the vehicle based on signals from the velocity sensor 43, angular velocity sensor 44, and GPS receive antenna 45, refers to the road information included in the map information stored in the HDD 16, and then recognizes that the vehicle is traveling the link L1. The positioning means 15 continuously obtains and stores the newest positioning result in the temporary storage memory 18. The previous positioning result is deleted every time when the newest positioning result is stored in the temporary storage memory. When the vehicle in which the map information processing apparatus is mounted deviates from the link L1 at the point P1, the map information processing apparatus detects that the vehicle has deviated from the link 1 based on the positioning result obtained by the positioning means 15, and stores information about the link which the vehicle traveled before deviating from the link and the point at which the vehicle has deviated from the link in the temporary storage memory 18 as deviation information. In the example shown in FIG. 8, the map information processing apparatus stores the link L1 and the point P2 in the temporary storage memory 18.

Next, the processing carried out by the new road detecting means 19 (i.e., the new road detecting processing in FIG. 2) will be explained.

After detecting that the vehicle has deviated from an existing road, the new road detecting means 19 stores a path which the vehicle has traveled until the vehicle enters an existing road again, i.e., until the new road detecting means detects that the vehicle has entered another existing road in the temporary storage memory 18. In the example shown in FIG. 8, the new road detecting means stores a traveled path extending from the point P1 to the point P2 in the temporary storage memory 18. The traveled path consists of time-series data about the position of the vehicle obtained by the positioning means 15, for example. As the easiest method of acquiring such time-series data, a method of acquiring position data once every fixed time period can be provided. Typically, the positioning means 15 measures the current position of the vehicle at predetermined intervals. Therefore, as a method of acquiring the position of the vehicle once every fixed time period, a method of storing the positioning result in the temporary storage memory 18 once every n times (n is 1 or a larger integer) that the positioning is performed can be used. FIG. 9 shows an example in which the positioning result is stored in the temporary storage memory once every three times, and the positioning results about nine points are stored as a travel history.

When using the above-mentioned method, the number of acquired data increases and therefore there is a possibility that the temporary storage memory 18 is wasted. Then, it is possible to reduce the number of acquired data by additionally providing a requirement to store the positioning result data in the temporary storage memory 18 every time when the vehicle travels a constant distance, as a requirement of acquisition of time-series data for travel history. FIG. 10 shows an example in which the positioning result is stored in the temporary storage memory every time when the vehicle travels a constant distance, and the positioning results about seven points are stored as a travel history.

It is possible to further reduce the number of acquired data and to further suppress the waste of the temporary storage memory 18 by alternatively providing a requirement to store the positioning result data in the temporary storage memory 18 every time when the heading of the vehicle changes and the change in the heading exceeds a threshold, as a requirement of acquisition of time-series data for travel history. FIG. 11 shows an example in which the positioning result is stored in the temporary storage memory every time when the heading of the vehicle changes and the change in the heading exceeds a threshold, and the positioning results about five points are stored as a travel history. The change in the heading of the vehicle can be detected by using detection results obtained by the angular velocity sensor 44. As an alternative, the change in the heading of the vehicle can be detected by using the angle which a first segment connecting the before-last positioning result and the last positioning result forms with a second segment connecting the last positioning result and the newest positioning result.

The new road detecting means 19 stores information about the link with which the new road merges and the merging point at which the new road merges with the link in the temporary storage memory 18 as merging information. In the example shown in FIG. 8, the link L3 and the point P2 are stored in the temporary storage memory 18. When the new road detecting means 19 completes the above-mentioned processing, the intersecting judging means 20 judges whether the new road intersects existing roads at points other than the deviating point from which the vehicle has deviated and entered the new road detected by the new road detecting means 19, and the merging point at which the new road merges with the link. The intersecting judging means 20 judges whether the new road intersects existing roads at points other than the deviating and merging points by dividing the time-series data about the position information, which are stored in the temporary storage memory 18 as the travel history of the new road, into two or more segments, and by searching for existing roads which intersect each segment in two dimensions.

The simplest is to divide the travel history into two or more segments using all the time-series data. However, the calculation time required for judging whether the new road intersects existing roads at points other than the deviating and merging points increases proportionately with increase in the number of time-series data. In order to solve this problem, the travel history is divided into two or more segments while the number of time-series data is thinned out. It also becomes possible to complete the intersecting judging processing in a realistic time by limiting existing roads which are a target for searching in the intersecting judging processing to existing roads contained in the mesh in question.

When detecting an intersection point where the new road detected by the new road detecting means 19 intersects an existing road, the intersecting judging means 20 stores the fact that the point is an intersection in the temporary storage memory 18. In the example shown in FIG. 8, the intersecting judging means 20 stores the fact that the new road extending from the point P1 to the point P2 intersects the link L2 at the point Q in the temporary storage memory 18.

The road update information generating means 21 then converts the information about the new road stored in the temporary storage memory 18 into a form which can be stored, as new road information, in the HDD 16.

Figure 12:
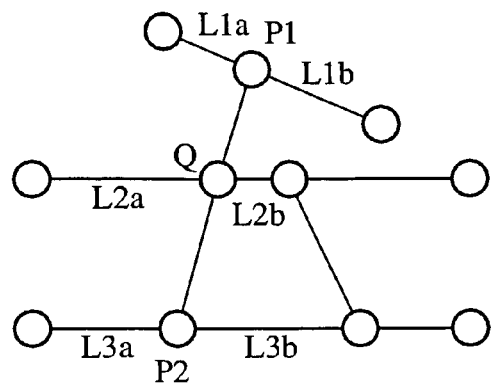
FIG. 12 is a diagram for explaining a road network into which a new road has been added in the map information processing apparatus in accordance with embodiment 1 of the present invention.

FIG. 12 shows a road network in which the new road extending from the point P1 to the point P2 via the point Q is added to the road network shown in FIG. 8. As can be seen from FIG. 12, when the new road is added to the example shown in FIG. 8, the links L1, L2, and L3 each of which is a single link are divided into two links L1a and L1b, L2a and L2b, and L3a and L3b at the points P1, Q, and P2, respectively.

The road update information generating means 21 thus generates a node at each point which can be an intersection where the new road intersects a link of an existing road, and also generates information used for dividing the link into segments at the node. The information generated by the road update information generating means 21 is referred to as "road update information."

At this time, the road update information generating means 21 defines nodes corresponding to points, other than the start and end points of the new road, where the new road intersects links of existing roads, respectively, as temporary intersections, to generate road update information. In the road information included in the map information stored in the map information storage means 16a of the HDD 16, and the new road information stored in the new road information storage means 16b, one bit is assigned to a temporary intersection flag indicating whether or not the corresponding node is a temporary intersection in a field expressing each node.

In the example shown in FIGS. 8 and 12, the road update information generating means 21 generates road update information in which the temporary intersection flag of the node corresponding to the point Q included in the generated new road information is set to ON and the temporary intersection flag of the node corresponding to the point Q at which the link L2 of an existing road is divided into the two links L2a and L2b is set to ON.

Figure 13:
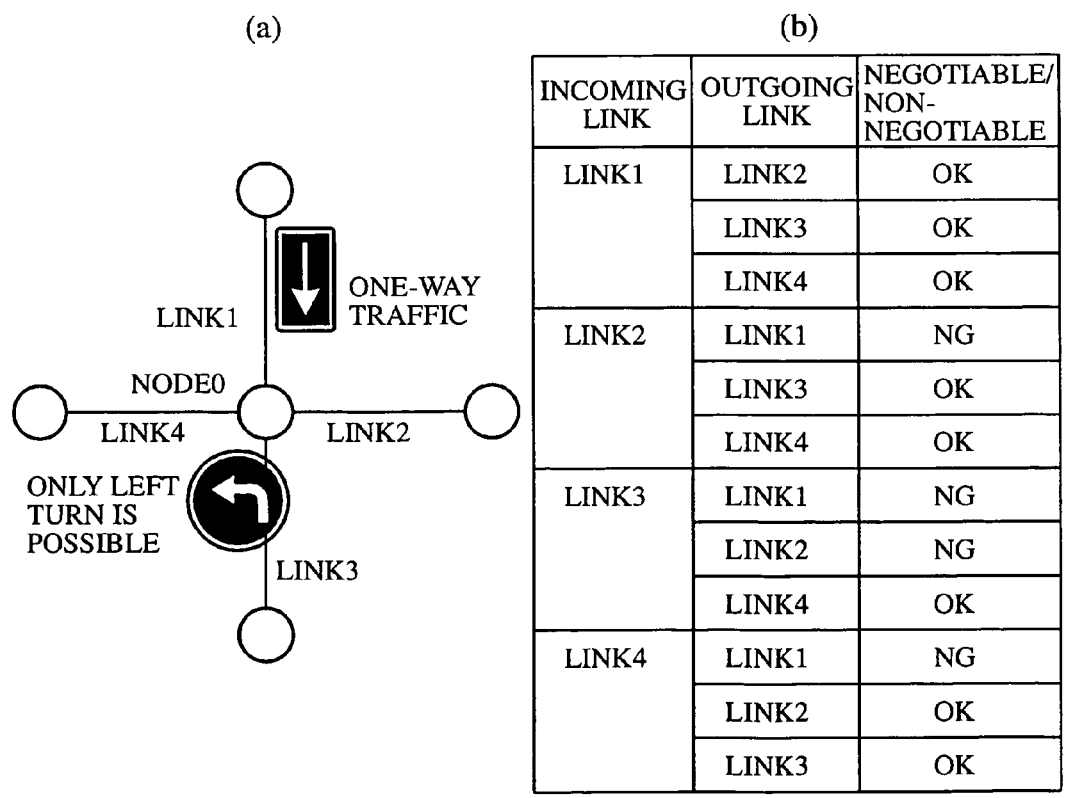
FIG. 13 is a diagram for explaining traffic regulations described by road information which is used by the map information processing apparatus in accordance with embodiment 1 of the present invention.

The road update information generating means 21 also generates traffic regulations information indicating that vehicles can be headed toward any of all directions at the temporary intersection. Traffic regulations information will be explained below. In general, the road information which the car navigation apparatus uses includes traffic regulations information which is described therein. Now assume a case where four links 1 to 4 are connected to a node 0, the link 1 is a one-way road extending to the node 0, and the link 3 is a road where vehicles can make only a left turn toward the link 4 at the node 0, as shown in FIG. 13(a). In this case, traffic regulations at the node 0 can be expressed by a combination of traffic regulations for incoming links and outgoing links at the node 0, as shown in FIG. 13(b). The information showing these traffic regulations is described in the road information as information associated with the node, and is referred to as traffic regulations information.

The road information update means 24 stores the new road information included in the road update information generated by the road update information generating means 21, via the HDD accessing means 17, in the new road information storage means 16b disposed in the HDD 16. When new road information corresponding to a mesh which is associated with the newly-generated new road information already exists in the new road information storage means, the road information update means adds the newly-generated new road information to the existing new road information. On the other hand, when new road information corresponding to the mesh does not exist in the new road information storage means, the road information update means newly stores the newly-generated new road information as new road information corresponding to the mesh. When information for updating the existing road network is included in the road update information, the road information updating means 24 updates the existing road network according to the information.

Next, a process of determining whether each point which is generated, as a temporary intersection, by the road update information generating means 21 is a normal grade crossing or a crossing with an overpass or underpass by using both the intersection inquiring means 22 and the intersection determining means 23 will be explained.

Figure 14:
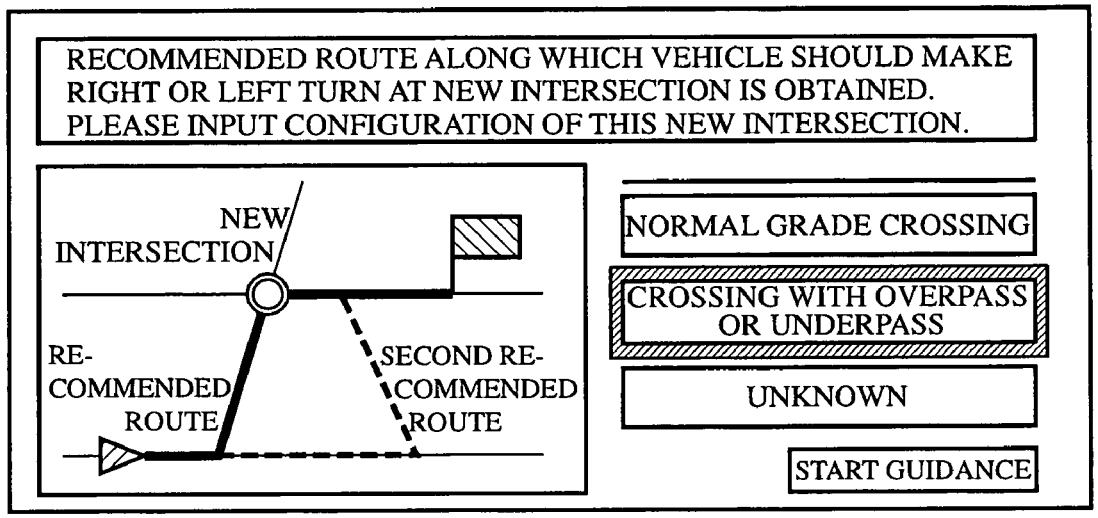
FIG. 14 is a diagram showing a screen display in a case where the vehicle is guided to make a right or left turn at a temporary intersection by the map information processing apparatus in accordance with embodiment 1 of the present invention.

FIG. 14 shows a screen display example on the display 40 in a case where the recommended route calculated by the route calculating means 11 contains a right or left turn at a node (which is expressed by a double circle as a new intersection in FIG. 14) which is registered as a temporary intersection. This screen display is generated by the intersection inquiring means 22. In this screen display, the screen includes a map showing the recommended route, a message indicating that the point where the vehicle should make a right or left turn at the temporary intersection exists on the recommended route, a selection menu which urges the user to input the configuration of the temporary intersection, and a guidance start button. A second recommended route illustrated in the screen display shows another recommended route when assuming that the temporary intersection (i.e., the new intersection shown in FIG. 14) is a crossing with an overpass or underpass or the like, and the vehicle cannot simply make a right or left turn at the temporary intersection.

The map information processing apparatus can be so constructed as to provide the user with the fact that the recommended route containing a right or left turn at a node registered as a temporary intersection has been calculated by voice using the voice output device 41, as well as a screen display as shown in FIG. 14. The map information processing apparatus can also be so constructed as to tell the user where the temporary intersection at which the vehicle should make a right or left turn is (e.g., the address of the temporary intersection, surrounding facilities, etc.) and what kinds of roads intersect at the temporary intersection (e.g., the roads' numbers, the roads' names, etc.). In this case, the user can grasp which actual intersection is specified by the temporary intersection for guidance with greater accuracy.

The user to which the recommended route containing a right or left turn at the temporary intersection is provided through both the screen display shown in FIG. 14 and the above-mentioned voice guidance can determine the configuration of the temporary intersection for guidance. In the example shown in FIG. 14, the user can select any of the following menu items: "normal grade crossing", "crossing with overpass or underpass", "unknown", and "guidance start", which are shown in the selection menu. The user can select a desired menu item of the selection menu by manipulating a button installed in the main panel so as to highlight the desired menu item of the selection menu, and then pushing down an execution button. The user can alternatively select a desired menu item of the selection menu by manipulating buttons installed in the remote controller. When the display 40 is equipped with a touch panel input device, the user can alternatively select a desired menu item of the selection menu by manipulating the touch panel. In addition, the map information processing apparatus can be so constructed as to have a voice recognition means. In this case, the user can alternatively select a desired menu item of the selection menu by voice.

Figure 15:
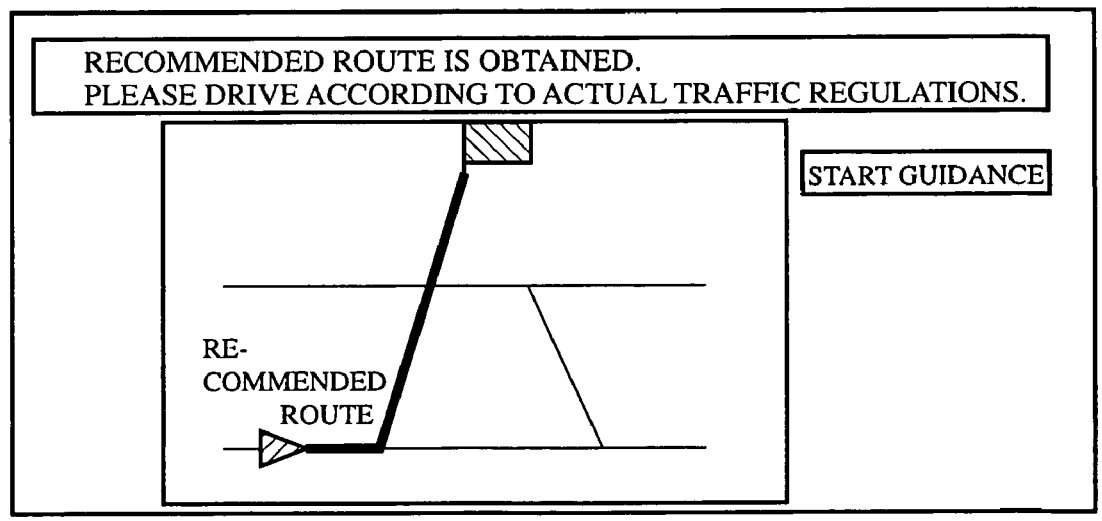
FIG. 15 is a diagram showing a screen display in a case where the vehicle is guided not to make a right or left turn at a temporary intersection by the map information processing apparatus in accordance with embodiment 1 of the present invention.

FIG. 15 shows a screen display example on the display 40 in a case where the recommended route calculated by the route calculating means 11 does not contain a right or left turn at a node registered as a temporary intersection. In this case, a computed normal recommended route is displayed on the screen. The screen display of the computed result of the recommended route shown in FIG. 15 includes a map showing the recommended route, a message indicating that the recommended route has been determined, and a guidance start button.

When the user manipulates the guidance start button by pushing down an operation button disposed in the main panel, an operation button disposed on the remote controller, or a corresponding part of the touch panel, or by saying corresponding words, the screen switches from the screen display as shown in FIG. 15 to a normal screen display of a map, and guidance to the destination is then provided for the user.

Figure 16:
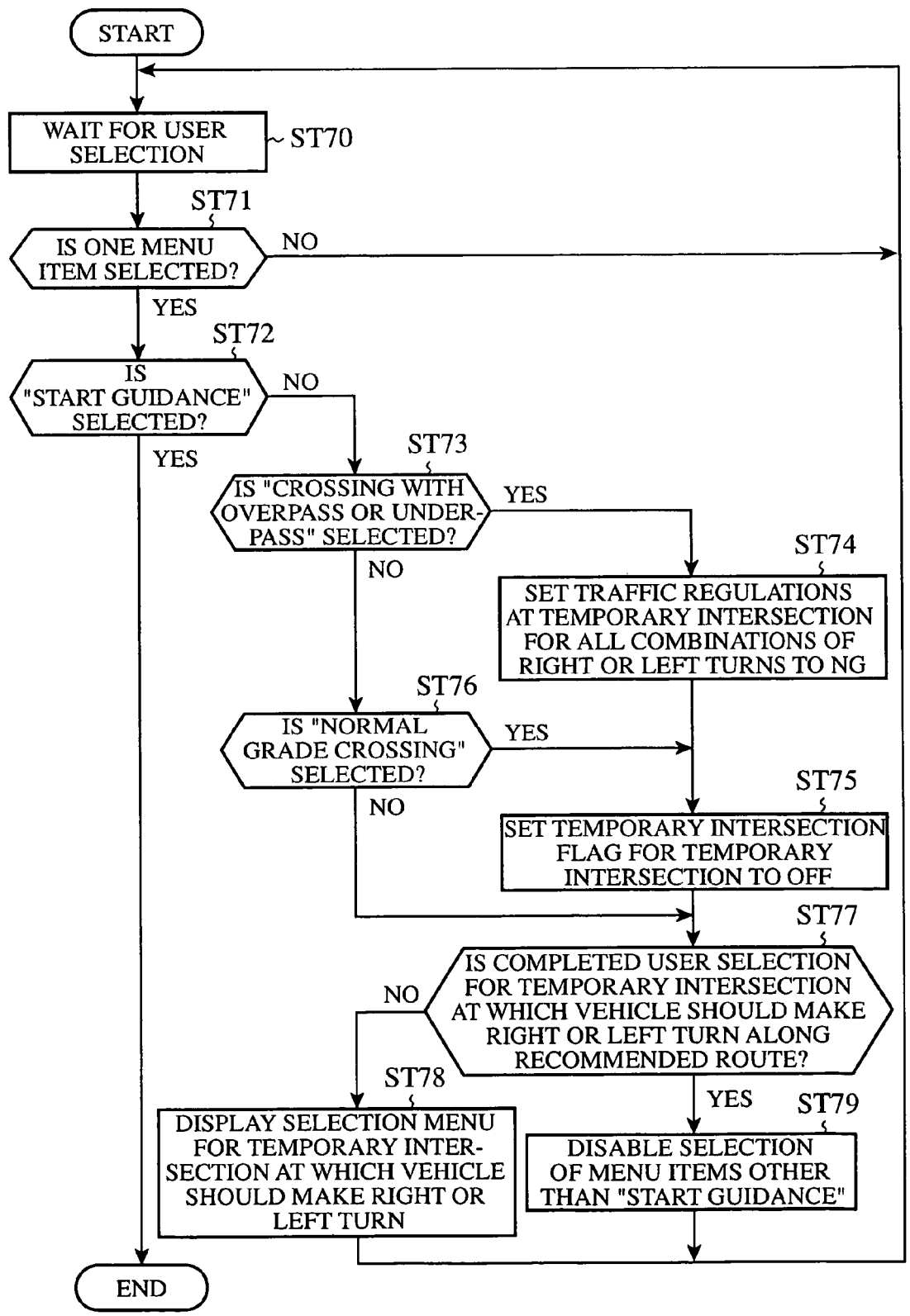
FIG. 16 is a flow chart showing intersection determining processing by the map information processing apparatus in accordance with embodiment 1 of the present invention.

FIG. 16 is a flow chart showing intersection determining processing including up to a process of setting the configuration of a temporary intersection using the intersection determining means 23 after a screen display as shown in FIG. 14 is provided for the user in order to urge the user to determine the configuration of the temporary intersection.

In this intersection determining processing, after producing a selection menu as shown in FIG. 14, the intersection inquiring means 22 enters a state in which it is waiting for selection of one menu item of the selection menu by the user (in step ST70). The intersection inquiring means then checks to see which menu item of the selection menu is selected (in step ST71). When determining that neither menu item of the selection menu is selected, the intersection inquiring means returns the sequence to step ST70 in which it starts waiting for selection of one menu item of the selection menu by the user again.

When, in step ST71, determining that either menu item of the selection menu is selected by the user, the intersection inquiring means further checks to see whether or not "guidance start" is selected (in step ST72). When the intersection inquiring means determines that the guidance start menu item is selected, the intersection determining means ends the intersection determining processing. On the other hand, when determining that the guidance start is not selected, the intersection inquiring means further check to see whether or not "crossing with overpass or underpass" is selected (in step ST73). When the intersection inquiring means determines that the crossing with overpass or underpass menu item is selected, the intersection determining means changes the traffic regulations information for the temporary intersection in question, which is stored in the HDD 16, from OK to NG for all combinations of right and left turns (except moving straight forward) (in step ST74). The intersection determining means also sets the temporary intersection flag for the temporary intersection in question, which is stored in the HDD 16, to OFF (in step ST75).

When, in above-mentioned step ST73, determining that crossing with overpass or underpass is not selected by the user, the intersection inquiring means further checks to see whether "normal grade crossing" is selected (in step ST76). When the intersection inquiring means determines that the normal grade crossing menu item is selected by the user, the intersection determining means shifts the sequence to step ST75 in which it carries out the above-mentioned processing. On the other hand, when the intersection inquiring means determines that normal grade crossing is not selected, that is, "unknown" is selected, the intersection determining means shifts the sequence to step ST77. In this case, the temporary intersection remains to be processed as it is.

The intersection determining means, in step ST77, checks to see whether the user has completed the selection of one menu item of the selection menu for all temporary intersections at each of which the vehicle should make a right or left turn along the recommended route calculated by the route calculating means 11. When determining that the user has not completed the selection of one menu item of the selection menu for all temporary intersections yet, that is, one or more yet-to-be-determined temporary intersections at which the vehicle should make a right or left turn exist on the recommended route, the intersection determining means displays the selection menu for the next temporary intersection at which the vehicle should make a right or left turn (in step ST78). After that, the intersection determining means returns the sequence to step ST70 in which it starts waiting for selection of one menu item of the selection menu by the user again.

When, in step ST77, determining that the user has completed the selection of one menu item of the selection menu for all temporary intersections, that is, no yet-to-be-determined temporary intersection at which the vehicle should make a right or left turn exists on the recommended route, the intersection determining means disables the menu items of the selection menu other than "guidance start" (in step ST79). After that, the intersection determining means returns the sequence to step ST70 in which it starts waiting for selection of one menu item of the selection menu by the user again.

As previously explained, when a vehicle carrying the map information processing apparatus according to embodiment 1 of the present invention has traveled a new road, no information about the new road being stored in the HDD 16, the map information processing apparatus can additionally store information about the new road in the HDD 16, and can implement navigation which correctly reflects intersections at which the new road intersects existing roads.

In greater detail, this map information processing apparatus makes it possible to use information about intersections at which the newly-detected new road intersects existing roads, other than the start and end points of the newly-detected new road. Furthermore, the map information processing apparatus can prevent crossings with an overpass or underpass from being erroneously processed in the same way that normal grade crossings are processed, by distinguishing temporary intersections from normal grade crossings. In addition, the map information processing apparatus can handle temporary intersections which are determined to be a grade crossing during subsequent processings in the same way that it handles intersections of an existing road. By inquiring of the user whether each temporary intersection is a grade crossing or a crossing with an overpass or underpass, the map information processing apparatus can reduce the frequency of occurrence of incorrect determination compared with a case where it routinely determines whether each temporary intersection is a grade crossing or a crossing with an overpass or underpass. Furthermore, since the map information processing apparatus sets the timing when it inquires of the user whether each temporary intersection is a grade crossing or a crossing with an overpass or underpass to the time of determination of whether each temporary intersection is a grade crossing or a crossing with an overpass or underpass during the route calculation, the inquiry can be prevented from occurring frequently.

The new road information and the map information are independently disposed in the map information processing apparatus according to this embodiment 1, as previously mentioned. As an alternative, the new road information can be included in the map information. In this case, when there is a necessity to update the existing map information in order to add generated new road information to a certain position of the map information, or simply add the generated new road information to the existing map information, the road update information generating means 21 generates road update information describing how to modify which information in the map information.

Embodiment 2

The map information processing apparatus according to above-mentioned embodiment 1 is so constructed that when the recommended route calculated by the route calculating means 11 contains a right or left turn at a temporary intersection, the intersection determining means 23 provides a screen display shown in FIG. 14 for the user to allow the user to selectively input the configuration of the temporary intersection. On the other hand, a map information processing apparatus according to this embodiment 2 is so constructed as to, when a recommended route contains a right or left turn at a temporary intersection, allow the user to selectively input the configuration of the temporary intersection only when a power supply OFF signal for powering off the map information processing apparatus is generated.

Figure 17:
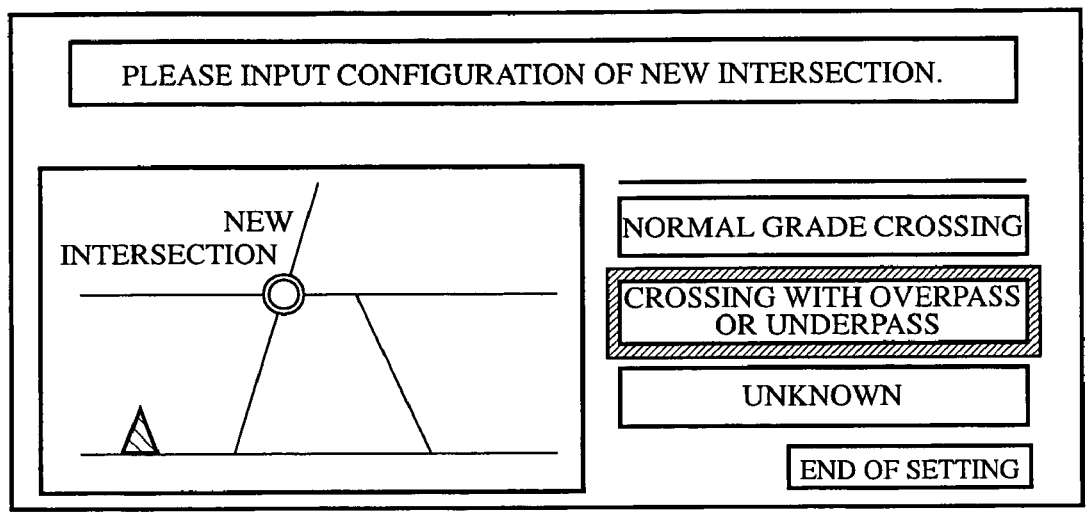
FIG. 17 is a diagram showing a screen display which allows the user to input the configuration of a temporary intersection in the map information processing apparatus in accordance with embodiment 1 of the present invention.

FIG. 17 shows a screen display example which is provided for the user to allow the user to selectively input the configuration of a temporary intersection when the power supply OFF signal for powering off the map information processing apparatus is generated. This screen display example includes a map containing a temporary intersection (e.g., a new intersection as shown in FIG. 17), a message indicating that the screen display is the one via which the user is allowed to input the configuration of the temporary intersection, a selection menu which urges the user to input the configuration of the temporary intersection, and a setting end button. The screen display shown in FIG. 17 is generated by an intersection inquiring means 22.

Figure 18:
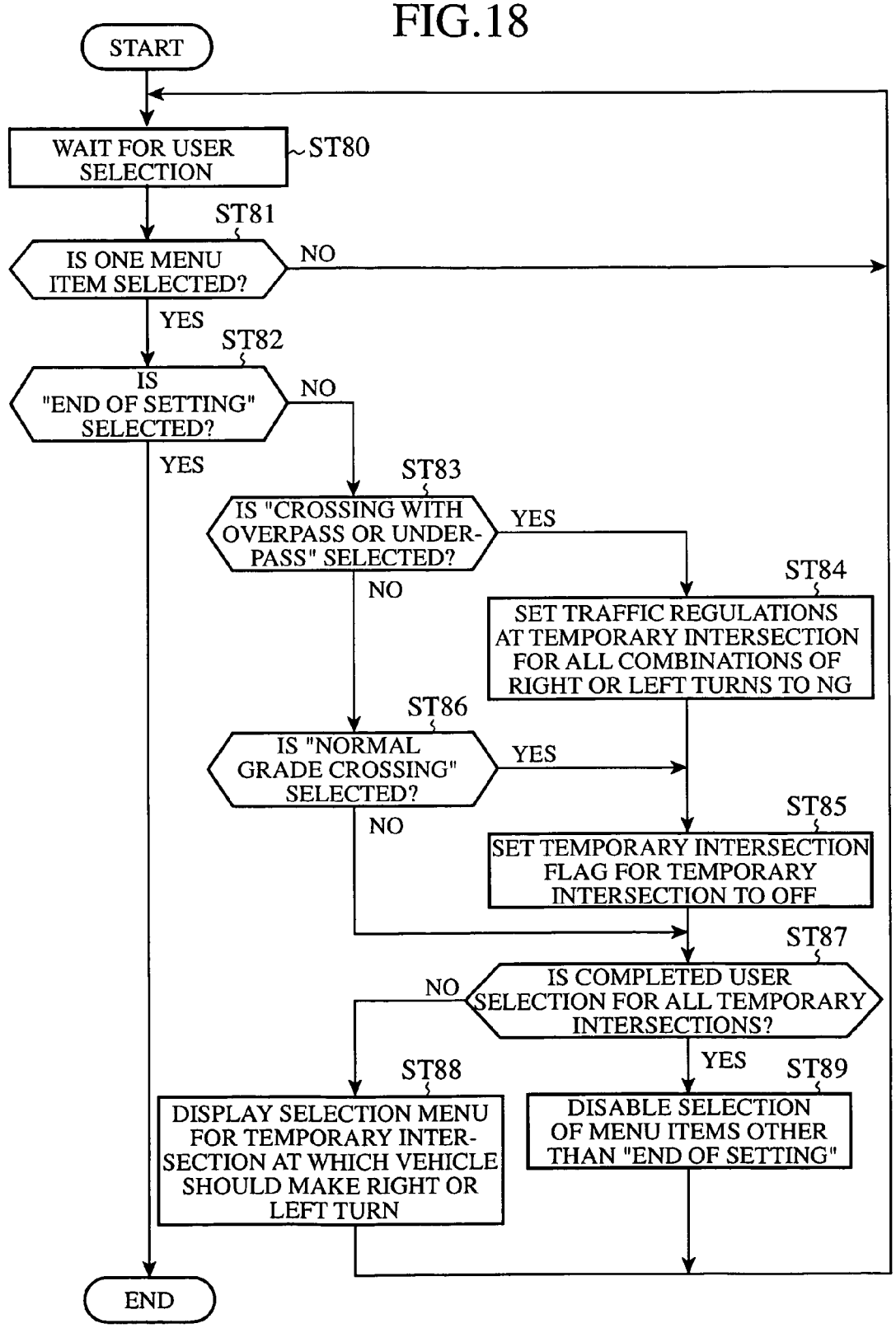
FIG. 18 is a flow chart showing intersection determining processing which is carried out by a map information processing apparatus in accordance with embodiment 2 of the present invention after a screen display as shown in FIG. 17 is generated.

FIG. 18 is a flow chart showing an intersection determining process of determining the configuration of a temporary intersection which is carried out by an intersection determining means 23 of the map information processing apparatus after a screen display, as shown in FIG. 17, for allowing the user to selectively input the configuration of the temporary intersection is generated.

In this intersection determining processing, after a screen display as shown in FIG. 17 is provided for the user by the intersection inquiring means 22, the intersection determining means enters a state in which it is waiting for selection by the user (in step ST80). The intersection determining means then checks to see whether which menu item of the selection menu is selected (in step ST81). When determining that no menu item of the selection menu is selected, the intersection determining means returns the sequence to step ST80 in which it starts waiting for selection by the user again.

When determining that either menu item of the selection menu is selected by the user in step ST81, the intersection determining means further checks to see whether or not "setting end" is selected (in step ST82). When determining that the setting end menu item is selected, the intersection determining means ends the intersection determining processing. On the other hand, when determining that the setting end menu item is not selected, the intersection inquiring means further check to see whether or not "crossing with overpass or underpass" is selected (in step ST83). When determining that the crossing with overpass or underpass menu item is selected, the intersection determining means changes the traffic regulations information for the temporary intersection in question, which is stored in an HDD 16, from OK to NG for all combinations of right and left turns (except moving straight forward) (in step ST84). The intersection determining means also changes a temporary intersection flag for the temporary intersection in question, which is stored in the HDD 16, to OFF (in step ST85).

When, in above-mentioned step ST83, determining that the crossing with overpass or underpass menu item is not selected by the user, the intersection determining means further checks to see whether "normal grade crossing" is selected (in step ST86). When determining that the normal grade crossing menu item is selected by the user, the intersection determining means shifts the sequence to step ST85 in which it carries out the above-mentioned processing. On the other hand, when determining that the normal grade crossing menu item is not selected, that is, "unknown" is selected, the intersection determining means shifts the sequence to step ST87. In this case, the temporary intersection remains to be processed as it is.

The intersection determining means, in step ST87, checks to see whether the user has completed the selection of one menu item of the selection menu for all temporary intersections. When determining that the user has not completed the selection of one menu item of the selection menu for all temporary intersections yet, that is, there still remain other temporary intersections on which the user has not performed the selecting operation yet, the intersection determining means displays the selection menu for the next temporary intersection (in step ST88). After that, the intersection determining means returns the sequence to step ST80 in which it starts waiting for selection of one menu item of the selection menu by the user again. The remaining temporary intersections are selected in increasing order of distance from the current position of the vehicle which is measured by a positioning means 15.

When, in step ST87, determining that the user has completed the selection of one menu item of the selection menu for all temporary intersections yet, that is, there still remains no other temporary intersection on which the user has not performed the selecting operation yet, the intersection determining means disables the menu items of the selection menu other than "setting end" (in step ST89). After that, the intersection determining means returns the sequence to step ST80 in which it starts waiting for selection of one menu item of the selection menu by the user again.

As previously explained, the map information processing apparatus according to embodiment 2 of the present invention allows the user to set the configuration of a temporary intersection only when the power supply OFF signal for powering off the map information processing apparatus is generated, i.e., only when the map information processing apparatus ends its operation. Therefore, the map information processing apparatus according to this embodiment can prevent inquiries about the configuration of any temporary intersection from being made while the vehicle is traveling. The map information processing apparatus can also allow the user to check to see whether or not there are temporary intersections which were detected while the vehicle was traveling when ending its operation, and can incorporate the temporary intersections into the map information and new road information as proper intersections.

The map information processing apparatus according to this embodiment 2 is so constructed as to allow the user to selectively input the configuration of a temporary intersection only when the power supply OFF signal for powering off the map information processing apparatus is generated. As an alternative, the map information processing apparatus according to this embodiment 2 can be so constructed as to allow the user to selectively input the configuration of a temporary intersection only when a power supply ON signal for powering on the map information processing apparatus is generated to start up the map information processing apparatus.

According to this structure, since the user is allowed to selectively input the configuration of a temporary intersection only when the map information processing apparatus is started up, while inquiries about the configuration of any temporary intersection can be prevented from being made while the vehicle is traveling, the map information processing apparatus can start its operation with the map information including intersection information which reflects the newest knowledge that the user has. Since the user does not need to manipulate the map information processing apparatus when getting off the vehicle, the user can have sufficient lead time to set the configuration of any temporary intersection.

The map information processing apparatus according to this embodiment 2 does not restrict a map area for which the user is allowed to set the configuration of a temporary intersection when generating a screen display as shown in FIG. 17. As an alternative, the map information processing apparatus according to this embodiment 2 can be so constructed as to restrict the map area for which the user is allowed to set the configuration of a temporary intersection when generating a screen display as shown in FIG. 17. This variant can relieve the user of unnecessary operations of setting the configurations of unimportant temporary intersections. The map information processing apparatus according to this embodiment 2 can alternatively determine the map area for which the user is allowed to set the configuration of a temporary intersection according to the distance from the current position of the vehicle which is measured by the positioning means 15. When a destination is preset by the user, the map information processing apparatus according to this embodiment 2 can alternatively determine an appropriate area which is calculated from the current position and the destination as the map area for which the user is allowed to set the configuration of a temporary intersection. The map information processing apparatus according to this embodiment 2 can alternatively determine an area which is set by the user in advance as the map area for which the user is allowed to set the configuration of a temporary intersection.

Embodiment 3

A map information processing apparatus according to embodiment 3 of the present invention is so constructed as to set the configuration of a temporary intersection based on information indicating whether a vehicle in which the map information processing apparatus is mounted has made a right or left turn when actually passing through the temporary intersection.

Figure 19:
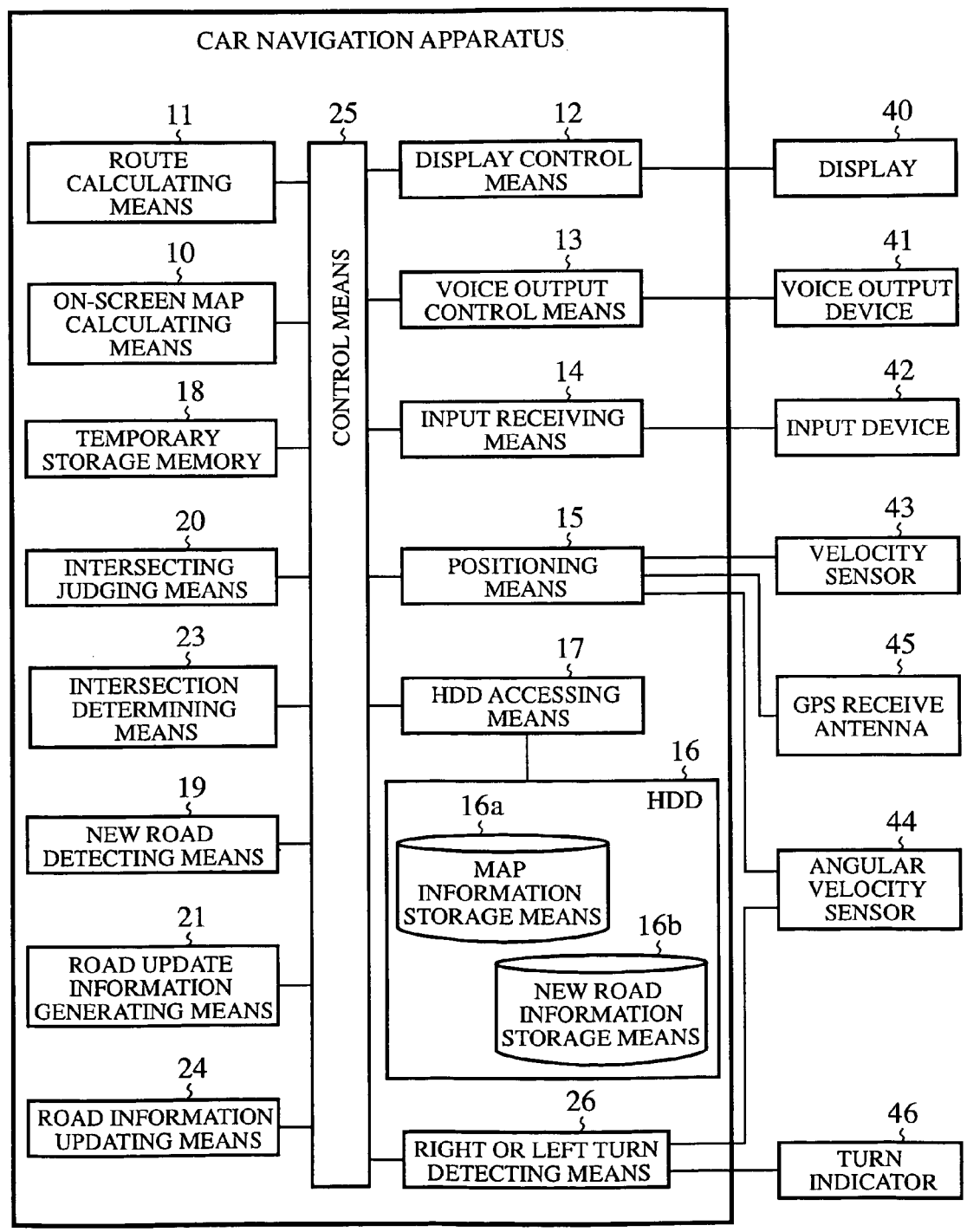
FIG. 19 is a block diagram showing the structure of a map information processing apparatus in accordance with embodiment 3 of the present invention.

FIG. 19 is a block diagram showing the structure of the map information processing apparatus according to embodiment 3 of the present invention. This map information processing apparatus includes a turn indicator 46 in addition to the components of the map information processing apparatus according to embodiment 1 as shown in FIG. 1, and a car navigation apparatus in which the intersection inquiring means 22 is removed from the components of the car navigation apparatus according to embodiment 1, and a right or left turn detecting means 26 is additionally disposed. The operation of an intersection determining means 23 differs from that of the map information processing apparatus according to embodiment 1.

When the vehicle in which the map information processing apparatus is mounted makes a right or left turn, the turn indicator 46 is used in order to notify a third party of the right or left turn. A signal indicating the direction of the right or left turn indicated by this turn indicator 46 is sent to the right or left turn detecting means 26.

The right or left turn detecting means 26 detects a change in the heading of the vehicle based on either a signal indicating the change in the heading of the vehicle sent from an angular velocity sensor 44, or the signal from the turn indicator 46. The detection result obtained by the right or left turn detecting means 26 is sent to the intersection determining means 23 via a control means 25, and is used in order to set the configuration of the temporary intersection.

Figure 20:
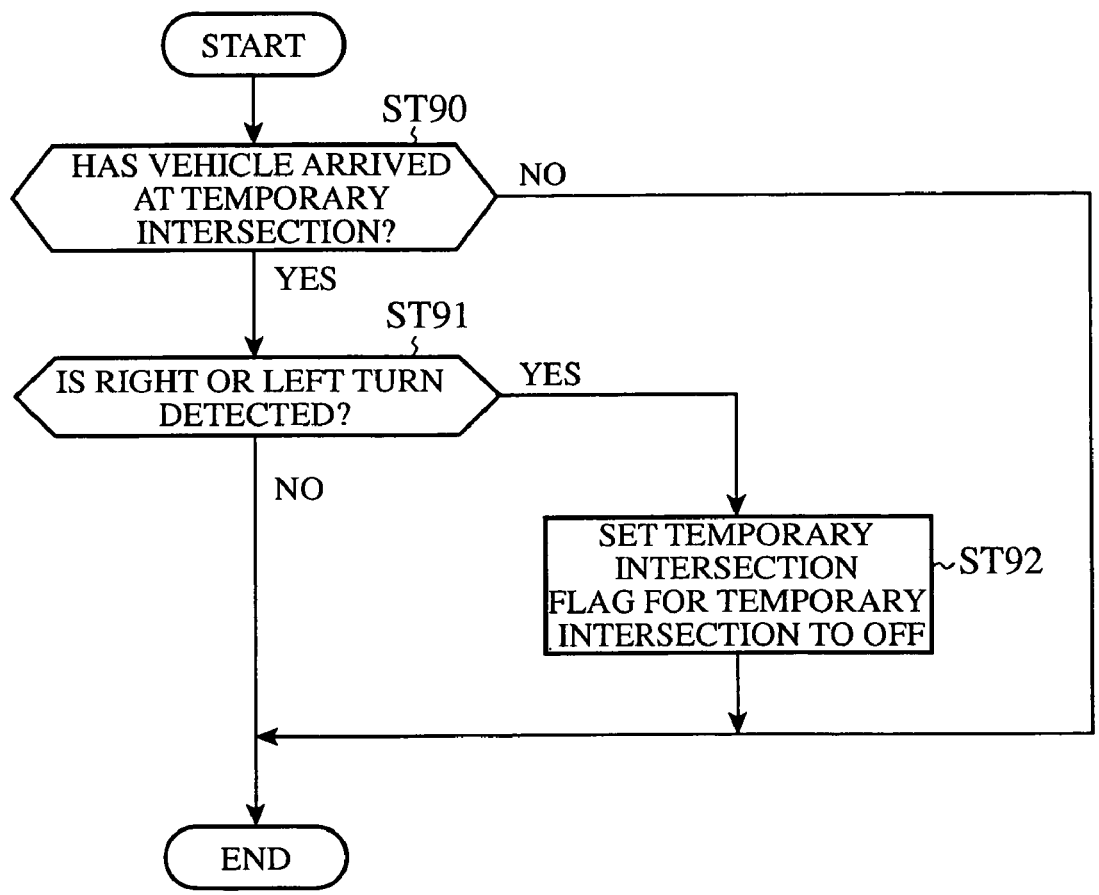
FIG. 20 is a flow chart showing a process of setting the configuration of a temporary intersection which is carried out by the map information processing apparatus in accordance with embodiment 3 of the present invention.

Next, a process of setting the configuration of a temporary intersection which is carried out by the intersection determining means 23 of the map information processing apparatus according to embodiment 3 of the present invention will be explained with reference to a flow chart shown in FIG. 20.

In the process of setting the configuration of a temporary intersection, the intersection determining means checks to see whether the vehicle in which the map information processing apparatus is mounted has arrived at a temporary intersection first (in step ST90). When determining that the vehicle has not arrived at any temporary intersection yet, the intersection determining means ends the processing. On the other hand, when determining that the vehicle has arrived at a temporary intersection, the intersection determining means checks to see whether the right or left turn detecting means 26 has detected that the vehicle has made a right or left turn at the temporary intersection (in step ST91). When determining that the right or left turn detecting means 26 has detected that the vehicle has made a right or left turn at the temporary intersection, the intersection determining means changes a temporary intersection flag for the temporary intersection to OFF (in step ST92), and, after that, ends the processing. The intersection determining means also ends the processing when, in above-mentioned step ST91, determining that the right or left turn detecting means 26 has not detected that the vehicle has made a right or left turn at the temporary intersection.

As previously explained, when detecting that the vehicle has made a right or left turn at a intersection, the map information processing apparatus according to embodiment 3 of the present invention can automatically recognize that the temporary intersection is a normal grade crossing, and, after than, can deal with the temporary intersection as a grade crossing. In such a case, the map information processing apparatus can recognize that the temporary intersection is a normal grade crossing using right or left turn information from the turn indicator 46.

Embodiment 4

A map information processing apparatus according to embodiment 4 of the present invention is so constructed as to set the configuration of a temporary intersection based on altitude information.

The map information processing apparatus according to this embodiment 4 has the same structure as the map information processing apparatus according to embodiment 1 as shown in FIG. 1, except for the following. Road information included in map information stored in a map information storage means 16a includes altitude information about each node in advance as information related with each node. Furthermore, altitude information about each node is included, as information associated with each node, in new road information stored in a new road information storage means 16b. These pieces of altitude information are generated based on GPS signals which a positioning means 15 acquires from a GPS receive antenna 45. An intersection determining means 23 sets the configuration of a temporary intersection based on the altitude information. The map information processing apparatus according to embodiment 4 does not need to have the intersection inquiring means 22 of the map information processing apparatus according to embodiment 1.

Figure 21:
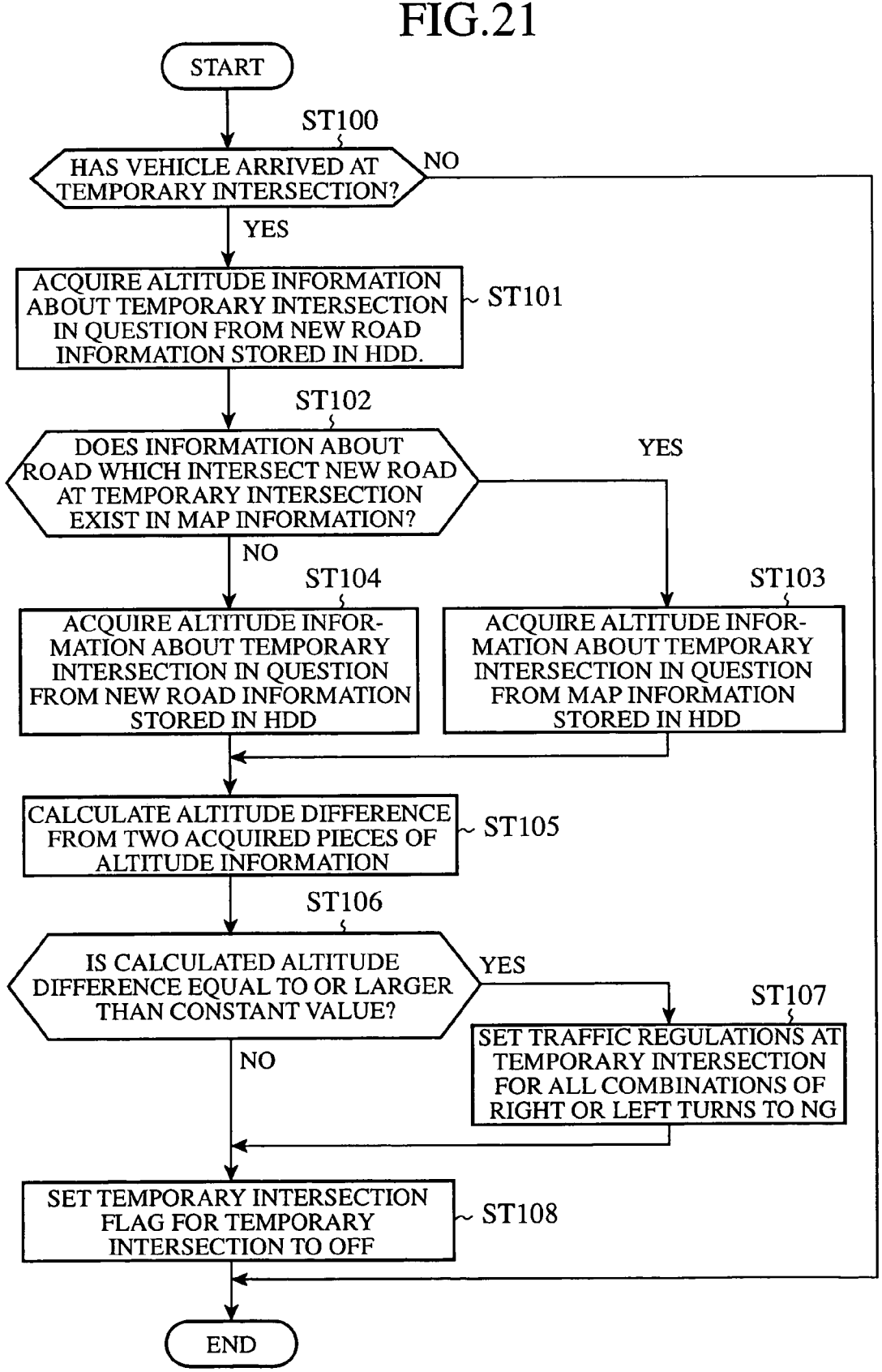
FIG. 21 is a flow chart showing a process of setting the configuration of a temporary intersection which is carried out by a map information processing apparatus in accordance with embodiment 4 of the present invention.

Next, a process of setting the configuration of a temporary intersection which is carried out by the intersection determining means 23 of the map information processing apparatus according to embodiment 4 of the present invention will be explained with reference to a flow chart shown in FIG. 21.

In the process of setting the configuration of a temporary intersection, the intersection determining means checks to see whether a vehicle in which the map information processing apparatus is mounted has arrived at a temporary intersection first (in step ST100). When determining that the vehicle has not arrived at any temporary intersection, the intersection determining means ends the processing. On the other hand, when determining that the vehicle has arrived at a temporary intersection, the intersection determining means searches through the new road information stored in the new road information storage means 16b of an HDD 16 for node information corresponding to the temporary intersection via an HDD accessing means 17 to retrieve altitude information about the temporary intersection from the retrieved node information (in step ST101).

The intersection determining means then checks to see whether a road which a new road in question intersects at the temporary intersection exists in the map information (in step ST102). In performing this process, the intersection determining means refers to intersection information included in the new road information and then checks to see whether a road which the new road intersects at the temporary intersection and which is described in the intersection information exists in the map information. When, in step ST102, determining that a road which the new road intersects at the temporary intersection exists in the map information, the intersection determining means then searches through the map information stored in the map information storage means 16a of the HDD 16 for corresponding node information about the temporary intersection via the HDD accessing means 17 to retrieve altitude information about the node (in step ST103). After that, the intersection determining means advances the sequence to step ST105.

When, in above-mentioned step ST102, determining that no road which the new road intersects at the temporary intersection exists in the map information, the intersection determining means then searches through the new road information stored in the new road information storage means 16b of the HDD 16 for corresponding node information about the temporary intersection via the HDD accessing means 17 to retrieve altitude information about the node (in step ST104). After that, the intersection determining means advances the sequence to step ST105.

The intersection determining means, in step ST104, calculates an altitude difference from both the altitude information acquired in step ST101, and the altitude information acquired in step ST103 or ST104 (in step ST105). The intersection determining means then checks to see whether or not the altitude difference calculated in step ST105 is equal to or larger than a predetermined constant value (in step ST106). When, in step ST106, determining that the altitude difference is equal to or larger than a predetermined constant value, the intersection determining means recognizes that the temporary intersection at where the two roads intersect is a crossing with an overpass or underpass, and changes traffic regulations information for the temporary intersection in question from OK to NG for all combinations of right and left turns (in step ST107). The intersection determining means then changes a temporary intersection flag for the temporary intersection to OFF (in step ST108), and ends the processing. When, in above-mentioned step ST106, determining that the altitude difference calculated in step ST105 is smaller than the constant value, the intersection determining means recognizes that the temporary intersection at which the two roads intersect is a grade crossing and then advances the sequence to step ST108.

As previously explained, the map information processing apparatus according to embodiment 4 of the present invention can automatically determine whether a temporary intersection at which a new road and an existing road intersect is a normal grade crossing or a crossing with an overpass or underpass by comparing the altitude of the new road at the temporary intersection with that of the existing road at the temporary intersection. The map information processing apparatus can also determine whether a temporary intersection at which a new road and another new road intersect is a normal grade crossing or a crossing with an overpass or underpass automatically by comparing the altitude of the new road at the temporary intersection with that of the other new road at the temporary intersection.

Embodiment 5

A map information processing apparatus according to embodiment 5 of the present invention is so constructed as to set the configuration of a temporary intersection based on information indicating whether or not a vehicle in which the map information processing apparatus is mounted stopped while it was actually traveling in the vicinity of the temporary intersection.

Figure 22:
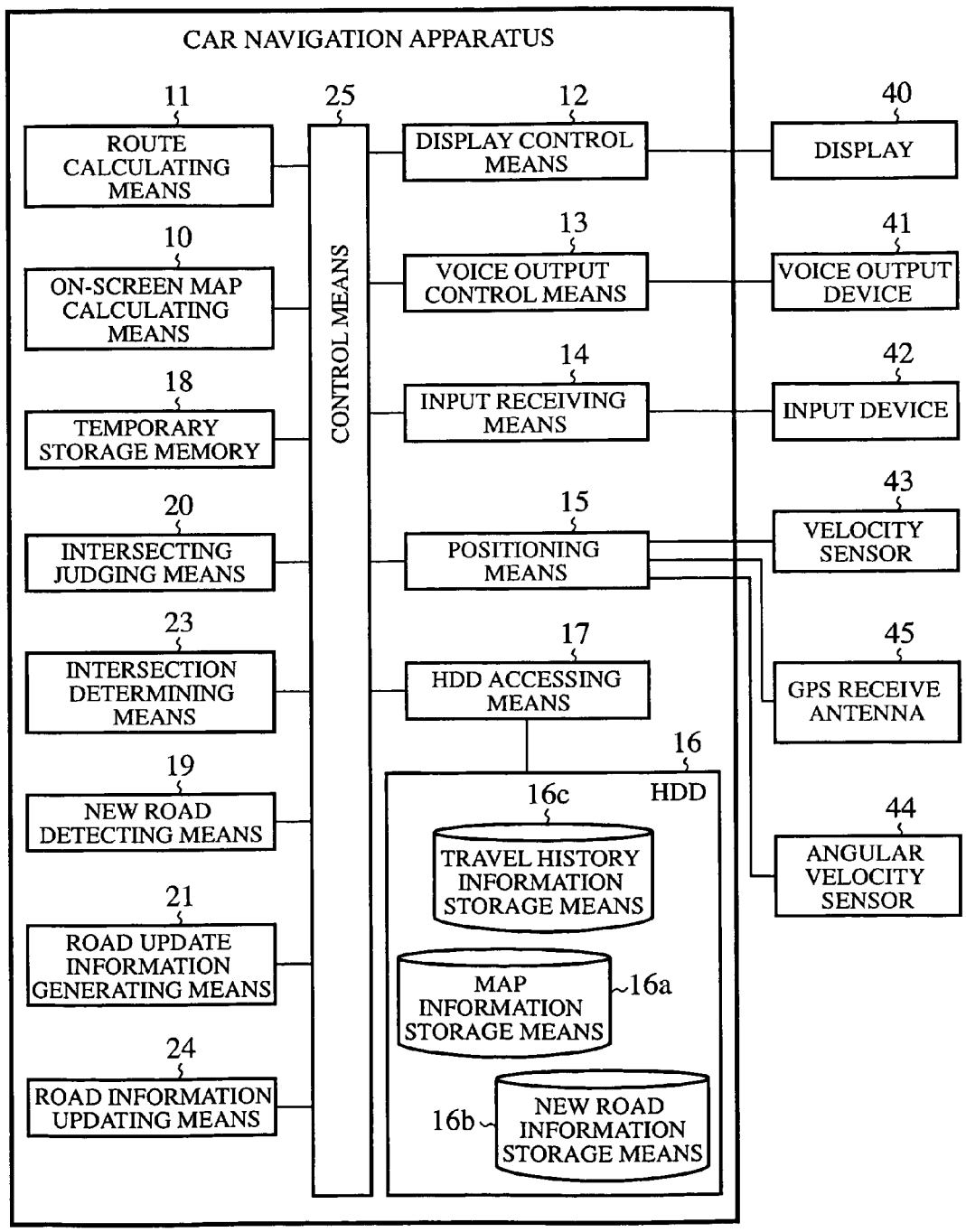
FIG. 22 is a block diagram showing the structure of a map information processing apparatus in accordance with embodiment 5 of the present invention.

FIG. 22 is a block diagram showing the structure of the map information processing apparatus according to embodiment 5 of the present invention. This map information processing apparatus does not have an intersection inquiring means 22, which is included in the car navigation apparatus of the map information processing apparatus according to embodiment 1 as shown in FIG. 1. An HDD 16 of a car navigation apparatus of this embodiment additionally includes a travel history information storage means 16*c*.

The components of the map information processing apparatus according to this embodiment differ from those of the map information processing apparatus according to embodiment 1 as shown in FIG. 1 in the following points. A positioning means 15 detects the velocity of the vehicle based on a signal from the velocity sensor 43. The position of the vehicle which is measured by the positioning means 15, and the velocity of the traveling vehicle are stored, as travel history information, in the travel history information storage means 16*c* of the HDD 16. An intersection determining means 23 sets the configuration of a temporary intersection with reference to travel history information.

Figure 23:
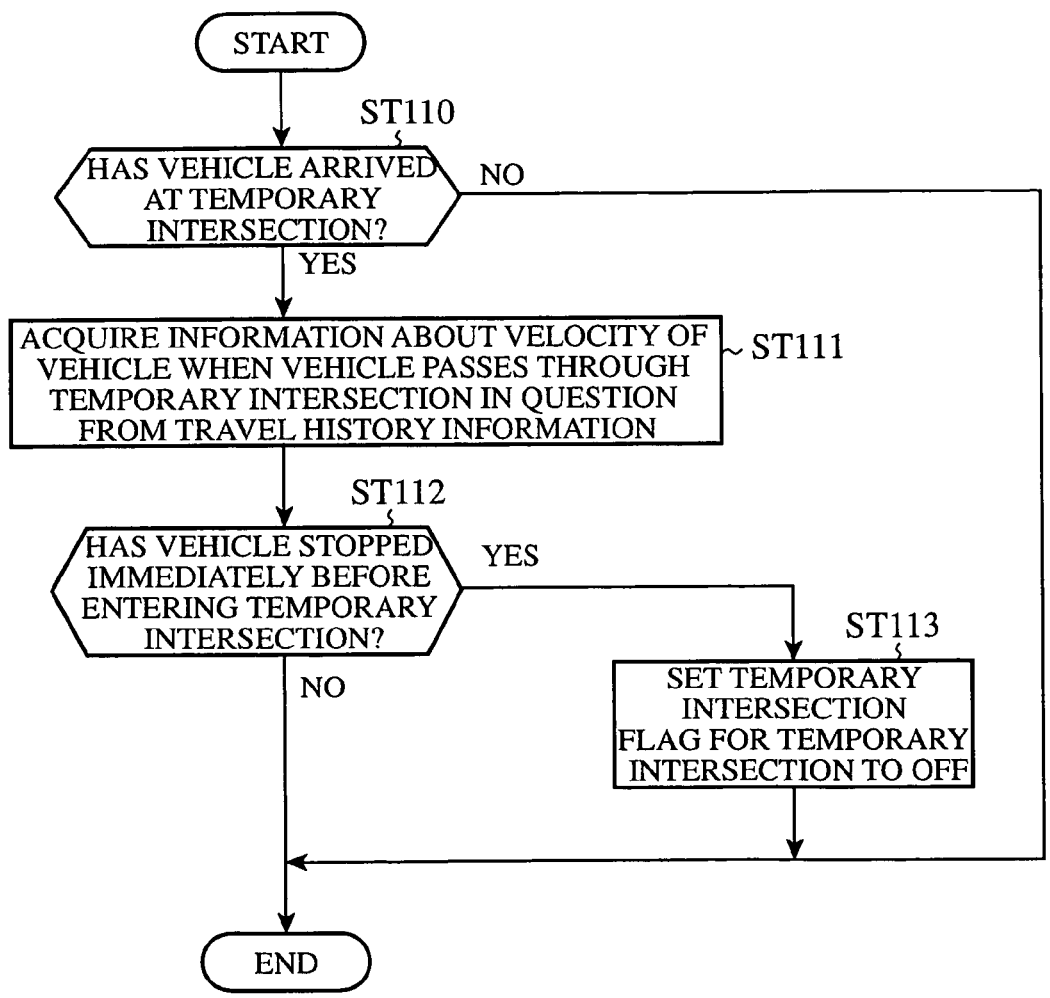
FIG. 23 is a flow chart showing a process of setting the configuration of a temporary intersection which is carried out by the map information processing apparatus in accordance with embodiment 5 of the present invention.

Next, a process of setting the configuration of a temporary intersection with reference to the travel history information, which is carried out by the intersection determining means 23 of the map information processing apparatus according to embodiment 5 of the present invention, will be explained with reference to a flow chart shown in FIG. 23.

In the process of setting the configuration of a temporary intersection, the intersection determining means checks to see whether the vehicle in which the map information processing apparatus is mounted has arrived at a temporary intersection first (in step ST110). When determining that the vehicle has not arrived at any temporary intersection, the intersection determining means ends the processing. On the other hand, when determining that the vehicle has arrived at a temporary intersection, the intersection determining means acquires information about a transition of the velocity of the vehicle immediately before the vehicle advances into the temporary intersection in question from the travel history information stored in the travel history information storage means 16*c* of the HDD 16 (in step ST111).

The intersection determining means then checks to see whether the vehicle temporarily stopped immediately before advancing into the temporary intersection based on the velocity transition acquired in step ST111 (in step ST112). When determining that the vehicle temporarily stopped immediately before advancing into the temporary intersection, the intersection determining means recognizes that the temporary intersection is a normal crossing, and changes a temporary intersection flag for the temporary intersection to OFF (in step ST113). After that, the intersection determining means ends the processing. The intersection determining means also ends the processing when, in above-mentioned step ST112, determining that the vehicle did not temporarily stop immediately before advancing into the temporary intersection.

As previously explained, the map information processing apparatus according to embodiment 5 of the present invention can automatically determine that a temporary intersection at which a new road and an existing road intersect is a normal grade crossing when the vehicle stopped at a red signal immediately before advancing into the temporary intersection.

Embodiment 6

A map information processing apparatus according to embodiment 6 of the present invention is so constructed as to set the configuration of a temporary intersection based on information indicating whether or not a vehicle in which the map information processing apparatus is mounted has moved from a new road to an existing road during traveling.

The map information processing apparatus according to this embodiment 6 has the same structure as the map information processing apparatus according to embodiment 1 shown in FIG. 1, with the exception that it does not need an intersection inquiring means 22.

Figure 24:
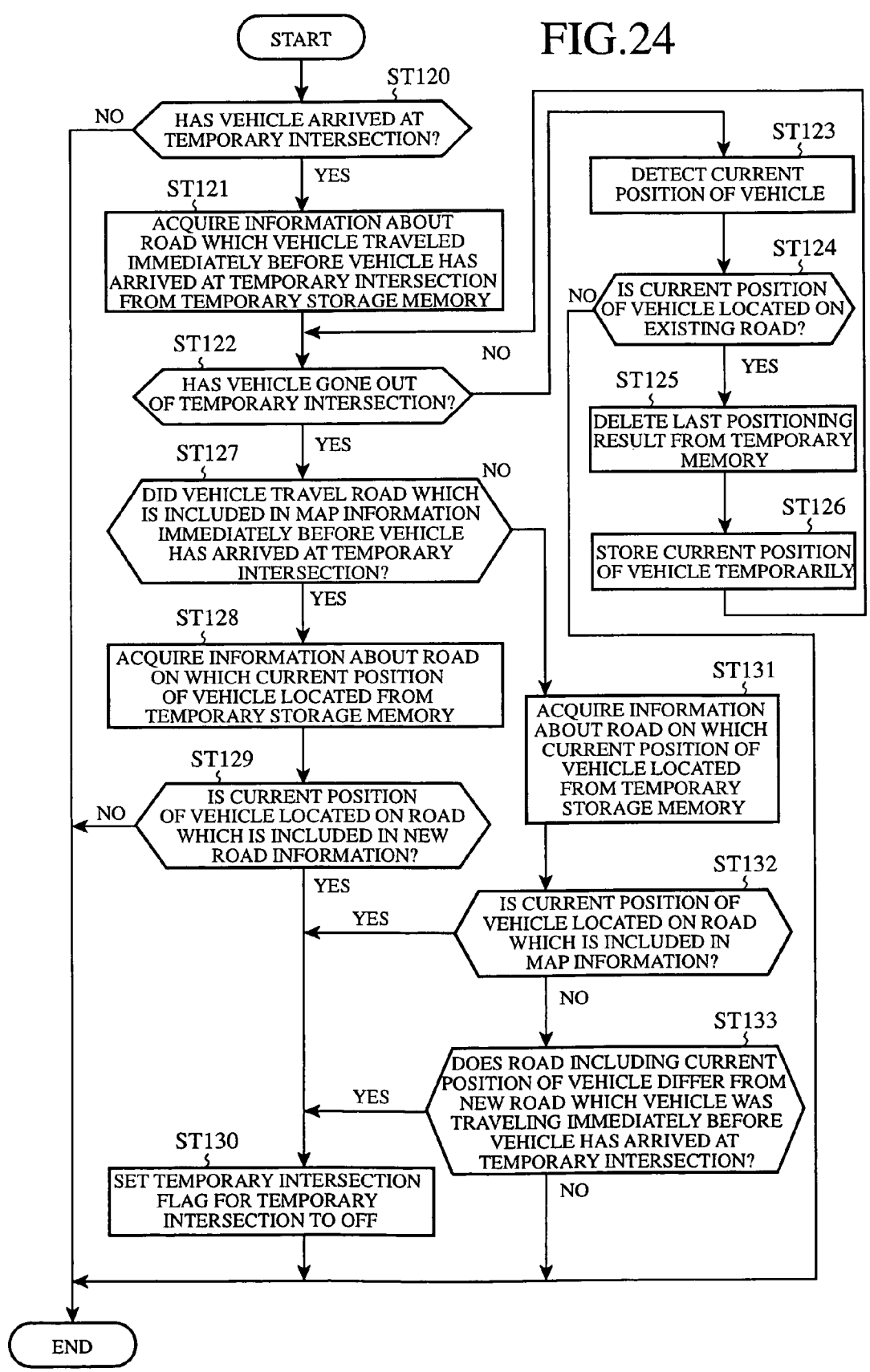
FIG. 24 is a flow chart showing a process of setting the configuration of a temporary intersection which is carried out by a map information processing apparatus in accordance with embodiment 6 of the present invention.

Next, a process of setting the configuration of a temporary intersection which is carried out by an intersection determining means 23 of the map information processing apparatus according to embodiment 6 of the present invention will be explained with reference to a flow chart shown in FIG. 24.

In the process of setting the configuration of a temporary intersection, the intersection determining means checks to see whether the vehicle in which the map information processing apparatus is mounted has arrived at a temporary intersection first (in step ST120). When determining that the vehicle has not arrived at any temporary intersection, the intersection determining means ends the processing. On the other hand, when determining that the vehicle has arrived at a temporary intersection, the intersection determining means acquires information about a road via which the vehicle has entered the temporary intersection from an immediately preceding positioning result stored in a temporary storage memory 18 (in step ST121).

The intersection determining means then checks to see whether the vehicle in which the map information processing apparatus is mounted has gone out of the temporary intersection (in step ST122). When determining that the vehicle has not gone out of the temporary intersection yet, the intersection determining means detects the current position of the vehicle from the next positioning result obtained by a positioning means 15 (in step ST123). The intersection determining means further checks to see whether or not the detected current position of the vehicle is located on an existing road (in step ST124). When determining that the detected current position of the vehicle is not located on any existing road, the intersection determining means ends the intersection determining processing in order to shift to a process of detecting a new road.

On the other hand, when, in step ST124, determining that the detected current position of the vehicle is located on an existing road, the intersection determining means deletes the preceding positioning result from the temporary storage memory 18 (in step ST125). The intersection determining means then stores the newest positioning result detected in step ST123 in the temporary storage memory 18 (in step ST126). After that, the intersection determining means returns the sequence to step ST122.

When determining that the vehicle has gone out of the temporary intersection in above-mentioned step ST122, the intersection determining means checks to see whether the road via which the vehicle entered the temporary intersection, which is acquired in step ST121, is a road included in map information stored in a map information storage means 16a of an HDD 16 or a road included in new road information stored in a new road information storage means 16b of the HDD 16 (in step ST127).

When, in this step ST127, determining that the road via which the vehicle entered the temporary intersection is a road included in the map information, the intersection determining means acquires a road (i.e., an outgoing road) which the vehicle going out of the temporary intersection is currently traveling with reference to the newest positioning result stored in the temporary storage memory 18 (in step ST128). The intersection determining means then checks to see whether or not the outgoing road acquired in step ST128 is a road included in the new road information (in step ST129).

When, in this step ST129, determining that the outgoing road is not a road included in the new road information, the intersection determining means ends the processing without setting the configuration of the temporary intersection since both the incoming road via which the vehicle entered the temporary intersection and the outgoing road via which the vehicle went out of the temporary intersection are roads included in the map information. On the other hand, when, in step ST129, determining that the outgoing road is a road included in the new road information, the intersection determining means recognizes that the temporary intersection is a normal intersection, and changes a temporary intersection flag for the temporary intersection to OFF (in step ST130) since it is clear that the vehicle entered the temporary intersection via a road included in the map information, and went out of the temporary intersection toward another road included in the new road information. After that, the intersection determining means ends the processing.

When, in above-mentioned step ST127, determining that the incoming road via which the vehicle entered the temporary intersection is not a road included in the map information (in this case, the incoming road via which the vehicle entered the temporary intersection is included in the new road information), the intersection determining means acquires information about a road which the vehicle going out of the temporary intersection is currently traveling with reference to the newest positioning result stored in the temporary storage memory 18 (in step ST131). The intersection determining means then checks to see whether or not the road is a road included in the map information (in step ST132).

When, in this step ST132, determining that the acquired road is a road included in the map information, the intersection determining means recognizes that the temporary intersection is a normal intersection, and advances the sequence to step ST130 since it is clear that the vehicle entered the temporary intersection via a road included in the new road information, and went out of the temporary intersection toward another road included in the map information.

On the other hand, when, in step ST132, determining that the acquired road is a road which is not included in the map information, the intersection determining means also recognizes that the outgoing road is a road included in the new road information, and therefore both the incoming and outgoing roads are roads included in the new road information. The intersection determining means then checks to see whether the outgoing road included in the new road information differs from the incoming road included in the new road information (in step ST133). When determining that they differ from each other, the intersection determining means recognizes that the temporary intersection is a normal intersection, and then moves the sequence to step ST130. On the other hand, when determining that they match with each other, the intersection determining means ends the processing since it cannot determine whether or not the temporary intersection is a normal intersection.

As previously explained, when the vehicle entered a temporary intersection from a new road, and went out of the temporary intersection toward an existing road, the map information processing apparatus according to embodiment 6 of the present invention can automatically determine that the temporary intersection is a normal grade crossing. Furthermore, when the vehicle entered a temporary intersection from an existing road, and went out of the temporary intersection toward a new road, the map information processing apparatus can automatically determine that the temporary intersection is a normal grade crossing. In addition, when the vehicle entered a temporary intersection from a new road, and went out of the temporary intersection toward another new road, the map information processing apparatus can automatically determine that the temporary intersection is a normal grade crossing.

Embodiment 7

A map information processing apparatus according to embodiment 7 of the present invention is so constructed as to set the configuration of a temporary intersection based on image information which is obtained by capturing an image of surroundings of a vehicle in which the map information processing apparatus is mounted with an image capturing device.

Figure 25:
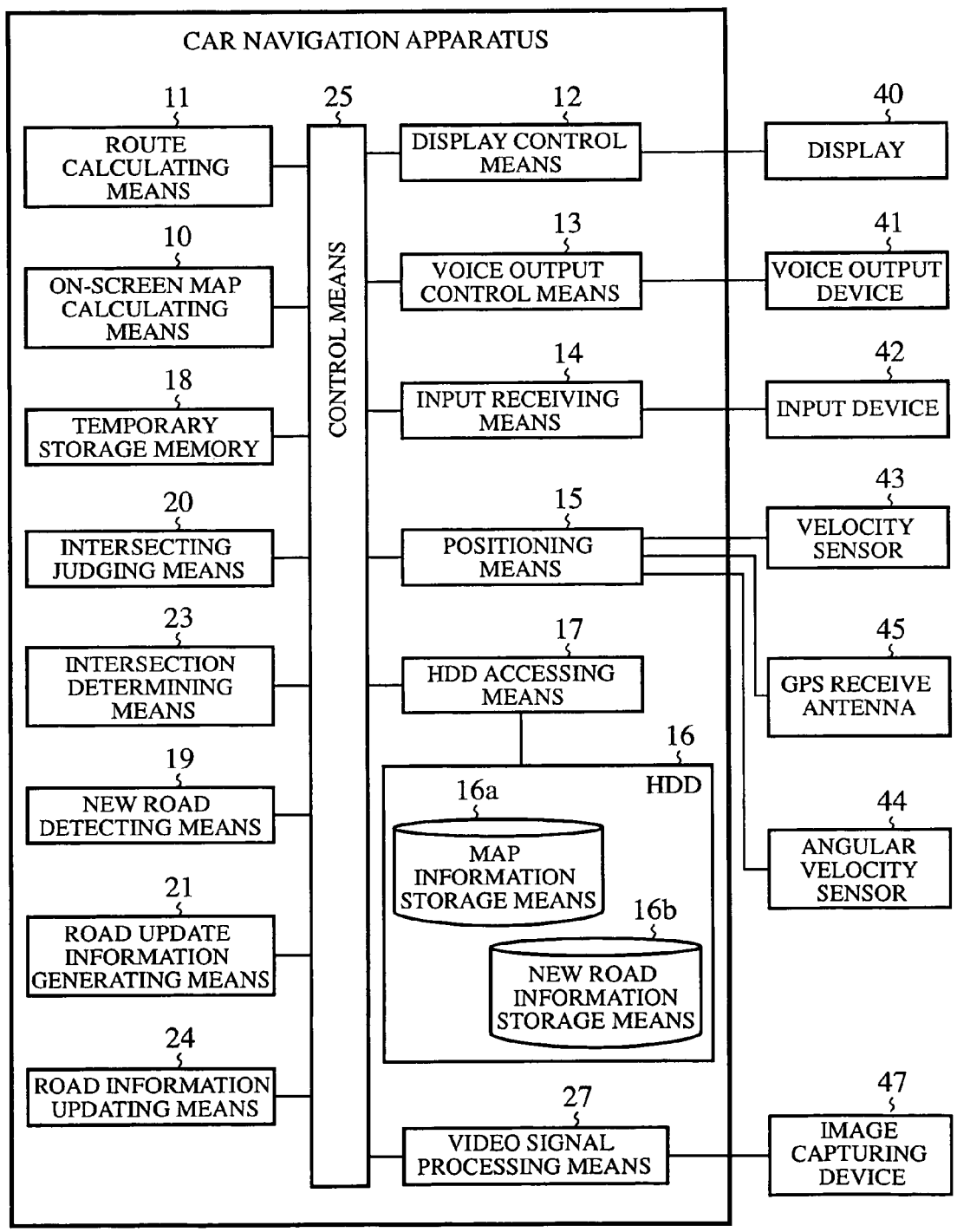
FIG. 25 is a block diagram showing the structure of a map information processing apparatus in accordance with embodiment 7 of the present invention.

FIG. 25 is a block diagram showing the structure of the map information processing apparatus according to embodiment 7 of the present invention. This map information processing apparatus includes the image capturing device 47, such as a camera, in addition to the components of the map information processing apparatus according to embodiment 1 shown in FIG. 1, and a car navigation apparatus in which the intersection inquiring means 22 is removed from the components of the car navigation apparatus according to embodiment 1 and a video signal processing means 27 is additionally disposed. The operation of an intersection determining means 23 differs from that of the map information processing apparatus according to embodiment 1.

The image capturing device 47 captures an image of surroundings of the vehicle in which the map information processing apparatus is mounted. A video signal acquired by this image capturing device 47 is sent to the video signal processing means 27. The video signal processing means 27 processes the video signal sent thereto from the image capturing device 47, and outputs the processed video signal as video information showing the circumstances of a road which the vehicle is traveling.

Figure 26:
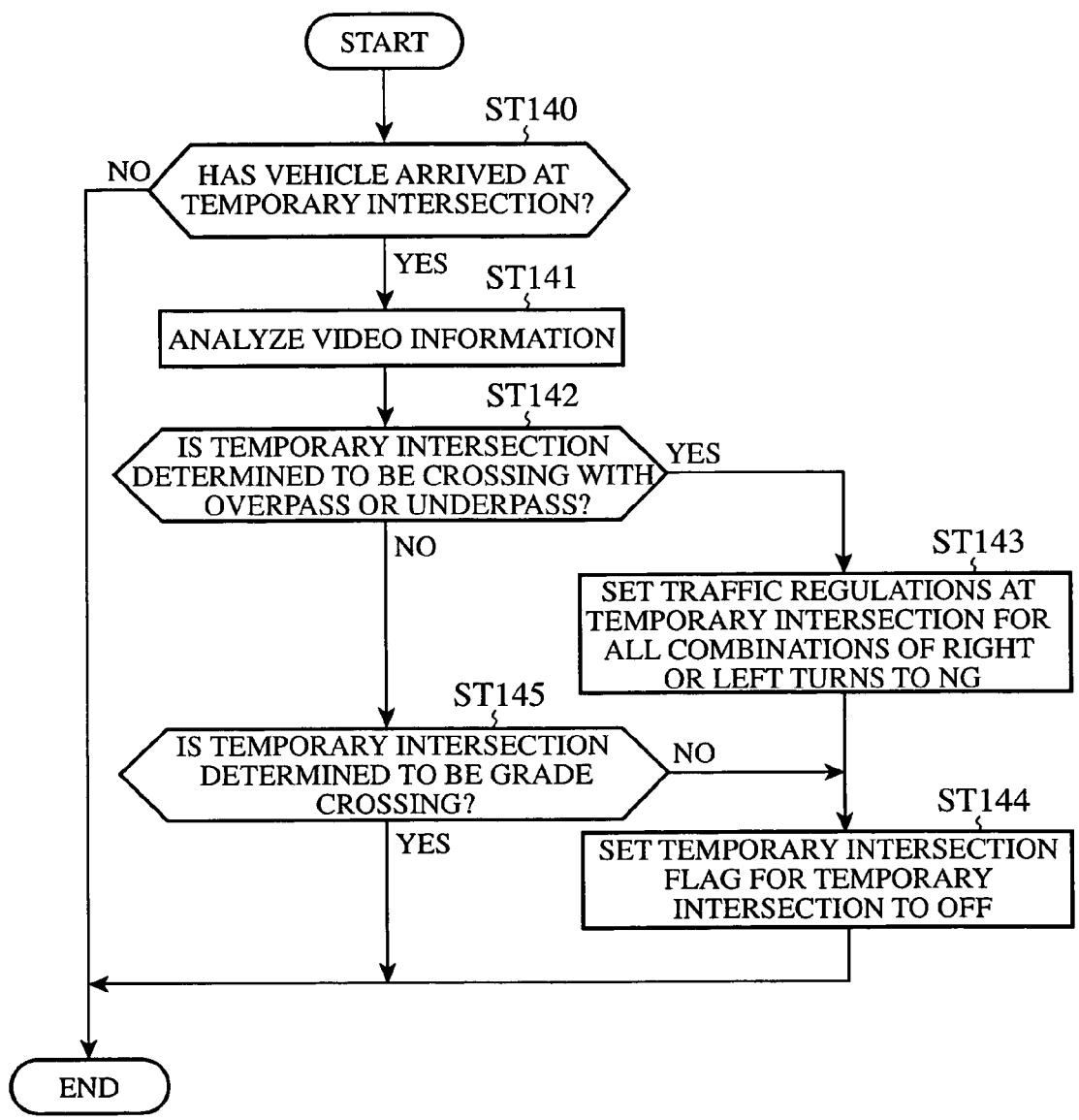
FIG. 26 is a flow chart showing a process of setting the configuration of a temporary intersection which is carried out by the map information processing apparatus in accordance with embodiment 7 of the present invention.

Next, a process of setting the configuration of a temporary intersection which is carried out by the intersection determining means 23 of the map information processing apparatus according to embodiment 7 of the present invention will be explained with reference to a flow chart shown in FIG. 26.

In the process of setting the configuration of a temporary intersection, the intersection determining means checks to see whether the vehicle in which the map information processing apparatus is mounted has arrived at a temporary intersection first (in step ST140). When determining that the vehicle has not arrived at any temporary intersection, the intersection determining means ends the processing. On the other hand, when determining that the vehicle has arrived at a temporary intersection, the intersection determining means analyzes the video information from the video signal processing means in order to determine whether or not the temporary intersection is a crossing with an overpass or underpass (in step ST141). The intersection determining means then checks to see whether the analysis result obtained in step ST141 shows that the temporary intersection is a crossing with an overpass or underpass (in step ST142).

When, in this step ST142, determining that the temporary intersection is a crossing with an overpass or underpass, the intersection determining means changes traffic regulations information for the temporary intersection in question from OK to NG for all combinations of right and left turns (in step ST143) The intersection determining means then changes a temporary intersection flag for the temporary intersection to OFF (in step ST144). After that, the intersection determining means ends the processing. On the other hand, when, in step ST142, determining that the temporary intersection is not a crossing with an overpass or underpass, the intersection determining means further checks to see whether the analysis result obtained in step ST141 shows that the temporary intersection is a grade crossing (in step ST145). When determining that the temporary intersection is a grade crossing, the intersection determining means moves the sequence to step ST144. On the other hand, when determining that the temporary intersection is not a grade crossing, the intersection determining means determines that the configuration of the temporary intersection is unknown and ends the processing.

As explained above, the map information processing apparatus according to embodiment 7 of the present invention can automatically determine whether a temporary intersection is a grade crossing or a crossing with an overpass or underpass from an image of surroundings of the vehicle from the image capturing device 47.

Embodiment 8

A map information processing apparatus according to embodiment 8 of the present invention is so constructed as to set the configuration of a temporary intersection based on information indicating whether or not a vehicle in which the map information processing apparatus is mounted is traveling a toll road.

Figure 27:
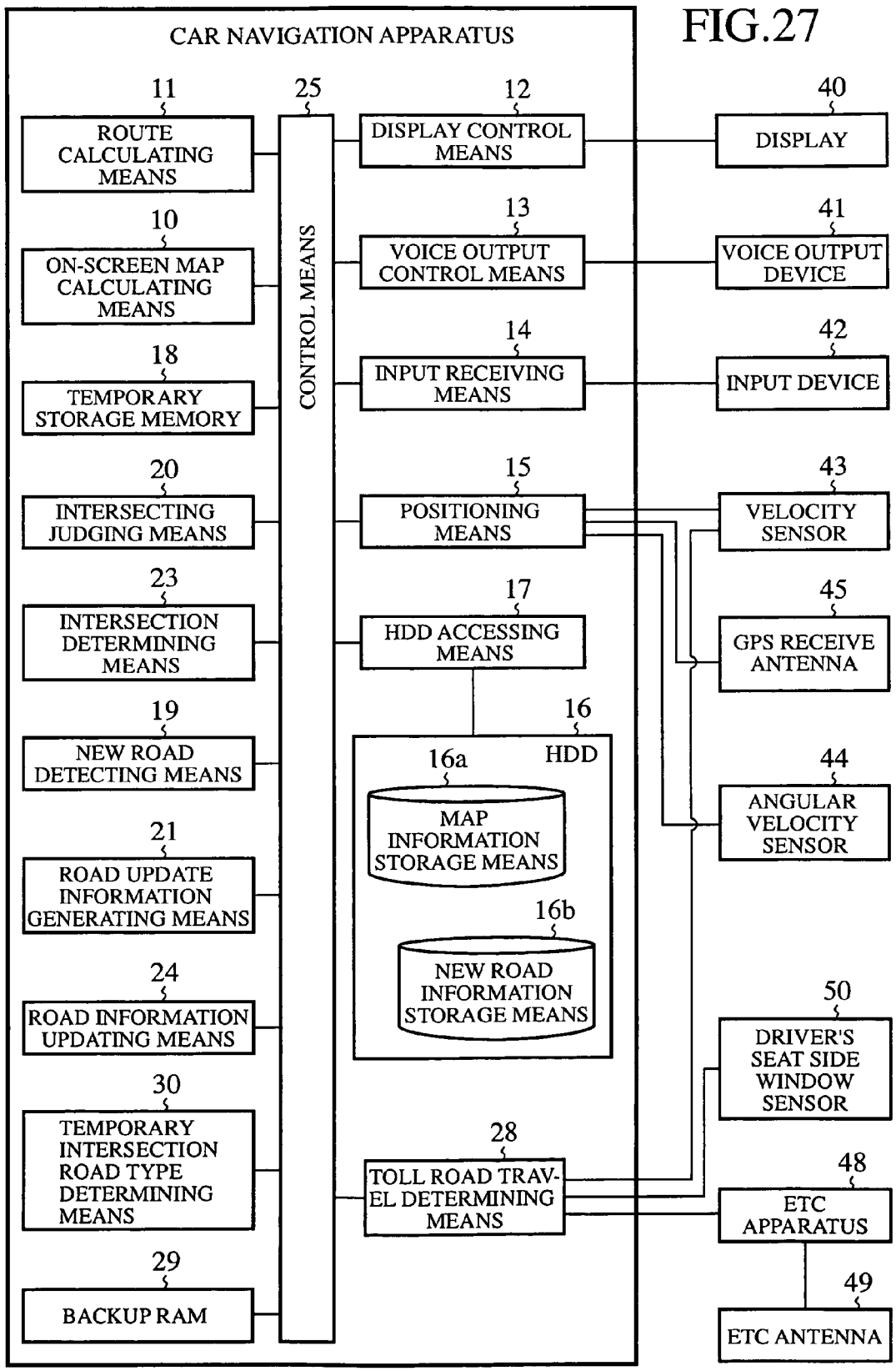
FIG. 27 is a block diagram showing the structure of a map information processing apparatus in accordance with embodiment 8 of the present invention.

FIG. 27 is a block diagram showing the structure of the map information processing apparatus according to embodiment 1 shown in FIG. 1 of the present invention. This map information processing apparatus includes an ETC (Electronic Toll Collection System) apparatus 48, an ETC antenna 49, and a driver's seat side window sensor 50, in addition to the components of the map information processing apparatus according to embodiment 7 shown in FIG. 25, and a car navigation apparatus in which a toll road travel determining means 28, a nonvolatile backup RAM 29, and a temporary intersection road type determining means 30 are additionally disposed. The operation of an intersection determining means 23 differs from that of the map information processing apparatus according to embodiment 7.

The toll road travel determining means 28 determines whether or not the vehicle is traveling a toll road, and, when determining that the vehicle is traveling a toll road, stores information indicating the fact in a temporary storage memory 18. The toll road travel determining means determines whether or not the vehicle is traveling a toll road using the following method. In other words, when determining that the vehicle has passed through a toll road entrance and has not reached a toll road outlet yet, the toll road travel determining means determines that the vehicle is traveling a toll road, and, after detecting that the vehicle has passed through a toll road entrance, stores information indicating that the vehicle is traveling a toll road in the temporary storage memory 18. After detecting that the vehicle has passed through a toll road outlet, the toll road travel determining means deletes the information indicating that the vehicle is traveling a toll road from the temporary storage memory 18.

The toll road travel determining means 28 detects whether or not the vehicle has passed through a toll road entrance by using one of the two following methods. The first method of detecting whether or not the vehicle has passed through a toll road entrance is as follows. In other words, when the moving object (i.e., the vehicle) equipped with the ETC antenna 49 and the ETC apparatus 48 enters a toll road, the ETC apparatus 48 sends and receives communication information indicating that the vehicle is entering the toll road via the ETC antenna 49 to and from an ETC ground apparatus (not shown). The toll road travel determining means 28 can detect that the vehicle has passed through a toll road entrance when acquiring this communication information.

The second method of detecting whether or not the vehicle has passed through a toll road entrance is as follows. In other words, the toll road travel determining means acquires road type information indicating the type of a road which the vehicle is currently traveling from a positioning result obtained by a positioning means 15. When the acquired road type changes from a non-toll road type (a national highway, a prefectural road, a principal prefectural road, etc.) to a toll road type, the toll road travel determining means 28 detects that the vehicle has passed through a toll road entrance.

The toll road travel determining means 28 detects whether or not the vehicle has passed through a toll road outlet by using one of the three following methods. The first method of detecting whether or not the vehicle has passed through a toll road outlet is as follows. In other words, when the information indicating that the vehicle is traveling a toll road is stored in the temporary storage memory 18, the ETC apparatus 48 communicates, via the ETC antenna 49, with an ETC ground apparatus at a toll road outlet, and makes a fee payment. The toll road travel determining means 28 acquires information about the fee payment from the ETC apparatus 48, and detects that the vehicle has passed through a toll road outlet.

The second method of detecting whether or not the vehicle has passed through a toll road outlet is as follows. In other words, when detecting that the information indicating that the vehicle is traveling a toll road is stored in the temporary storage memory 18, and then detecting that an ETC card inserted into the ETC apparatus 48 has been extracted, a state in which the velocity is zero or extremely close to zero lasts for a fixed time interval using the velocity sensor 43, and a window is open using the driver's seat side window sensor 50, the toll road travel determining means 28 detects that the vehicle has passed through a toll road outlet.

The third method of detecting whether or not the vehicle has passed through a toll road outlet is as follows. In other words, the toll road travel determining means acquires road type information indicating the type of a road which the vehicle is currently traveling from the positioning result obtained by the positioning means 15. When the acquired road type changes from a toll road type to a non-toll road type, the toll road travel determining means 28 detects that the vehicle has passed through a toll road outlet.

Next, a process of stopping the map information processing apparatus when the vehicle in which the map information processing apparatus is mounted causes an engine thereof to stop at a service area or the like in a state in which the information indicating that the vehicle is traveling a toll road is stored in the temporary storage memory 18 will be explained.

Figure 28:
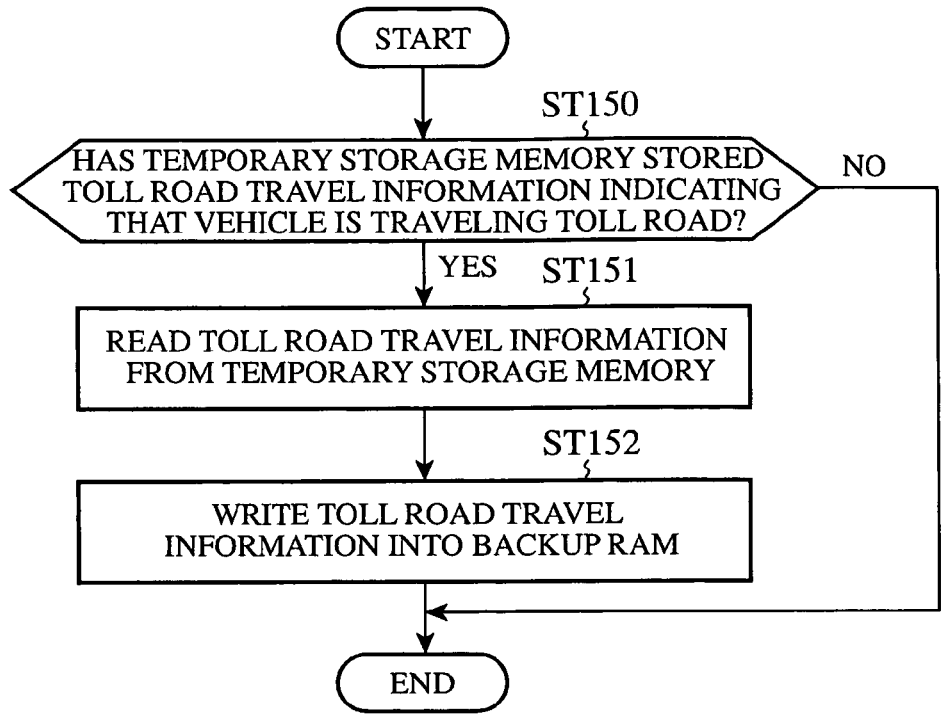
FIG. 28 is a flow chart showing an end process at a time when the map information processing apparatus in accordance with embodiment 8 of the present invention is powered off.

FIG. 28 is a flow chart showing an end process at a time when the map information processing apparatus is powered off. When this end process is started, the map information processing apparatus checks to see whether or not the information indicating that the vehicle is traveling a toll road is stored in the temporary storage memory 18 first (in step ST150). When determining that the information indicating that the vehicle is traveling a toll road is not stored in the temporary storage memory 18, the map information processing apparatus ends the end process.

On the other hand, when, in step ST150, determining that the information indicating that the vehicle is traveling a toll road is stored in the temporary storage memory 18, the map information processing apparatus reads the information stored in the temporary storage memory 18 (in step ST151). The map information processing apparatus then stores the information indicating that the vehicle is traveling a toll road in the backup RAM 29 (in step ST152). After that, the map information processing apparatus ends the end process.

Figure 29:
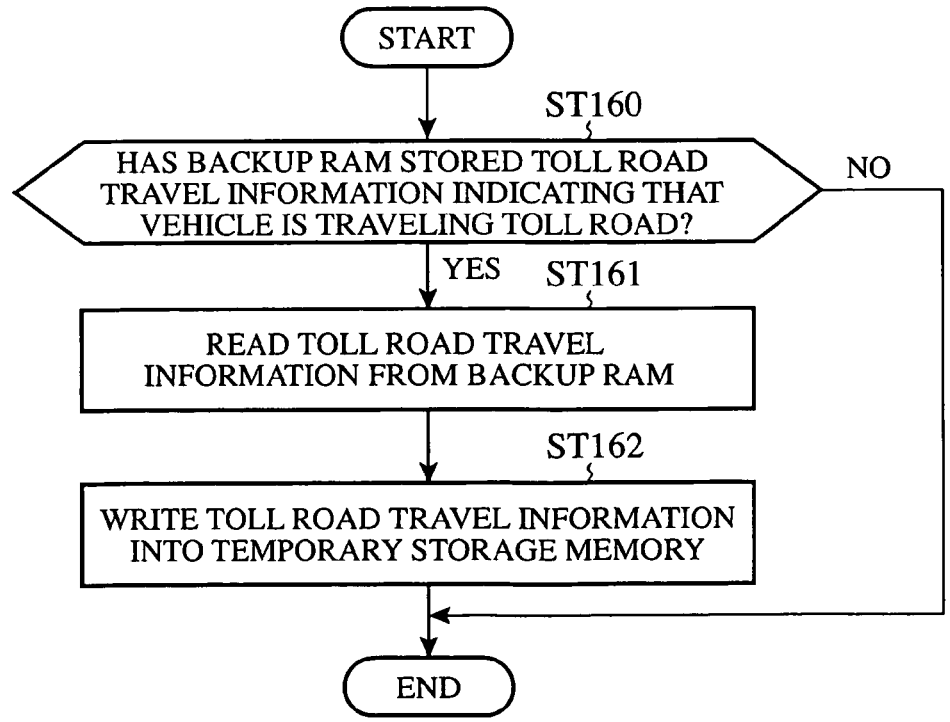

FIG. 29 is a flow chart showing a start process at a time when the map information processing apparatus is powered on. When this start process is started, the map information processing apparatus checks to see whether or not the information indicating that the vehicle is traveling a toll road is stored in the backup RAM 29 first (step ST160). When determining that the information indicating that the vehicle is traveling a toll road is not stored in the backup RAM 29, the map information processing apparatus ends the start process.

On the other hand, when, in step ST160, determining that the information indicating that the vehicle is traveling a toll road is stored in the backup RAM 29, the map information processing apparatus reads the information stored in the backup RAM 29 (in step ST161). The map information processing apparatus then stores the information indicating that the vehicle is traveling a toll road in the temporary storage memory 18 (in step ST162). After that, the map information processing apparatus ends the start process.

By carrying out these end and start processes, the map information processing apparatus can also support a case where it is stopped when the vehicle in which the map information processing apparatus is mounted causes an engine thereof to stop at a service area or the like in a state in which the information indicating that the vehicle is traveling a toll road is stored in the temporary storage memory 18.

Next, a process of setting the configuration of a temporary intersection which is carried out by the intersection determining means 23 of the map information processing apparatus according to embodiment 8 of the present invention will be explained with reference to a flow chart shown in FIGS. 30 and 31.

In this process of setting the configuration of a temporary intersection, the intersection determining means checks to see whether the vehicle in which the map information processing apparatus is mounted has arrived at a temporary intersection first (in step ST170). When determining that the vehicle has not arrived at any temporary intersection, the intersection determining means ends the processing. On the other hand, when determining that the vehicle has arrived at a temporary intersection, the intersection determining means then acquires the information indicating that the vehicle is traveling a toll road from the temporary storage memory 18 (in step ST171).

The intersection determining means then checks to see whether it has obtained the information indicating that the vehicle is traveling a toll road (in step ST172). When the intersection determining means determines that it has obtained the information indicating that the vehicle is traveling a toll road, it recognizes that the temporary intersection is a crossing with an overpass or underpass since the vehicle is traveling a toll road. The intersection determining means then changes traffic regulations information for the temporary intersection in question from OK to NG for all combinations of right and left turns (in step ST173). The intersection determining means then changes a temporary intersection flag for the temporary intersection to OFF (in step ST174). After that, the intersection determining means ends the processing.

When the intersection determining means, in above-mentioned step ST172, determines that it could not obtain the information indicating that the vehicle is traveling a toll road, it carries out intersecting-road type determining processing (in step ST175). This intersecting-road type determining processing is carried out by the temporary intersection road type determining means 30 to determine the road types of roads which intersect at the temporary intersection. The details of this intersecting-road type determining processing will be explained below.

The intersection determining means then checks to see whether or not at least one of the roads whose road types are determined in step ST175 is of toll road type (in step ST176). When determining that at least one of the roads whose road types are determined in step ST175 is of toll road type, the intersection determining means recognizes that the temporary intersection in question is a crossing with an overpass or underpass, and then shifts the sequence to step ST173. On the other hand, when determining that at least one of the roads whose road types are determined in step ST175 is not of toll road type, i.e., determining that any roads whose road types are toll road ones do not intersect at the temporary intersection in question, the intersection determining means ends the processing.

Figure 30:
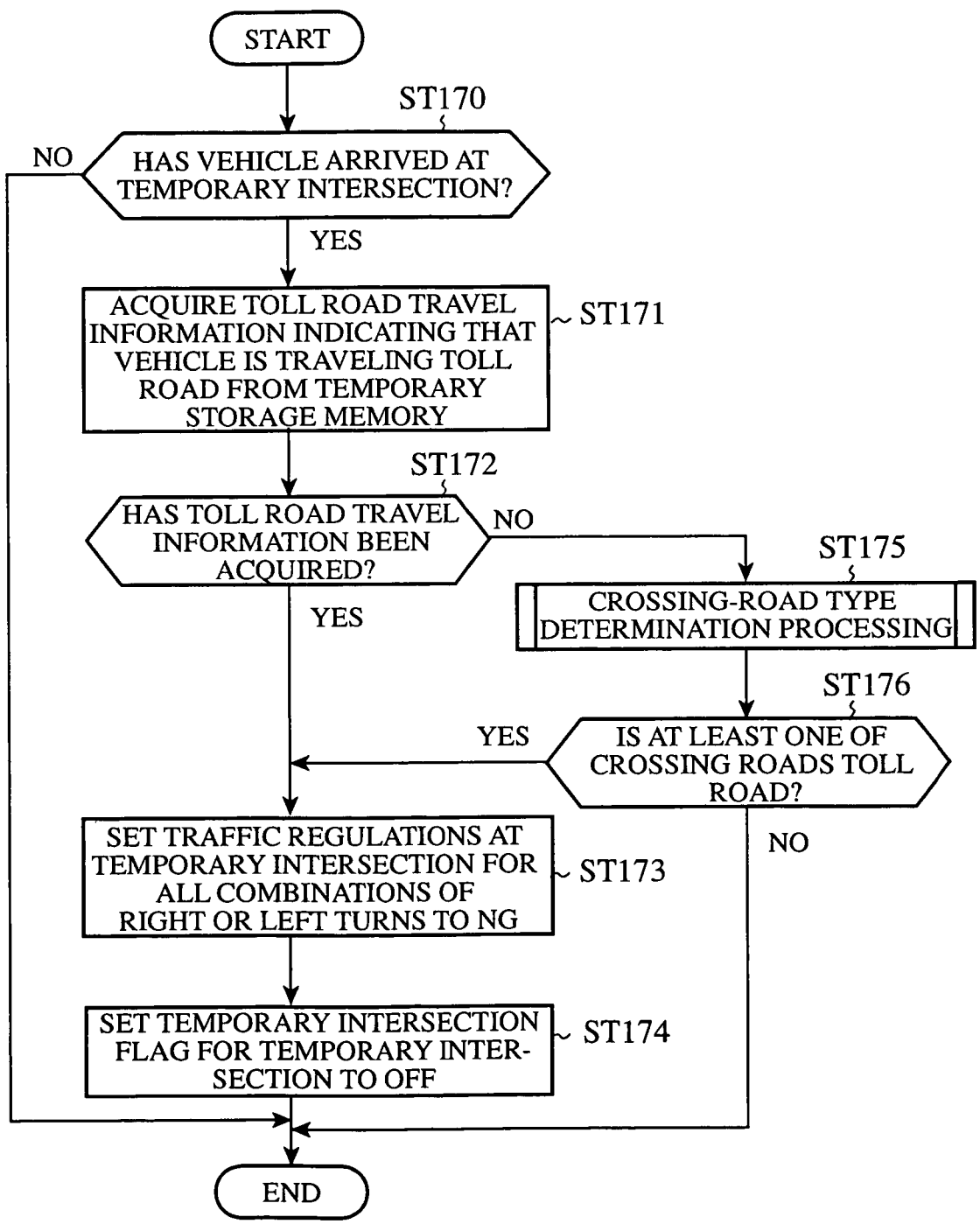
FIG. 30 is a flow chart showing a process of setting the configuration of a temporary intersection which is carried out by the map information processing apparatus in accordance with embodiment 8 of the present invention.
Figure 31:
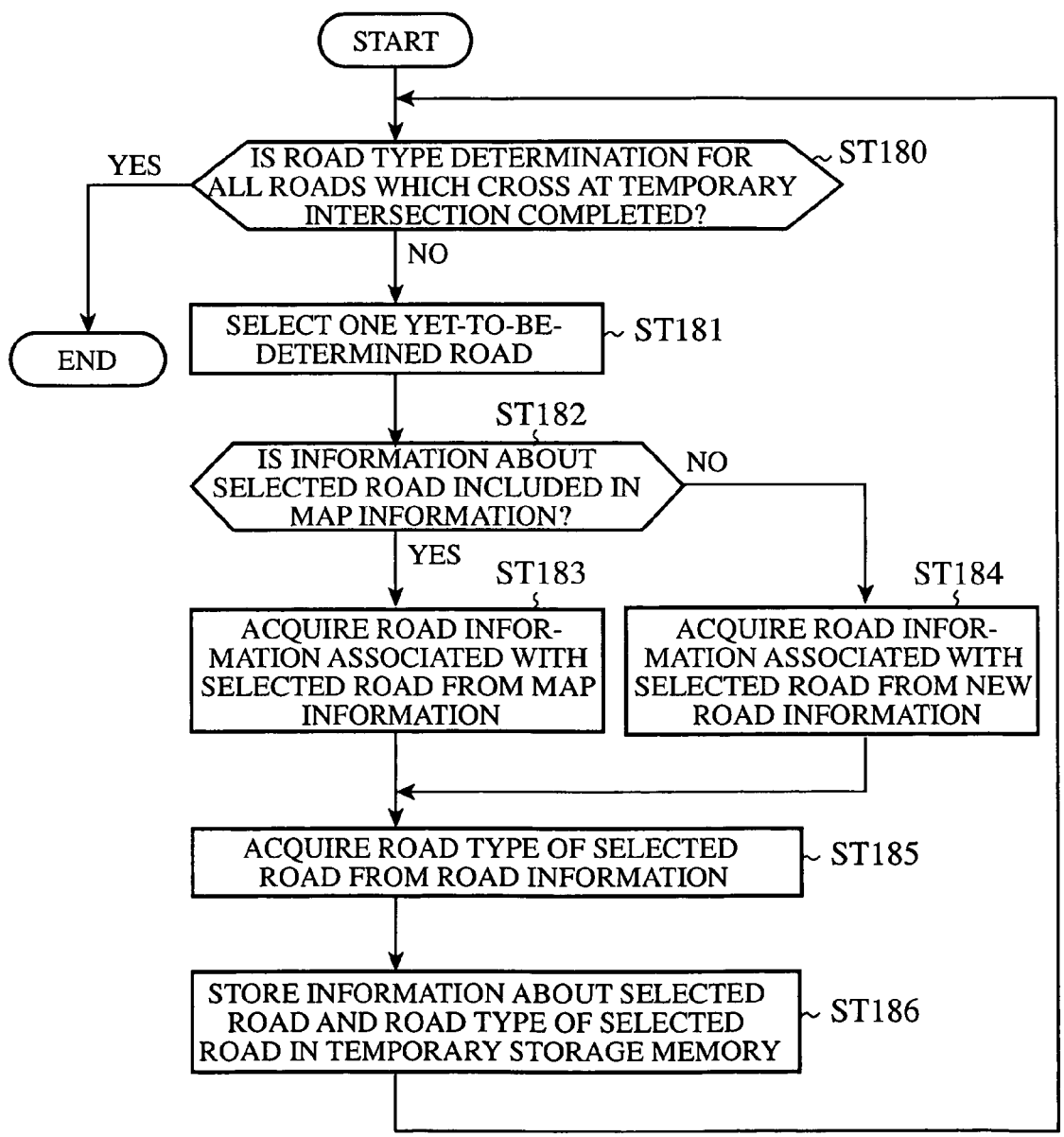
FIG. 31 is a flow chart showing the details of a process of determining the type of a road which crosses at a temporary intersection, which is carried out in step ST175 of FIG. 30.

FIG. 31 is a flow chart showing the details of the intersecting-road type determining processing carried out in step ST175 of FIG. 30. This intersecting-road type determining processing is carried out by the temporary intersection road type determining means 30.

In the intersecting-road type determination processing, the temporary intersection road type determining means checks to see whether it has already completed the determination of the road type for all the roads which intersect at the temporary intersection first (in step ST180). When the temporary intersection road type determining means determines that it has already completed the determination of the road type for all the roads which intersect at the temporary intersection, it ends the intersecting-road type determination processing. On the other hand, when the temporary intersection road type determining means, in step ST180, determines that it has not completed the determination of the road type for all the roads which intersect at the temporary intersection yet, that is, it determines that one or more roads whose road types are not determined remain, it selects one road from the one or more yet-to-be-determined roads (in step ST181). The temporary intersection road type determining means then checks to see whether or not road information about the selected road is included in the map information (in step ST182).

When, in this step ST182, determining that road information about the selected road is included in the map information, the temporary intersection road type determining means acquires the road information from the map information (in step ST183). After that, the temporary intersection road type determining means advances the sequence to step ST185. On the other hand, when, in this step ST182, determining that road information about the selected road is not included in the map information, that is, determining that road information about the selected road is included in the new road information, the temporary intersection road type determining means acquires the road information from the new road information (in step ST184). After that, the temporary intersection road type determining means advances the sequence to step ST185.

The temporary intersection road type determining means, in step ST185, acquires the road type of the selected road from the acquired road information. The temporary intersection road type determining means then stores a set of the information about the selected road and the road type in the temporary storage memory 18 (in step ST186). After that, the temporary intersection road type determining means returns the sequence to step ST180 in which it repeats the above-mentioned processing.

As previously explained, when the vehicle is traveling a highway which intersects at a temporary intersection, the map information processing apparatus according to embodiment 8 of the present invention can determine that the temporary intersection is a crossing with an overpass or underpass. The map information processing apparatus can also determine that any temporary intersection which exists in a highway is a crossing with an overpass or underpass automatically.

As previously mentioned, the map information processing apparatus according to above-mentioned embodiment 8 is so constructed as to store information indicating that the vehicle is traveling a toll road, which is stored in the temporary storage memory 18, in the backup RAM 29 when the map information processing apparatus is powered off, and to read the information from the backup RAM 29 and restore it into the temporary storage memory 18 when the map information processing apparatus is powered on. In a variant, an HDD 16 can be used instead of the backup RAM 29.

Embodiment 9

A map information processing apparatus according to embodiment 9 of the present invention is so constructed as to set the configuration of a temporary intersection based on information indicating that a vehicle in which the map information processing apparatus is mounted has traveled an underpass.

Figure 32:
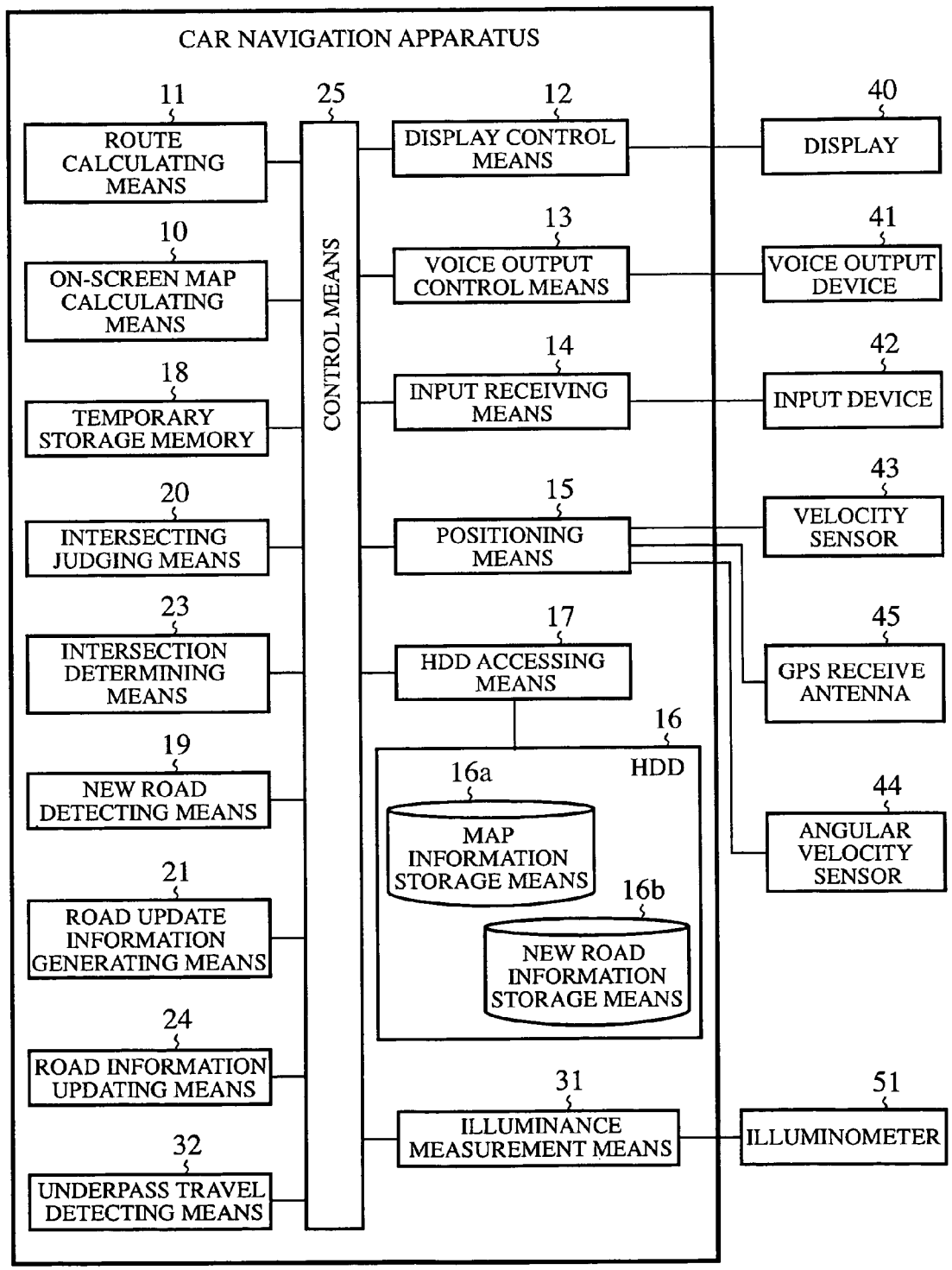
FIG. 32 is a block diagram showing the structure of a map information processing apparatus in accordance with embodiment 9 of the present invention.

FIG. 32 is a block diagram showing the structure of the map information processing apparatus according to embodiment 9 of the present invention. This map information processing apparatus includes an illuminometer 51, in addition to the components of the map information processing apparatus according to embodiment 1 as shown in FIG. 1, and a car navigation apparatus in which an illuminance measurement means 31 and an underpass travel detecting means 32 are additionally disposed. The operation of an intersection determining means 23 differs from that of the map information processing apparatus according to embodiment 1.

The illuminometer 51 detects the amount of light applied to the moving object (i.e., the vehicle). The amount of light detected by this illuminometer 51 is sent to the illuminance measurement means 31. The illuminance measurement means 31 measures the amount of light applied to the moving object using the illuminometer 51 connected thereto. The underpass travel detecting means 32 detects whether or not the moving object has passed through an underpass. The details of this underpass travel detecting means 32 will be mentioned below.

Next, a process of setting the configuration of a temporary intersection which is carried out by the intersection determining means 23 of the map information processing apparatus according to embodiment 9 of the present invention will be explained with reference to a flow chart shown in FIGS. 33 and 34.

In the process of setting the configuration of a temporary intersection, the intersection determining means checks to see whether or not the vehicle in which the map information processing apparatus is mounted is traveling a road connected to a temporary intersection toward the temporary intersection first (in step ST190). When determining that the vehicle is not traveling toward any temporary intersection, the intersection determining means ends the processing. On the other hand, when determining that the vehicle is not traveling toward a temporary intersection, the intersection determining means enters a state in which it waits for the positioning of the vehicle (in step ST191).

The intersection determining means then checks to see whether the vehicle in which the map information processing apparatus is mounted gets near the temporary intersection (in step ST192). To be more specific, the intersection determining means checks to see whether the distance between the current position of the vehicle, which is obtained by a positioning means 15, and the temporary intersection falls within a predetermined distance. When, in this step ST192, determining that the vehicle does not get near the temporary intersection, the intersection determining means returns the sequence to step ST191 in which it waits for the positioning of the vehicle again. On the other hand, when, in step ST192, determining that the vehicle gets near the temporary intersection, the intersection determining means carries out underpass travel determining processing (in step ST193). This underpass travel determining processing is carried out by the underpass travel detecting means 32 to detect whether or not an elevated structure exists above the vehicle. The details of this underpass travel determining processing will be mentioned below.

The underpass travel detecting means then checks to see whether the vehicle has passed through an underpass, that is, whether the vehicle has passed under an elevated structure (in step ST194). When determining that the vehicle has not passed through an underpass, the underpass travel detecting means ends the processing. On the other hand, when, in step ST194, determining that the vehicle has passed through an underpass, the underpass travel detecting means changes traffic regulations information for the temporary intersection in question from OK to NG for all combinations of right and left turns (in step ST195). The underpass travel detecting means then changes a temporary intersection flag for the temporary intersection to OFF (in step ST196). After that, the underpass travel detecting means ends the processing.

Figure 33:
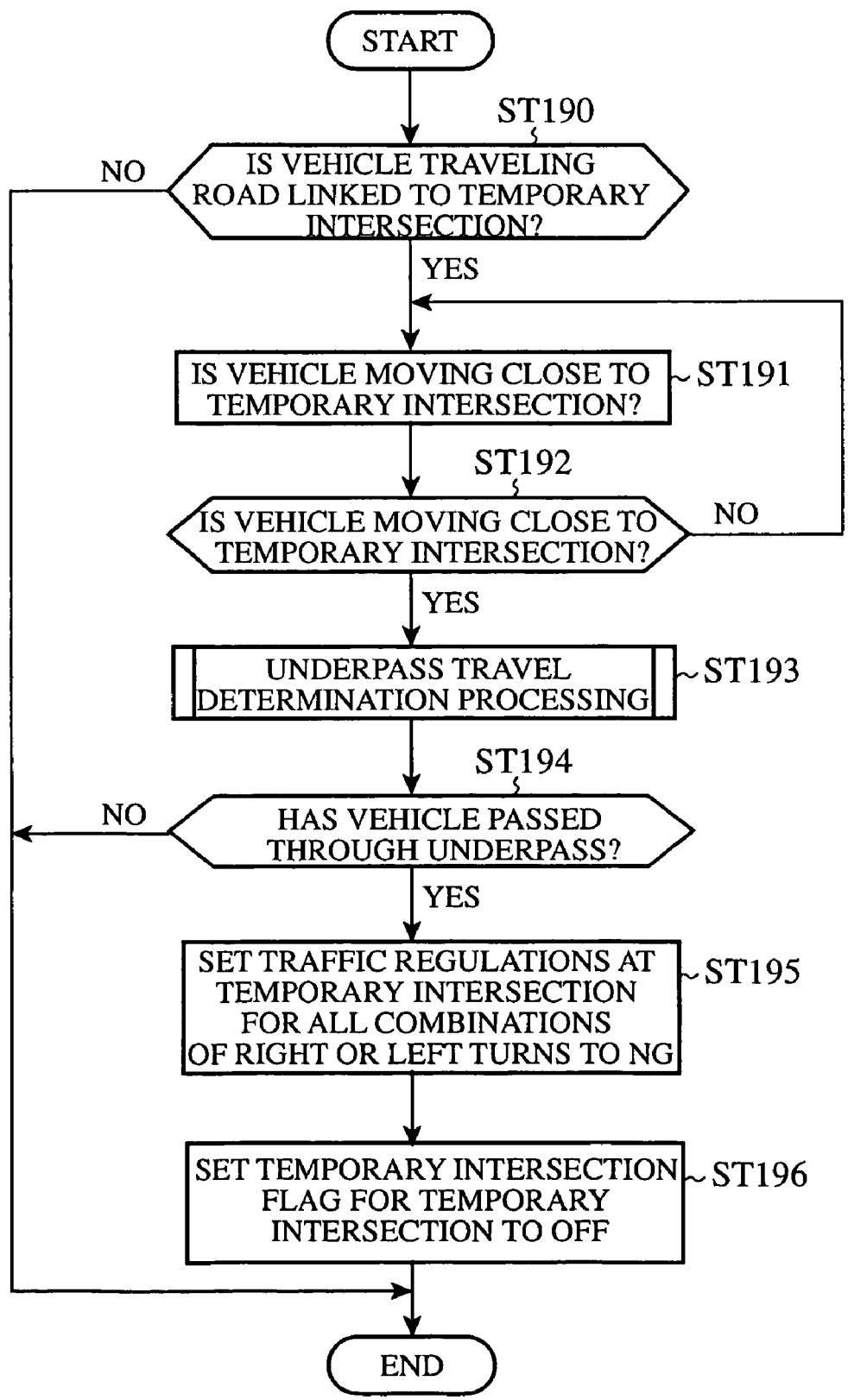
FIG. 33 is a flow chart showing a process of setting the configuration of a temporary intersection which is carried out by the map information processing apparatus in accordance with embodiment 9 of the present invention.
Figure 34:
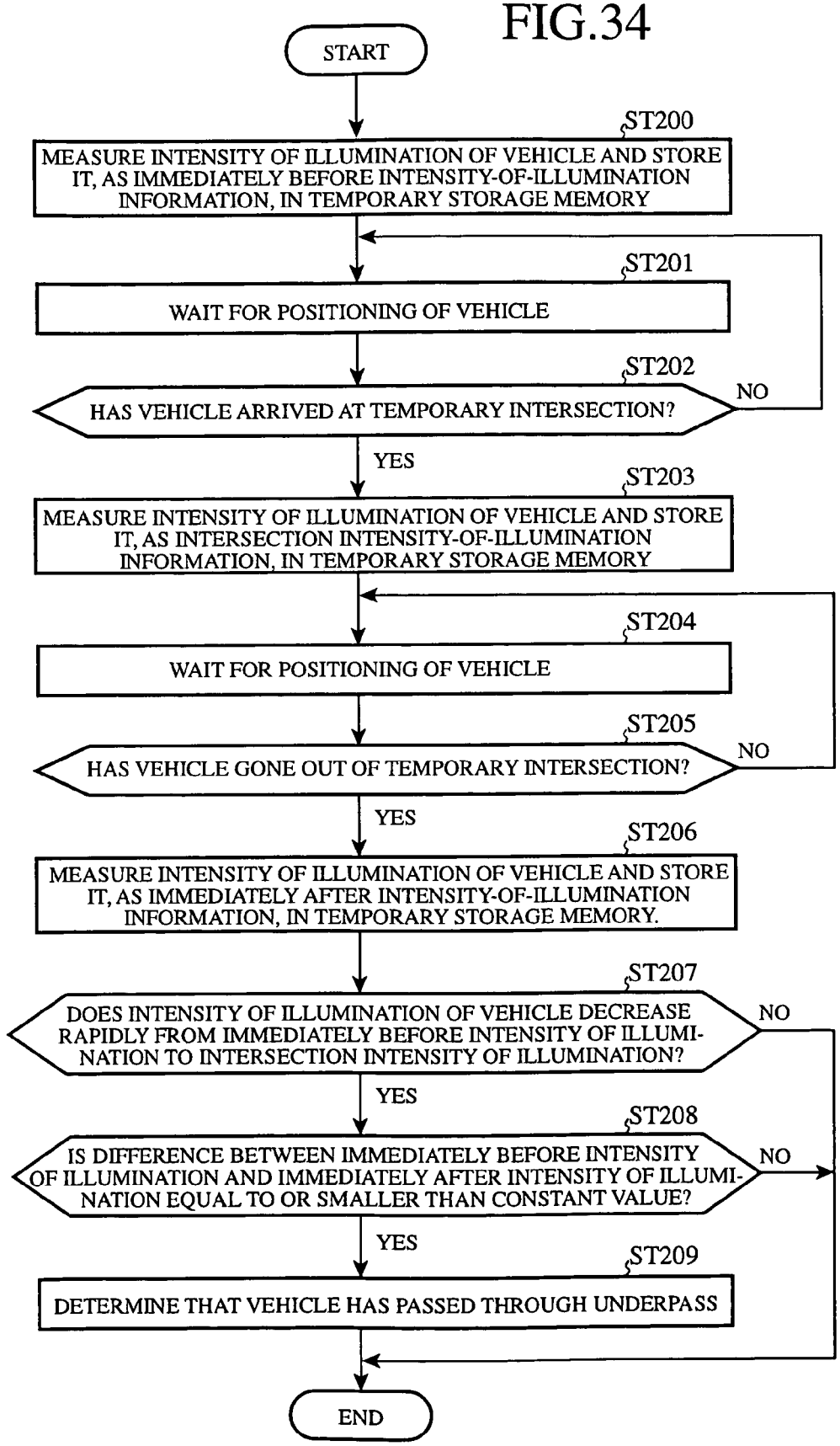
FIG. 34 is a flow chart showing the details of underpass travel determination processing which is carried out in step ST193 of FIG. 33.

FIG. 34 is a flow chart showing the details of the underpass travel determining processing which is carried out in step ST193 of FIG. 33. This underpass travel determining processing is carried out by the underpass travel detecting means 32.

In the underpass travel determining processing, the amount of light applied to the vehicle is measured by the illuminance measurement means 31 first, and is stored in a temporary storage memory 18 as immediately before illuminance information (in step ST200). The underpass travel detecting means then enters a state in which it waits for the positioning of the vehicle by the positioning means 15 (in step ST201). The underpass travel detecting means checks to see whether the vehicle in which the map information processing apparatus is mounted has arrived at a temporary intersection (in step ST202). When determining that the vehicle has not arrived at any temporary intersection, the underpass travel detecting means returns the sequence to step ST201 in which it waits for the positioning of the vehicle again. On the other hand, when, in step ST202, determining that the vehicle has arrived at a temporary intersection, the underpass travel detecting means measures the amount of light applied to the vehicle using the illuminance measurement means 31, and then stores it, as intersection illuminance information, in the temporary storage memory 18 (in step ST203).

The underpass travel detecting means then enters a state in which it waits for the positioning of the vehicle by the positioning means 15 (in step ST204). The underpass travel detecting means checks to see whether the vehicle in which the map information processing apparatus is mounted has gone out of the temporary intersection (in step ST205). When determining that the vehicle has not gone out of the temporary intersection yet, the underpass travel detecting means returns the sequence to step ST204 in which it waits for the positioning of the vehicle again. On the other hand, when, in step ST205, determining that the vehicle has gone out of the temporary intersection, the underpass travel detecting means measures the amount of light applied to the vehicle using the illuminance measurement means 31, and stores it, as immediately after illuminance information, in the temporary storage memory 18 (in step ST206).

After that, the underpass travel detecting means detects whether or not the vehicle has passed under an elevated structure from the three pieces of illuminance information stored in the temporary storage memory 18. In other words, the underpass travel detecting means compares the immediately before illuminance information with the intersection illuminance information so as to check to see whether the amount of light applied to the vehicle has decreased rapidly from the immediately before illuminance which was measured immediately before the vehicle entered the intersection to the intersection illuminance which was measured when the vehicle arrived at the intersection (in step ST207). When determining that the amount of light applied to the vehicle has not decreased rapidly from the immediately before illuminance to the intersection illuminance, the underpass travel detecting means ends the processing. On the other hand, when, in step ST207, determining that the amount of light applied to the vehicle has decreased rapidly from the immediately before illuminance to the intersection illuminance, the underpass travel detecting means compares the immediately before illuminance information with the immediately after illuminance information so as to check to see whether or not the difference between the immediately before illuminance which was measured immediately before the vehicle entered the intersection and the immediately after illuminance which was measured immediately after the vehicle passed through the intersection is equal to or less than a constant value (in step ST208).

When, in this step ST208, determining that the illuminance difference is not equal to or less than the constant value, the underpass travel detecting means ends the processing. On the other hand, when determining that the illuminance difference is equal to or less than the constant value, the underpass travel detecting means determines that an elevated structure exists at the intersection, and also determines that the vehicle has passed through an underpass (in step ST209). After that, the underpass travel detecting means 32 ends the underpass travel determining processing.

As explained above, when an elevated road is running over an temporary intersection, the map information processing apparatus according to embodiment 9 of the present invention can determine that the temporary intersection is a crossing with an overpass or underpass automatically. The map information processing apparatus can also determine that the vehicle has passed under an elevated structure by detecting a change in the amount of light applied to the vehicle at the temporary intersection, and can determine that the temporary intersection is a crossing with an overpass or underpass automatically.

Embodiment 10

A map information processing apparatus according to embodiment 10 of the present invention is so constructed as to set the configuration of a temporary intersection based on whether or not it can capture signals from GPS satellites and a quasi-zenith satellite.

Figure 35:
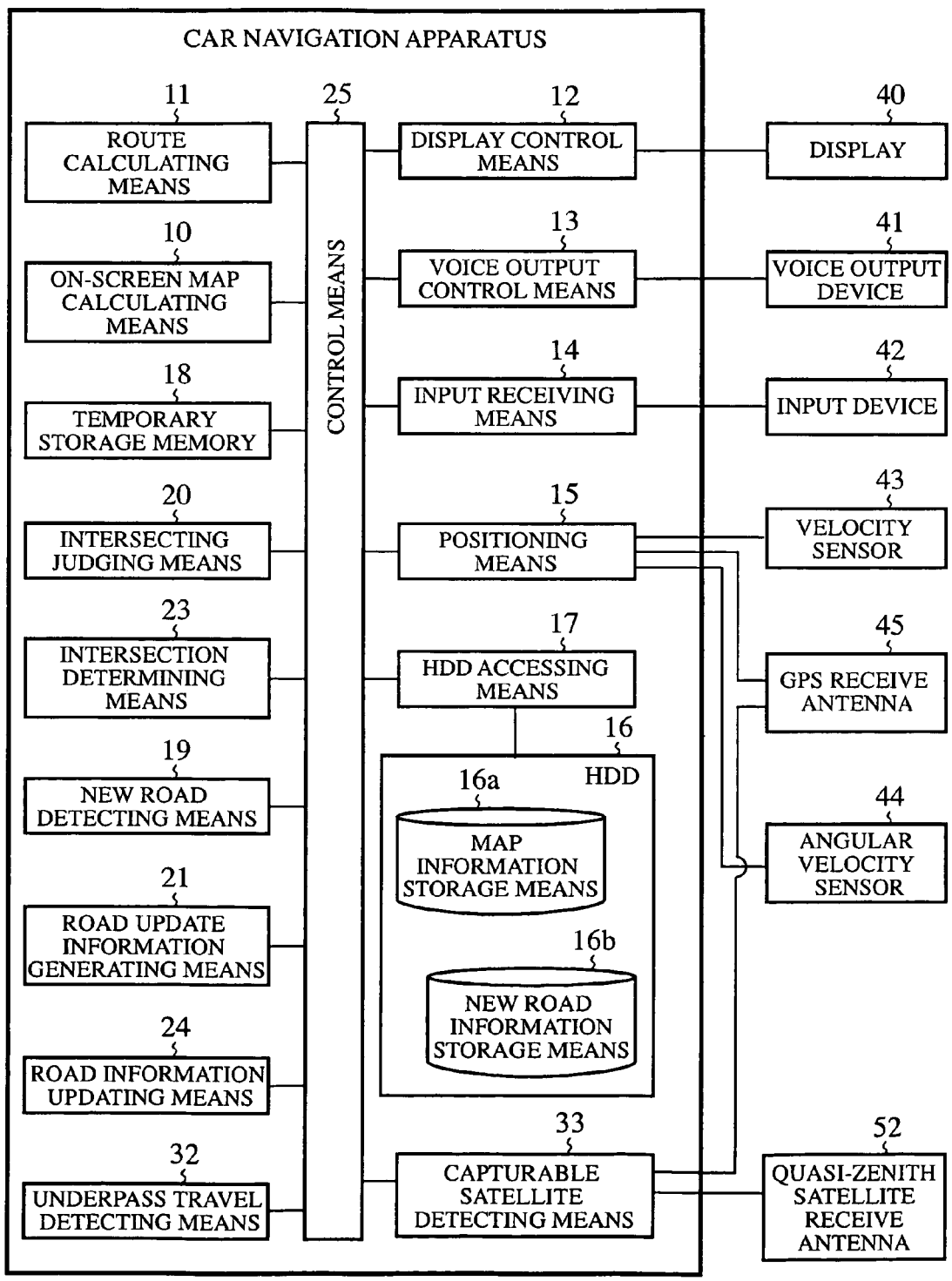
FIG. 35 is a block diagram showing the structure of a map information processing apparatus in accordance with embodiment 10 of the present invention.

FIG. 35 is a block diagram showing the structure of the map information processing apparatus according to embodiment 10 of the present invention. This map information processing apparatus includes a quasi-zenith satellite receive antenna 52, in addition to the components of the map information processing apparatus according to embodiment 1 shown in FIG. 1, and a car navigation apparatus in which an underpass travel detecting means 32 and a capturable satellite detecting means 33 are additionally disposed. The operation of an intersection determining means 23 differs from that of the map information processing apparatus according to embodiment 1.

The structure and operation of the intersection determining means 23 are the same as those of the map information processing apparatus according to embodiment 9.

The capturable satellite detecting means 33 detects GPS satellites and a quasi-zenith satellite which it can capture based on GPS signals from a GPS receive antenna 45 connected thereto and a semi-zenith signal from the quasi-zenith satellite receive antenna 52 connected thereto, and determines in which directions it can capture the GPS satellites and the quasi-zenith satellite, respectively.

Figure 36:
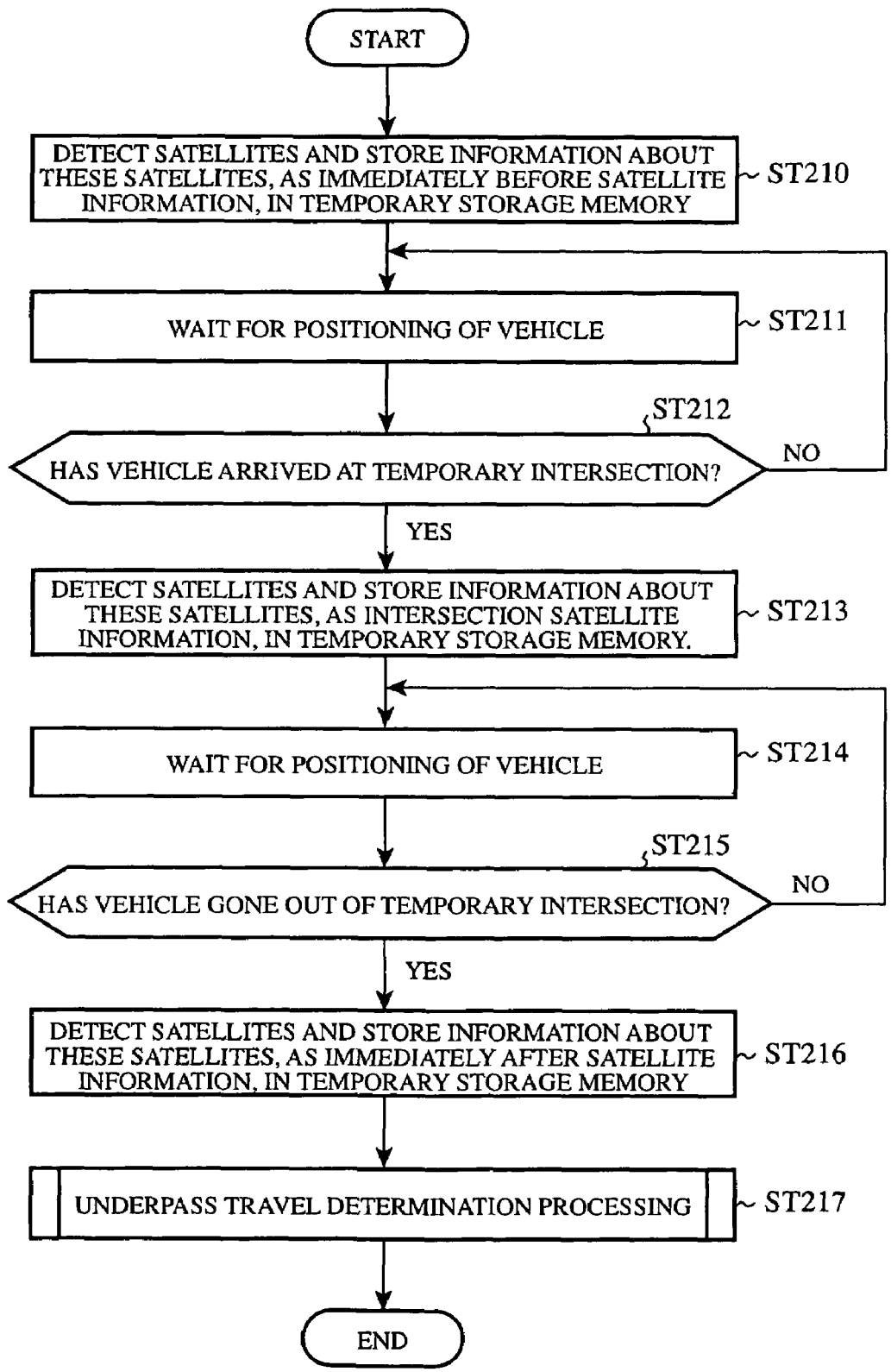
FIG. 36 is a flow chart showing a process of setting the configuration of a temporary intersection which is carried out by the map information processing apparatus in accordance with embodiment 10 of the present invention.
Figure 37:
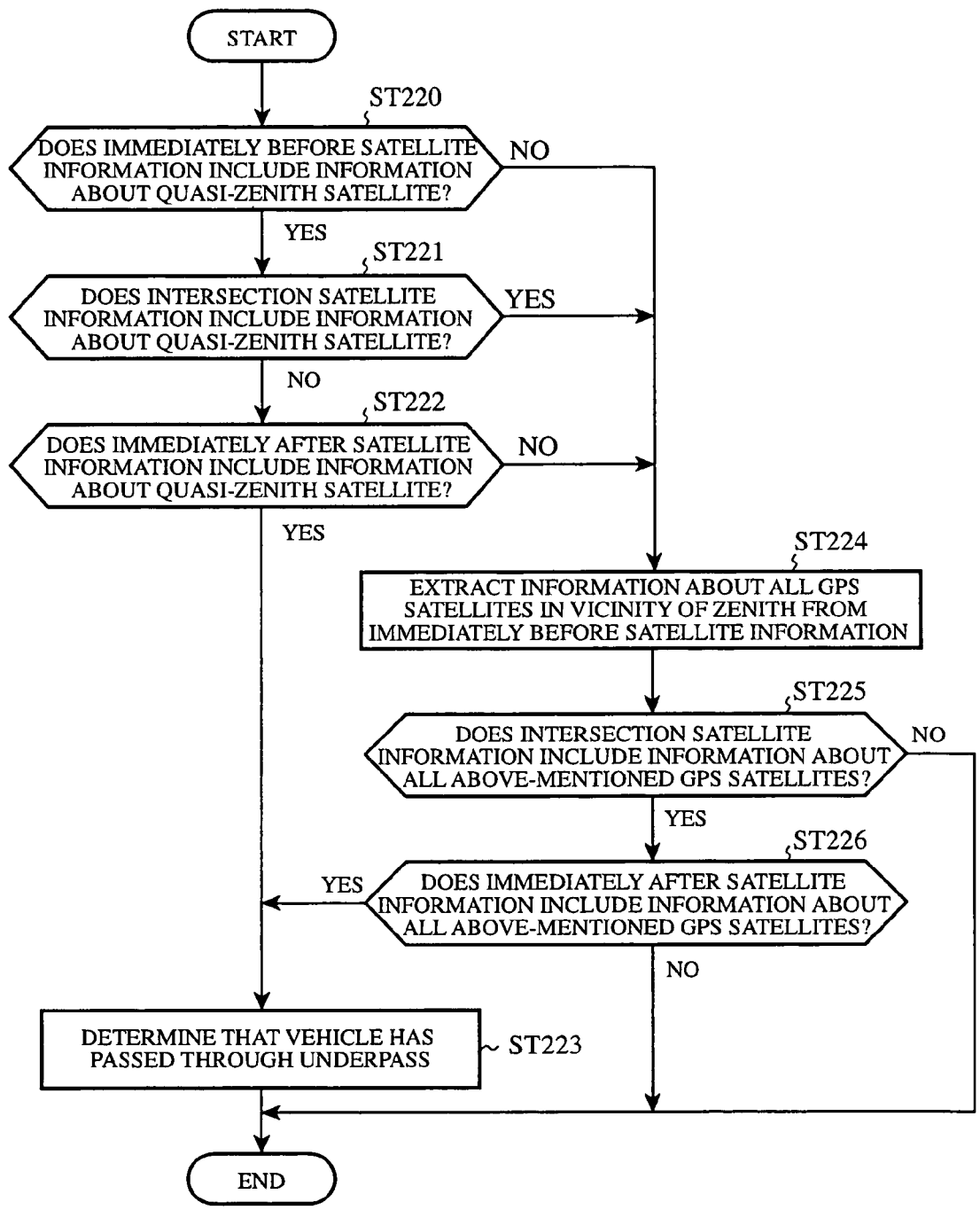
FIG. 37 is a flow chart showing the details of elevated structure determining processing which is carried out in step ST217 of FIG. 36.

Next, processing which is carried out by the underpass travel detecting means 32 of the map information processing apparatus according to embodiment 10 of the present invention will be explained with reference to a flow chart shown in FIGS. 36 and 37.

In the process of setting the configuration of a temporary intersection, the underpass travel detecting means detects one or more satellites which can be captured by the detectable satellite detecting means 33 first, and stores both the direction of a satellite in the vicinity of the zenith, e.g., a satellite at an elevation angle of 75 degrees or more, which is included in the detected one or more satellites, and an ID specifying the satellite, as immediately before satellite information, in a temporary storage memory 18 (in step ST210). After that, the underpass travel detecting means enters a state in which it waits for the positioning of a vehicle in which the map information processing apparatus is mounted by a positioning means 15 (in step ST211).

The underpass travel detecting means then checks to see whether the vehicle in which the map information processing apparatus is mounted has arrived at a temporary intersection (in step ST212). When determining that the vehicle has not arrived at any temporary intersection, the underpass travel detecting means returns the sequence to step ST211 in which it waits for the positioning of the vehicle again. On the other hand, when, in step ST212, determining that the vehicle has arrived at an temporary intersection, the underpass travel detecting means stores information about a satellite in the vicinity of the zenith which can be captured by the capturable satellite detecting means, as intersection satellite information, in the temporary storage memory 18 (in step ST213), in the same way that it carries out the process of step ST210. After that, the underpass travel detecting means enters a state in which it waits for the positioning by the positioning means 15 (in step ST214).

The underpass travel detecting means then checks to see whether the vehicle in which the map information processing apparatus is mounted has gone out of the temporary intersection (in step ST215). When determining that the vehicle has not gone out of the temporary intersection yet, the underpass travel detecting means returns the sequence to step ST214 in which it waits for the positioning of the vehicle again. On the other hand, when, in step ST215, determining that the vehicle has gone out of the temporary intersection, the underpass travel detecting means stores information about a satellite in the vicinity of the zenith which can be captured by the capturable satellite detecting means, as immediately after satellite information, in the temporary storage memory 18 (in step ST216), in the same way that it carries out the process of step ST210.

The map information processing apparatus then carries out underpass determining processing from the three pieces of satellite information stored in the temporary storage memory 18 (in step ST217). This underpass determining processing is carried out by the underpass travel detecting means 32. FIG. 37 is a flow chart showing the details of the underpass determining processing which is carried out in this step ST217.

In this underpass determining processing, the underpass travel detecting means refers to the immediately before satellite information stored in the temporary storage memory 18 and checks to see whether the immediately before satellite information includes information indicating that a quasi-zenith satellite was captured (in step ST220). When, in this step ST220, determining that the immediately before satellite information includes information indicating that a quasi-zenith satellite was captured, the underpass travel detecting means further refers to the intersection satellite information stored in the temporary storage memory 18 and checks to see whether the intersection satellite information includes information indicating that the quasi-zenith satellite was captured (in step ST221).

When, in this step ST221, determining that the intersection satellite information includes no information indicating that the quasi-zenith satellite was captured, the underpass travel detecting means further refers to the immediately after satellite information stored in the temporary storage memory 18 and checks to see whether the immediately after satellite information includes information indicating that the quasi-zenith satellite was captured (in step ST222). When, in this step ST222, determining that the immediately after satellite information includes information indicating that the quasi-zenith satellite was captured, the underpass travel detecting means determines that the vehicle has passed through an underpass at the temporary intersection (in step ST223), and then ends the underpass determining processing.

When, in this step ST220, determining that the immediately before satellite information includes no information indicating that the quasi-zenith satellite was captured, when, in this step ST221, determining that the intersection satellite information includes information indicating that the quasi-zenith satellite was captured, or when, in this step ST222, determining that the immediately after satellite information includes no information indicating that the quasi-zenith satellite was captured, the underpass travel detecting means refers to the immediately before satellite information and extracts information about all captured GPS satellites which exist in the vicinity of the zenith (in this case, a range in the vicinity of the zenith is predetermined, for example, a range at elevation angles of 75 degrees or more is predetermined) from the immediately before satellite information (in step ST224). The underpass travel detecting means then refers to the intersection satellite information stored in the temporary storage memory 18, and checks to see whether the intersection satellite information includes information about all the GPS satellites extracted in step ST224 (in step ST225). When determining that the intersection satellite information does not include information about all the GPS satellites extracted in step ST224, the underpass travel detecting means further checks to see whether the immediately after satellite information stored in the temporary storage memory 18 includes information about all the extracted GPS satellites (in step ST226).

When, in this step ST226, determining that the immediately after satellite information includes information about all the extracted GPS satellites, the underpass travel detecting means moves the sequence to step ST223. Otherwise, the underpass travel detecting mean ends the underpass determining processing. When, in above-mentioned step ST225, not determining that the intersection satellite information does not include information about all the GPS satellites extracted in step ST224, the underpass travel detecting means ends the underpass determining processing.

As explained above, the map information processing apparatus according to embodiment 10 of the present invention can determine that the vehicle has passed through an underpass at a temporary intersection and can also determine that the temporary intersection is a crossing with an overpass or underpass automatically by detecting a change in information about satellites which it can capture when the vehicle is passing through the temporary intersection.

Embodiment 11

A map information processing apparatus according to embodiment 11 of the present invention is so constructed as to set the configuration of a temporary intersection based on a signal acquired via DSRC (Dedicated Short Range Communication).

Figure 38:
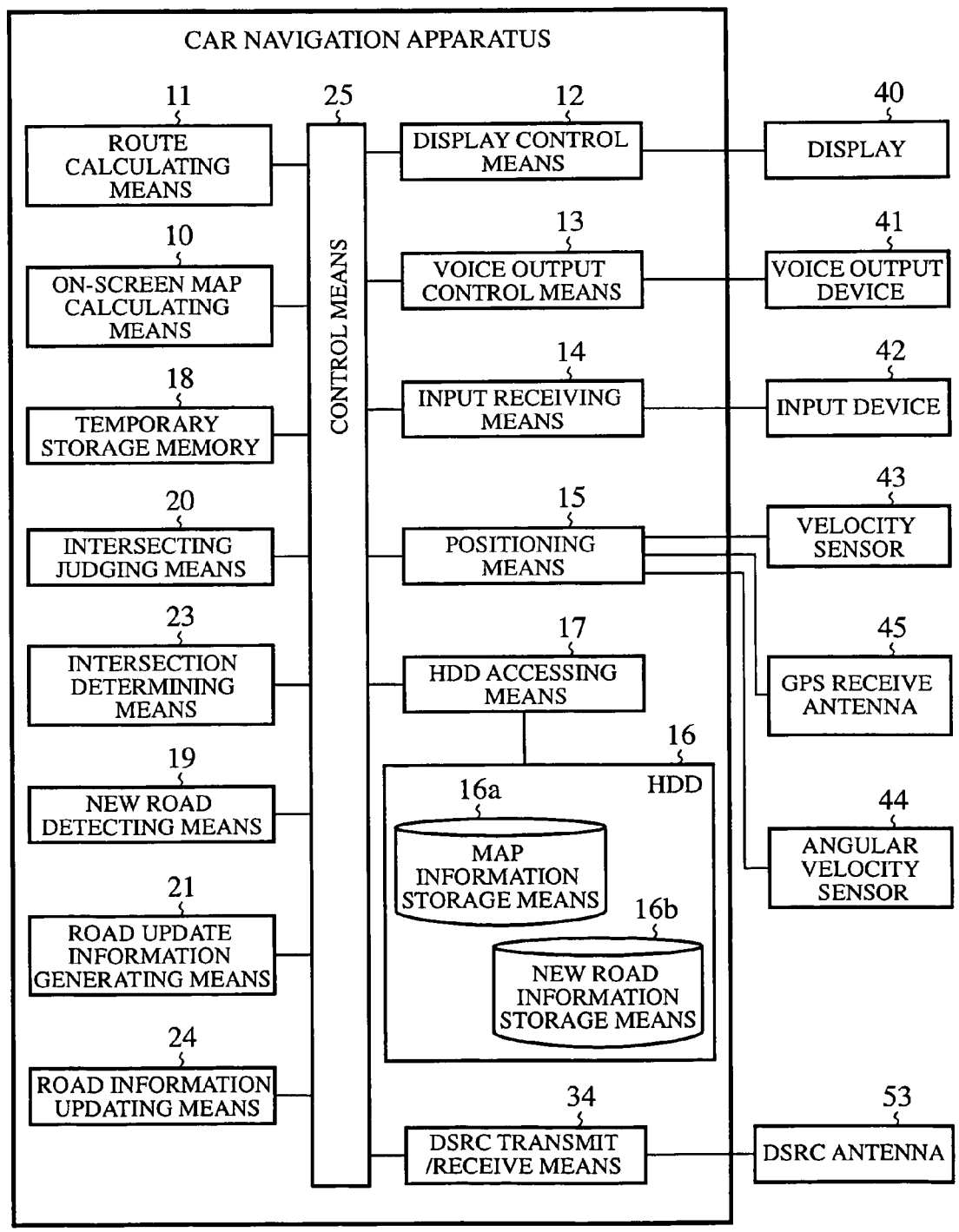
FIG. 38 is a block diagram showing the structure of a map information processing apparatus in accordance with embodiment 11 of the present invention.

FIG. 38 is a block diagram showing the structure of the map information processing apparatus according to embodiment 11 of the present invention. This map information processing apparatus includes a DSRC antenna 53 in addition to the components of the map information processing apparatus according to embodiment 1 shown in FIG. 1, and a car navigation apparatus in which a DSRC transmit/receive means 34 is additionally disposed. The operation of an intersection determining means 23 differs from that of the map information processing apparatus according to embodiment 1. The DSRC transmit/receive means 34 and intersection determining means 23 correspond to a receiving means of the present invention.

The DSRC transmit/receive means 34 is connected to the DSRC antenna 53, and processes a signal received by this DSRC antenna 53 and transmits information to outside the map information processing apparatus via the DSRC antenna 53.

Assume that DSRC roadside equipment (not shown in the figure) is disposed in the vicinity of each intersection to hold information about the configuration of each intersection (i.e., information indicating whether each intersection is a crossing with an overpass or underpass or a grade crossing) and the position (i.e., the latitude and longitude) of each intersection, and to send out these pieces of information as a DSRC signal.

Figure 39:
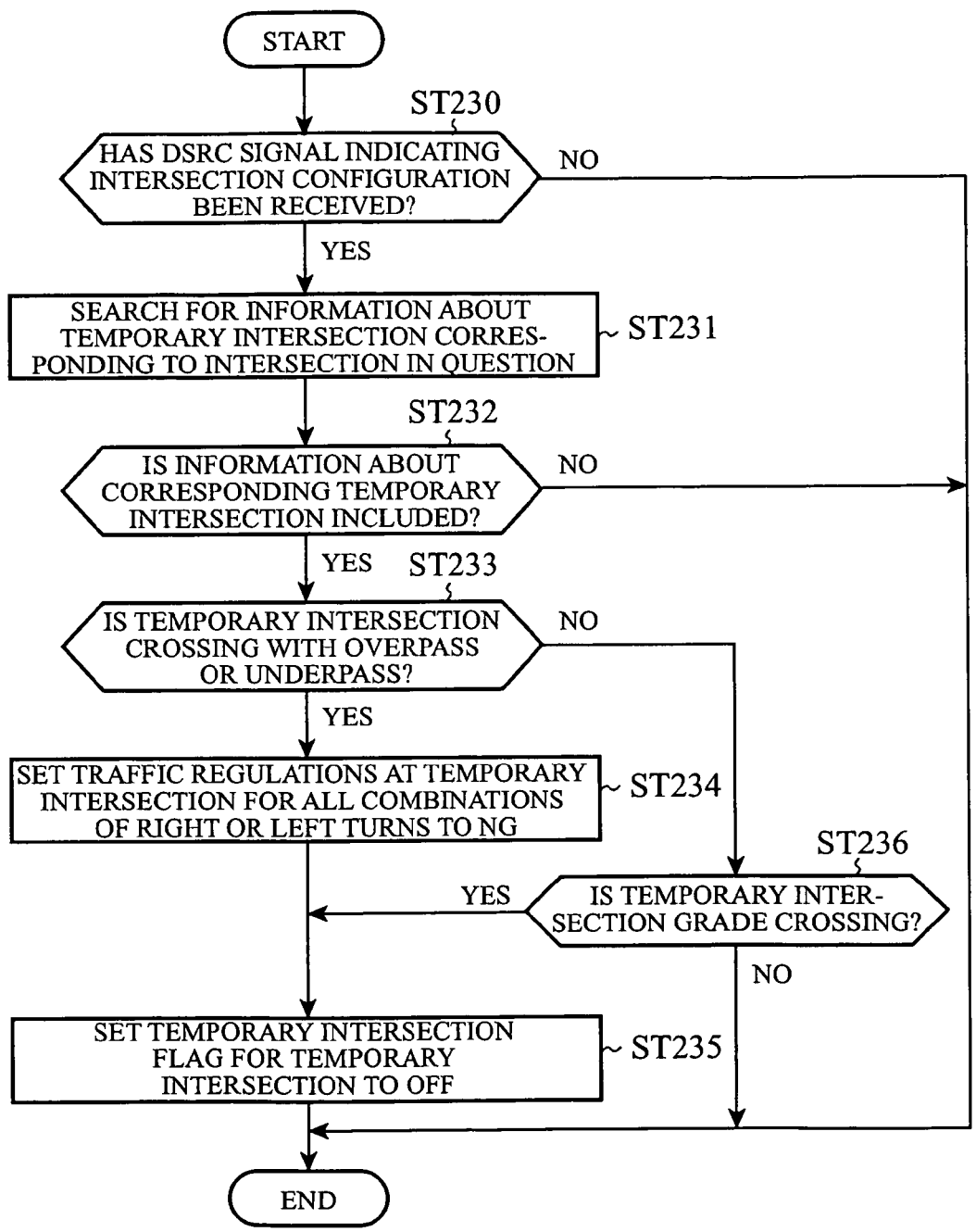
FIG. 39 is a flow chart showing a process of setting the configuration of a temporary intersection which is carried out by the map information processing apparatus in accordance with embodiment 11 of the present invention.

Next, a process of setting the configuration of a temporary intersection which is carried out by the intersection determining means 23 of the map information processing apparatus according to embodiment 11 of the present invention will be explained with reference to a flow chart shown in FIG. 39.

In the process of setting the configuration of a temporary intersection, the intersection determining means checks to see whether the map information processing apparatus has received a DSRC signal indicating the configuration of an intersection (in step ST230). When determining that the map information processing apparatus has not received a DSRC signal, the intersection determining means ends the processing. On the other hand, when determining that the map information processing apparatus has received a DSRC signal, the intersection determining means searches through new road information and map information for a temporary intersection which corresponds to the intersection indicated by the DSRC signal (in step ST231). The intersection determining means carries out this searching operation based on information indicating the position of the intersection, which is included in the DSRC signal which the map information processing apparatus has received from DSRC roadside equipment.

The intersection determining means checks to see whether the new road information and map information include a temporary intersection corresponding to the intersection based on the result of the searching of step ST231 (in step ST232). When determining that the new road information and map information include no temporary intersection corresponding to the intersection, the intersection determining means ends the processing. On the other hand, when determining that the new road information and map information includes a temporary intersection corresponding to the intersection, the intersection determining means check to see whether or not the temporary intersection is a crossing with an overpass or underpass (in step ST233). The intersection determining means determines whether or not the temporary intersection is a crossing with an overpass or underpass by checking the configuration of the intersection which is included in the DSRC signal received from DSRC roadside equipment.

When, in this step ST233, determining that the temporary intersection is a crossing with an overpass or underpass, the underpass travel detecting means changes traffic regulations information for the temporary intersection in question from OK to NG for all combinations of right and left turns (in step ST234). The underpass travel detecting means then changes a temporary intersection flag for the temporary intersection to OFF (in step ST235). After that, the underpass travel detecting means ends the processing. In contrast, when, in step ST233, determining that the temporary intersection is not a crossing with an overpass or underpass, the underpass travel detecting means further check to see whether or not the temporary intersection is a grade crossing (in step ST236). The intersection determining means determines whether or not the temporary intersection is a grade crossing by checking the configuration of the intersection which is included in the DSRC signal received from DSRC roadside equipment. When, in this step ST236, determining that the temporary intersection is a grade crossing, the intersection determining means shifts the sequence to step ST235. On the other hand, when determining that the temporary intersection is not a grade crossing, the intersection determining means ends the processing.

As explained above, the map information processing apparatus according to embodiment 11 of the present invention can distinguish between grade crossings and crossings with an overpass or underpass based on information acquired from external DSRC roadside equipment.

In the map information processing apparatus according to above-mentioned embodiment 11, a case where DSRC roadside equipment disposed in the vicinity of each intersection holds the configuration of each intersection is explained as an example. As an alternative, an information center to which a plurality of DSRC roadside equipments are connected can hold the intersection configuration of each intersection, and can transmit information about the intersection configuration of each intersection to corresponding DSRC roadside equipment. This variant can offer the same advantage as provided by above-mentioned embodiment. In this case, a center that exclusively carries out distribution of information indicating the intersection configuration of each intersection, a service provider that offers map information via the Internet, a center which distributes information detected by other vehicles by probe means, or the like can be used as the information center. Communications other than DSRC communications, e.g., communications with a wireless LAN can be used as the communications means.

Embodiment 12

A map information processing apparatus according to embodiment 12 of the present invention is so constructed as to set the configuration of a temporary intersection based on information acquired from an information center via DSRC communications.

The map information processing apparatus according to this embodiment 12 has the same structure as the map information processing apparatus according to embodiment 11 shown in FIG. 38. However, the operation of an intersection determining means 23 differs from that of the map information processing apparatus according to embodiment 11.

Assume that the information center (not shown) manages a database having information about the intersection configuration of each intersection indicating whether each intersection is a crossing with an overpass or underpass or a grade crossing, and distributes information about the intersection configuration of an intersection according to a request from the map information processing apparatus.

Figure 40:
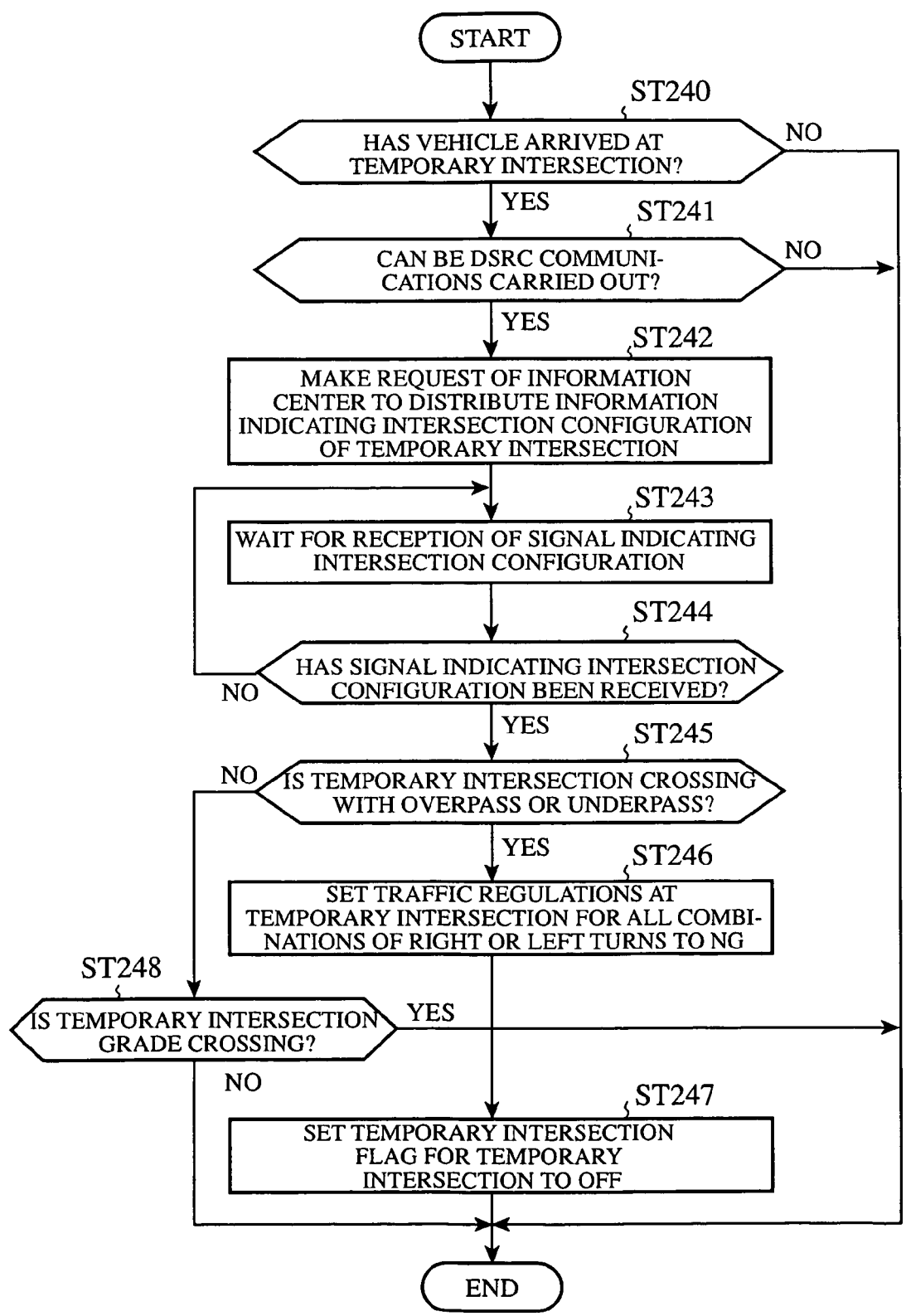
FIG. 40 is a flow chart showing a process of setting the configuration of a temporary intersection which is carried out by a map information processing apparatus in accordance with embodiment 12 of the present invention.

Next, a process of setting the configuration of a temporary intersection which is carried out by the intersection determining means 23 of the map information processing apparatus according to embodiment 12 of the present invention will be explained with reference to a flow chart shown in FIG. 40.

In this process of setting the configuration of a temporary intersection, the intersection determining means checks to see whether a vehicle in which the map information processing apparatus is mounted has arrived at a temporary intersection first (in step ST240). When determining that the vehicle has not arrived at any temporary intersection, the intersection determining means ends the processing. On the other hand, when determining that the vehicle has arrived at a temporary intersection, the intersection determining means then checks to see whether the map information processing apparatus can carry out DSRC communications (in step ST241). When determining that the map information processing apparatus cannot carry out DSRC communications, the intersection determining means ends the processing. On the other hand, when determining that the map information processing apparatus can carry out DSRC communications, the intersection determining means makes a request of the information center to distribute information indicating the intersection configuration of the temporary intersection (in step ST242). The intersection determining means carries out this process by transmitting either position information about the position of the temporary intersection in question or a unique identifier other than the position for determining the temporary intersection in question to the information center.

After that, the intersection determining means enters a state in which it waits for reception of the information indicating the intersection configuration of the temporary intersection (in step ST243). The intersection determining means then checks to see whether the map information processing apparatus has received the information indicating the intersection configuration of the temporary intersection (in step ST244). When determining that the map information processing apparatus has not received the information indicating the intersection configuration of the temporary intersection yet, the intersection determining means returns the sequence to step ST243 in which it waits for reception of the information indicating the intersection configuration of the temporary intersection again. On the other hand, when, in step ST244, determining that the map information processing apparatus has received the information indicating the intersection configuration of the temporary intersection, the intersection determining means refers to the received information to check to see whether or not the temporary intersection in question is a crossing with an overpass or underpass (in step ST245).

When, in this step ST245, determining that the temporary intersection is a crossing with an overpass or underpass, the underpass travel detecting means changes traffic regulations information for the temporary intersection in question from OK to NG for all combinations of right and left turns (in step ST246). The underpass travel detecting means then changes a temporary intersection flag for the temporary intersection to OFF (in step ST247). After that, the underpass travel detecting means ends the processing. In contrast, when, in step ST245, determining that the temporary intersection is not a crossing with an overpass or underpass, the underpass travel detecting means further checks to see whether or not the temporary intersection is a grade crossing (in step ST248). When determining that the temporary intersection is a grade crossing, the intersection determining means shifts the sequence to step ST247. On the other hand, when determining that the temporary intersection is not a grade crossing, the intersection determining means ends the processing.

As explained above, the map information processing apparatus according to embodiment 12 of the present invention can distinguish between grade crossings and crossings with an overpass or underpass based on information acquired, via DSRC roadside equipment, from the external information center.

As previously mentioned, the map information processing apparatus according to embodiment 12 is so constructed as to transmit a request for distribution of information indicating the intersection configuration of a temporary intersection to the information center via DSRC communications, and to receive the information indicating the intersection configuration of the temporary intersection from the information center via DSRC communications. The map information processing apparatus according to embodiment 12 can communicate with the information center using, for example, a cellular phone, instead of DSRC communications. This variant can offer the same advantage as provided by above-mentioned embodiment. As an alternative, the map information processing apparatus according to embodiment 12 can communicate with the information center using communications via one or more quasi-zenith satellites in the vicinity of the zenith which the map information processing apparatus can always capture, communications via a communication satellite, or communications with a wireless LAN. This variant can offer the same advantage as provided by above-mentioned embodiment.

Embodiment 13

A map information processing apparatus according to embodiment 13 of the present invention is so constructed as to set the configuration of a temporary intersection based on a broadcast signal received thereby.

Figure 41:
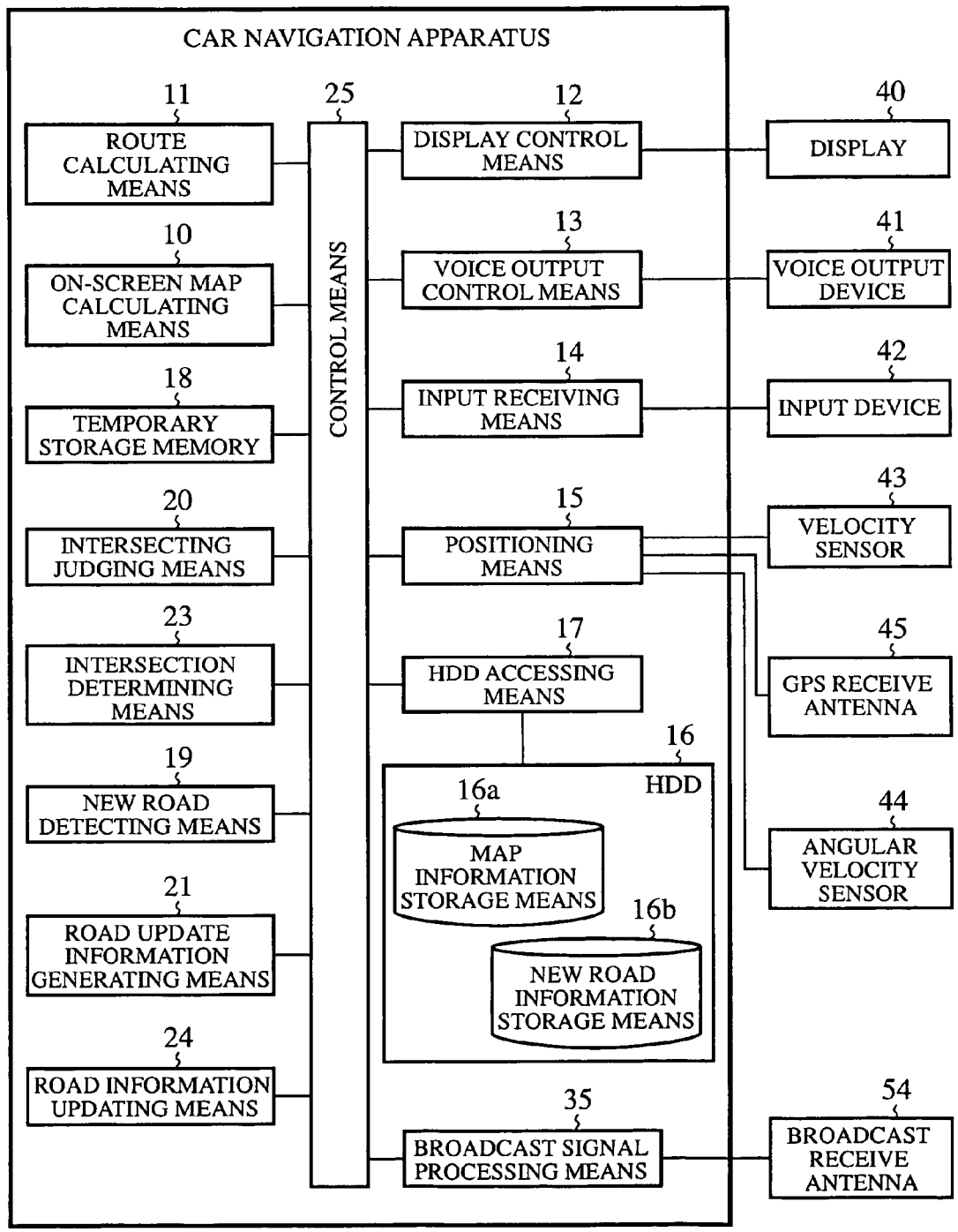
FIG. 41 is a block diagram showing the structure of a map information processing apparatus in accordance with embodiment 13 of the present invention.

FIG. 41 is a block diagram showing the structure of the map information processing apparatus according to embodiment 13 of the present invention. This map information processing apparatus includes a broadcast receive antenna 54 in addition to the components of the map information processing apparatus according to embodiment 1 shown in FIG. 1, and a car navigation apparatus in which a broadcast signal processing means 35 is additionally disposed. The operation of an intersection determining means 23 differs from that of the map information processing apparatus according to embodiment 1.

The broadcast signal processing means 35 processes the signal received by the broadcast receive antenna 54, and converts it into data which can be used by each unit of the car navigation apparatus. The broadcast signal processing means 35 and broadcast receive antenna 54 correspond to a receiving means of the present invention. A broadcasting station holds information including, for each intersection, a set of position information indicating the position of each intersection (or a unique identifier for determining each intersection) and information indicating the configuration of each intersection (whether each intersection is a crossing with an overpass or underpass or a grade crossing), and broadcasts it using a broadcast electric wave.

Figure 42:
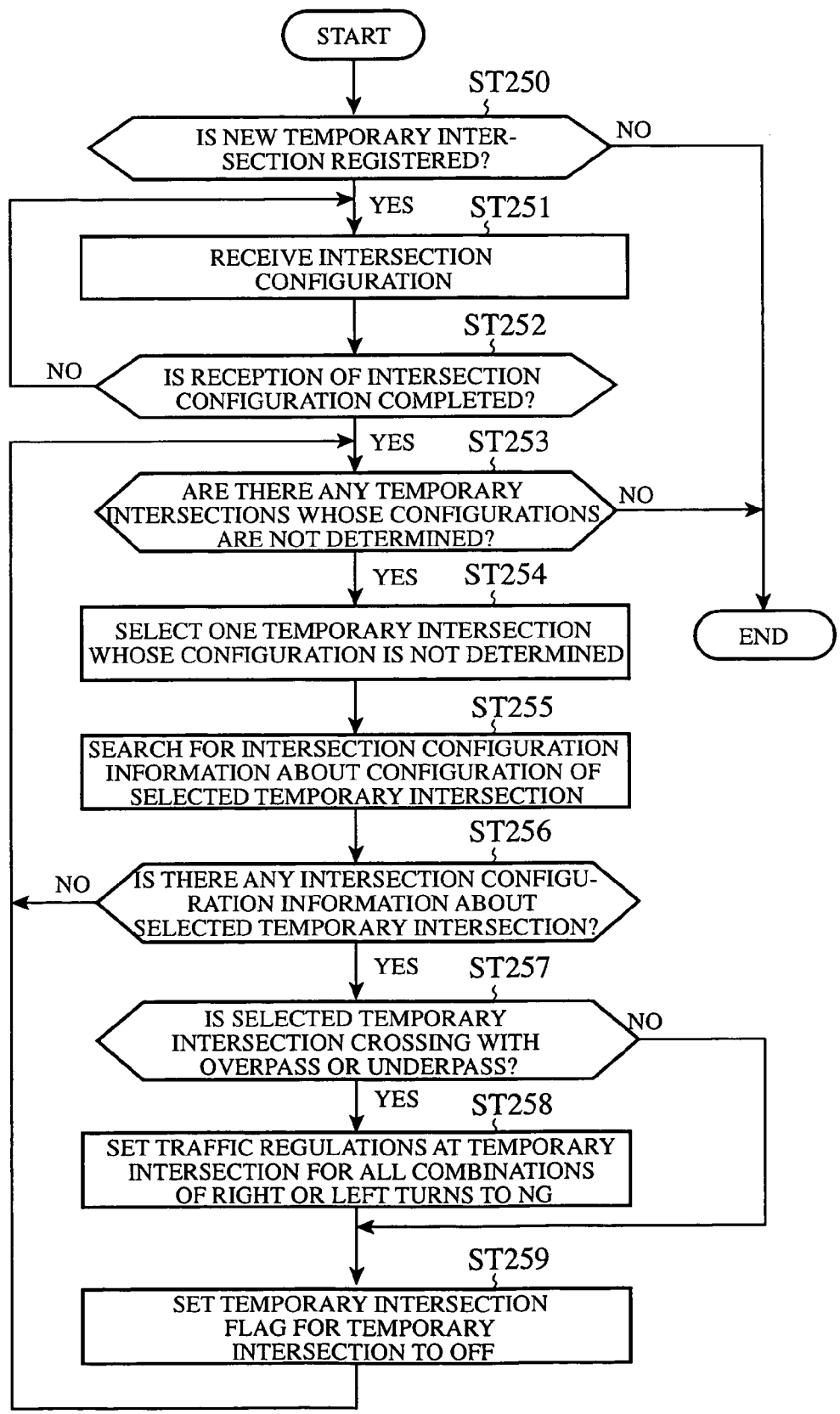
FIG. 42 is a flow chart showing a process of setting the configuration of a temporary intersection which is carried out by the map information processing apparatus in accordance with embodiment 13 of the present invention.

Next, a process of setting the configuration of a temporary intersection which is carried out by the intersection determining means 23 of the map information processing apparatus according to embodiment 13 of the present invention will be explained with reference to a flow chart shown in FIG. 42. The intersection determining means carries out this processing after a road information updating means 24 has finished updating map information and additionally storing new road information.

In this process of setting the configuration of a temporary intersection, the intersection determining means checks to see whether or not a new temporary intersection is registered when the road information updating means 24 has finished updating the map information and additionally storing new road information (in step ST250). When determining that no new temporary intersection is registered when the road information updating means has finished updating the map information and additionally storing new road information, the intersection determining means ends the processing. On the other hand, when determining that a new temporary intersection is registered when the road information updating means has finished updating the map information and additionally storing new road information, the intersection determining means receives position information indicating the position of the new temporary intersection (or an identifier indicating the new temporary intersection) and information indicating the configuration of the new temporary intersection, which are broadcast to the map information processing apparatus (in step ST251).

The intersection determining means then checks to see whether the map information processing apparatus has finished receiving those pieces of information (in step ST252). When determining that the map information processing apparatus has not finished receiving those pieces of information yet, the intersection determining means returns the sequence to step ST251 in which it waits for reception of the position information indicating the position of the new temporary intersection and the information indicating the configuration of the new temporary intersection. On the other hand, when determining that the map information processing apparatus has finished receiving these pieces of information, the intersection determining means further checks to see whether one or more other temporary intersections whose configurations have not been checked yet, i.e., which have not been determined yet to be either a crossing with an overpass or underpass or a grade crossing remain to be processed (in step ST253). When determining that no temporary intersection whose configuration has not been checked yet remains to be processed, the intersection determining means ends the processing, When, in above-mentioned step ST253, determining that one or more temporary intersections whose configurations have not been checked yet remain to be processed, the intersection determining means selects one temporary intersection from among the one or more temporary intersections whose configurations have not been checked yet (in step ST254). The intersection determining means then searches through the received information for information indicating the intersection configuration of the selected temporary intersection (in step ST255). The intersection determining means carries out the searching operation using either position information indicating the position of the selected temporary intersection or an unique identifier indicating the selected temporary intersection. The intersection determining means then checks to see whether the received information includes information indicating the intersection configuration of the temporary intersection in question based on the result of the searching of step ST255 (in step ST256). When determining that the received information does not include information indicating the intersection configuration of the temporary intersection in question, the sequence returns to step ST253.

When, in above-mentioned step ST256, determining that the received information includes information indicating the intersection configuration of the temporary intersection in question, the intersection determining means check to see whether or not the temporary intersection is a crossing with an overpass or underpass with reference to the information indicating the intersection configuration of the temporary intersection (in step ST257). When determining that the temporary intersection is a crossing with an overpass or underpass, the intersection determining means changes traffic regulations information for the temporary intersection in question from OK to NG for all combinations of right and left turns (in step ST258). The intersection determining means then changes a temporary intersection flag for the temporary intersection to OFF (in step ST259). After that, the intersection determining means returns the sequence to step ST253. In contrast, when, in above-mentioned step ST257, determining that the temporary intersection is not a crossing with an overpass or underpass, the intersection determining means determines that the temporary intersection is a grade crossing, and shifts the sequence to step ST259.

As explained above, the map information processing apparatus according to embodiment 13 of the present invention can distinguish between grade crossings and crossings with an overpass or underpass based on information acquired by receiving a broadcast signal transmitted thereto from outside the map information processing apparatus.

The map information processing apparatus according to above-mentioned embodiment 13 is so constructed as to receive position information about the positions of intersections and information about the configurations of the intersections which are broadcast thereto every time when the intersection determining means 23 starts its processing. As an alternative, the map information processing apparatus can be so constructed as to store those pieces of information which are received for the first time in a temporary storage memory 18 or HDD 16, and to use the position information about the positions of the intersections and the information about the configurations of the intersections which are stored in the temporary storage memory 18 or HDD 16 every time when the intersection determining means 23 carries out its processing. Since the process of receiving the broadcast information which is carried out every time when the intersection determining means carries out its processing can be omitted according to this structure, the above-mentioned processing can be speeded up.

Embodiment 14

A map information processing apparatus according to embodiment 14 of the present invention is so constructed as to make a plan for receiving broadcast information, and to set the configuration of a temporary intersection based on a broadcast signal which is obtained thereby according to the receiving plan.

The map information processing apparatus according to this embodiment 14 has the same structure as that according to embodiment 13 shown in FIG. 41. However, the operation of an intersection determining means 23 differs from that of the map information processing apparatus according to embodiment 13.

Next, a process of setting the configuration of a temporary intersection which is carried out by the intersection determining means 23 of the map information processing apparatus according to embodiment 14 of the present invention will be explained with reference to a flow chart shown in FIGS. 43 and 44. The intersection determining means carries out this processing after a road information updating means 24 has finished updating map information and additionally storing new road information.

Figure 43:
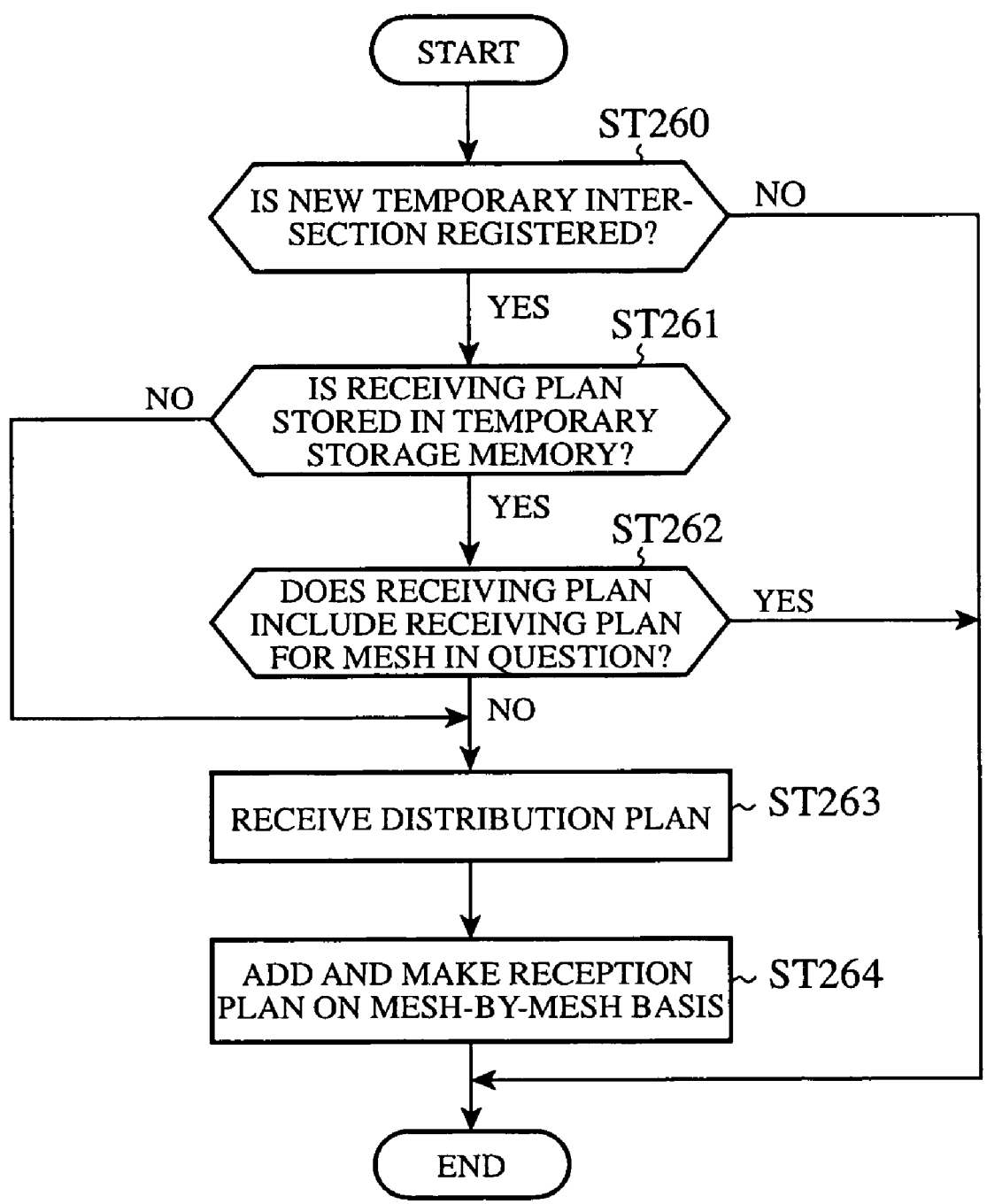
FIG. 43 is a flowchart showing a process of generating a receiving plan for receiving intersection configuration information, which is carried out by a map information processing apparatus in accordance with embodiment 14 of the present invention.
Figure 44:
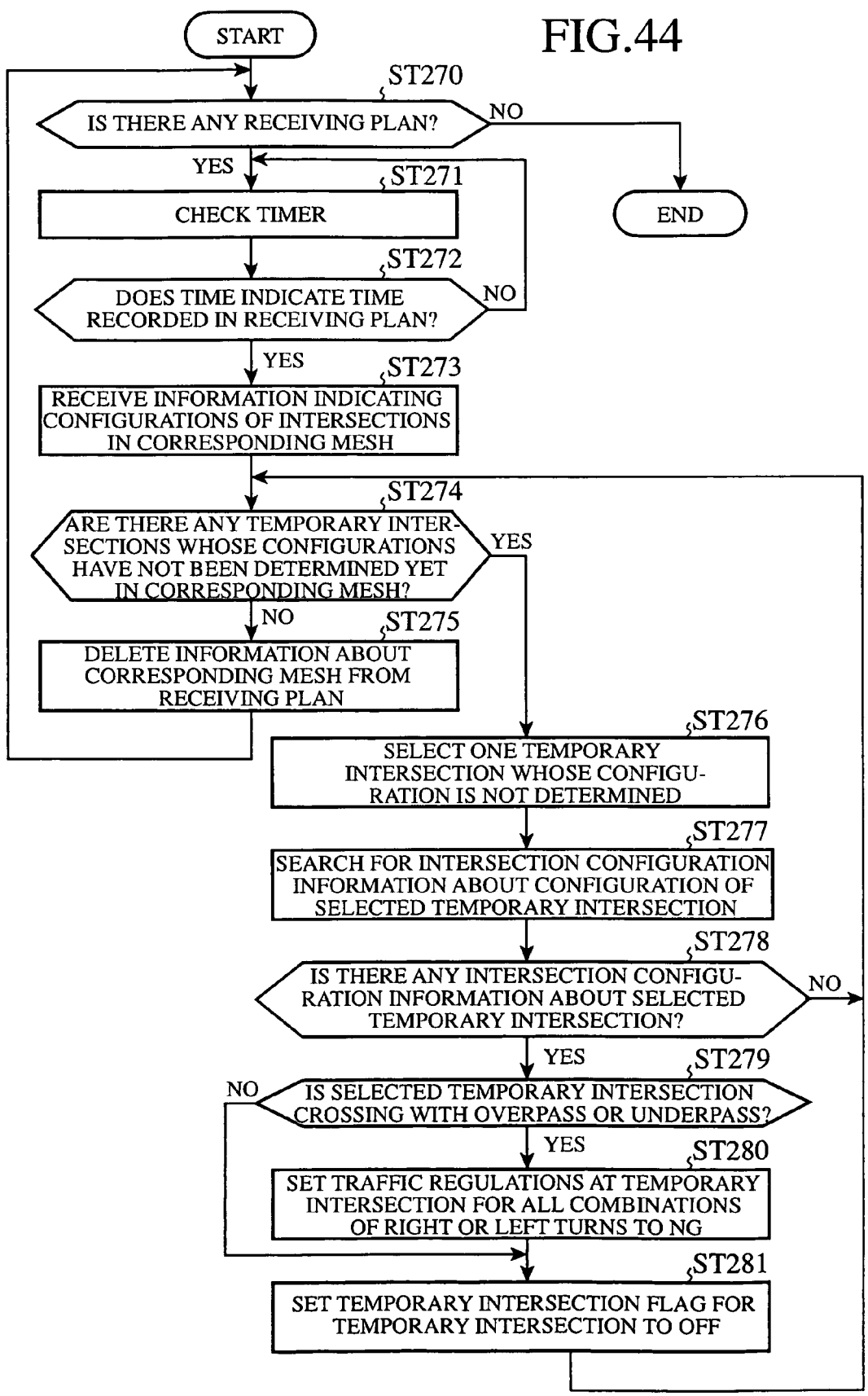
FIG. 44 is a flow chart showing a process of setting the configuration of a temporary intersection which is carried out by the map information processing apparatus in accordance with embodiment 14 of the present invention based on the receive plan.

FIG. 43 is a flow chart showing a process of making a receiving plan for receiving required information indicating the configurations of intersections from a plan for distributing information indicating the configurations of intersections, which is made on a mesh-by-mesh basis and which is broadcast thereto from a broadcasting station, and FIG. 44 is a flow chart showing a process of receiving information indicating the configurations of intersections according to the receiving plan to set the configuration of a temporary intersection. The intersection determining means 23 can carry out the processing shown in FIG. 43, and the processing shown in FIG. 44 in parallel.

First, the processing of making a receiving plan will be explained with reference to the flow chart shown in FIG. 43. In this processing, the intersection determining means checks to see whether or not a new temporary intersection is registered when the road information updating means 24 has finished updating the map information and additionally storing new road information (in step ST260). When determining that no new temporary intersection is registered when the road information updating means has finished updating the map information and additionally storing new road information, the intersection determining means ends the processing.

When, in step ST260, determining that a new temporary intersection is registered, the intersection determining means further checks to see whether or not a receiving plan for receiving the configurations of intersections is stored in the temporary storage memory 18 (in step ST261). When determining that a receiving plan for receiving the configurations of intersections is stored in the temporary storage memory, the intersection determining means checks to see whether or not a receiving plan corresponding to a mesh including the temporary intersection newly registered is included in the receiving plan stored in the temporary storage memory 18 (in step ST262).

When, in this step ST262, determining that the corresponding receiving plan is not included in the receiving plan stored in the temporary storage memory, the intersection determining means ends the processing. On the other hand, when determining that the corresponding receiving plan is included in the receiving plan stored in the temporary storage memory, the intersection determining means receives a plan for distributing information indicating the configurations of intersections, which is made on a mesh-by-mesh basis and which is broadcast to the map information processing apparatus from a broadcasting station (in step ST263). The intersection determining means then searches through the received distribution plan for a time of distribution of information indicating the configurations of intersections in a mesh including the newly registered temporary intersection, and adds a receiving plan associated with the mesh to the receiving plan stored in the temporary storage memory 18 (in step ST264). After that, the intersection determining means ends the processing. When, in above-mentioned step ST261, determining that a no receiving plan for receiving the configurations of intersections is stored in the temporary storage memory, the intersection determining means advances the sequence to step ST263. In this case, the intersection determining means newly makes a receiving plan and stores it in the temporary storage memory 18.

Next, a process of receiving information indicating the configurations of intersections based on the receiving plan, and then setting the configuration of a temporary intersection will be explained with reference to a flow chart shown in FIG. 44. In this processing, the intersection determining means checks to see whether or not a receiving plan is stored in the temporary storage memory 18 first (in step ST270). When determining that no receiving plan is stored in the temporary storage memory, the intersection determining means ends the processing. On the other hand, when determining that a receiving plan is stored in the temporary storage memory, the intersection determining means checks a timer (in step ST271). The intersection determining means then checks to see whether the timer shows a time which is recorded in the receiving plan (in step ST272). When determining that the timer does not show any time which is recorded in the receiving plan, the intersection determining means returns the sequence to step ST271 in which it checks the timer again.

When, in above-mentioned step ST272, determining that the timer shows a time which is recorded in the receiving plan, the intersection determining means receives information indicating the configurations of intersections which are included in a corresponding mesh (in step ST273). The intersection determining means then checks to see whether one or more other temporary intersections whose configurations have not been determined yet remain to be processed in the corresponding mesh (in step ST274). When determining that no temporary intersections whose configurations have not been checked yet remain to be processed in the corresponding mesh, the intersection determining means deletes the receiving plan for receiving information indicating the configurations of intersections associated with the corresponding mesh from the receiving plan stored in the temporary storage memory 18 (in step ST275). When the receiving plan stored in the temporary storage memory is emptied of its contents, the intersection determining means deletes the receiving plan itself from the temporary storage memory 18. After that, the intersection determining means returns the sequence to step ST270.

When, in above-mentioned step ST274, determining that ne temporary intersections whose configurations have not been checked yet remain to be processed in the corresponding mesh, the intersection determining means carries out processes of steps ST276 to ST281 hereafter. Since these processes of steps ST276 to ST281 are the same as those of steps ST254 to ST259 shown in the flow chart of FIG. 42 of the map information processing apparatus according to embodiment 13, respectively, the explanation of the processes of steps ST276 to ST281 will be omitted.

As explained above, the map information processing apparatus according to embodiment 14 of the present invention can distinguish between grade crossings and crossings with an overpass or underpass based on information which is obtained by receiving a signal which is broadcast thereto from outside the map information processing apparatus. In this case, since the map information processing apparatus is so constructed as to make a receiving plan and to acquire information for distinguishing between grade crossings and crossings with an overpass or underpass from the broadcast signal according to the made receiving plan, the map information processing apparatus does not need to always check the presence or absence of broadcasts. Therefore, the efficiency of the map information processing apparatus can be improved.

The map information processing apparatus according to above-mentioned embodiment 14 is so constructed as to make a receiving plan when a new temporary intersection is registered by the road information updating means 24, as previously mentioned. As an alternative, the map information processing apparatus can be so constructed as to make a receiving plan when it is started up.

Embodiment 15

A map information processing apparatus according to embodiment 15 of the present invention is so constructed as to foresee the existence of a temporary intersection and then hold, as unregistered underpass information, information about a foreseen result before detecting the temporary intersection, and to determine whether or not the temporary intersection is a crossing with an overpass or underpass when the temporary intersection is actually generated.

Figure 45:
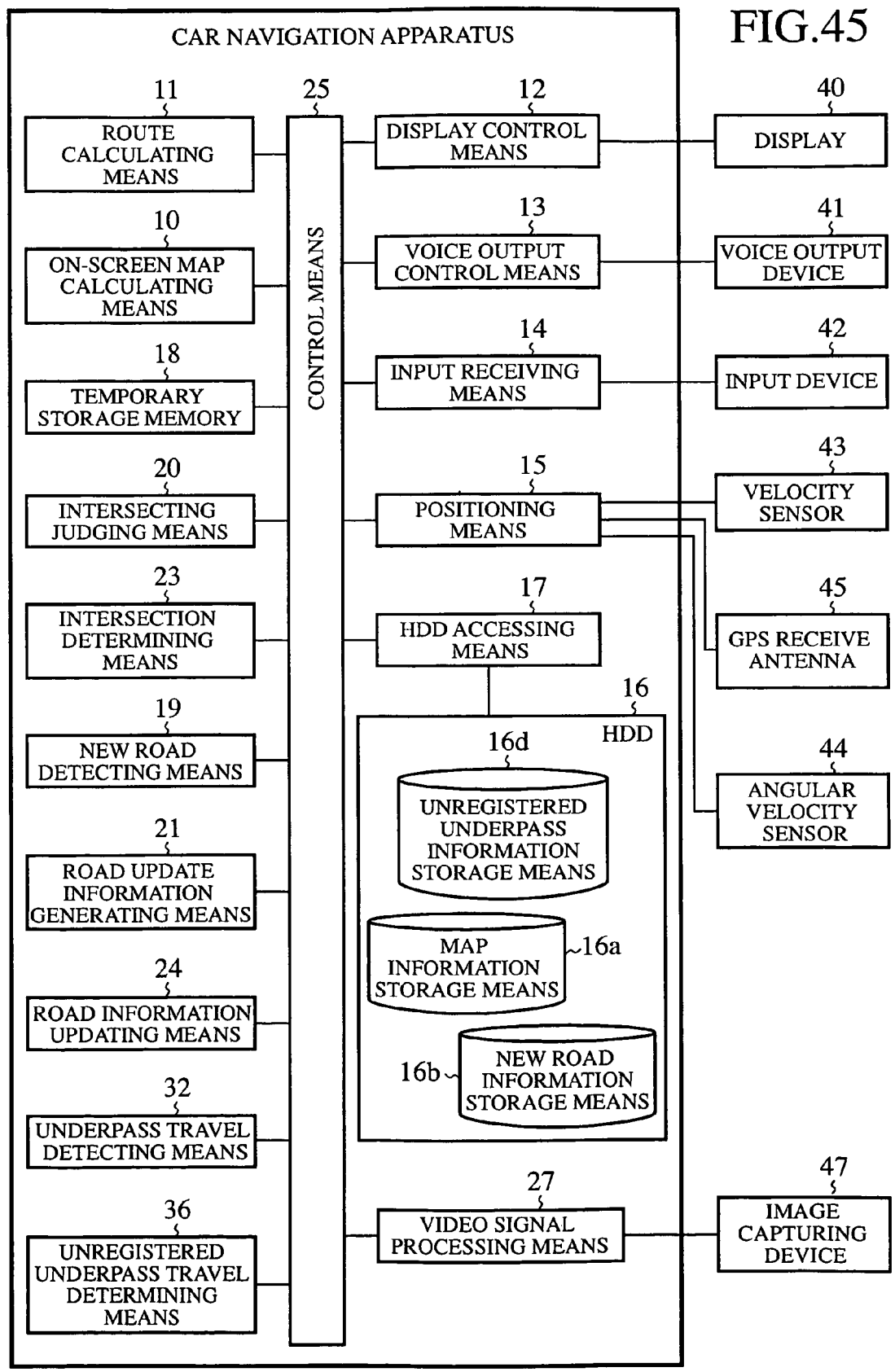
FIG. 45 is a block diagram showing the structure of a map information processing apparatus in accordance with embodiment 15 of the present invention.

FIG. 45 is a block diagram showing the structure of the map information processing apparatus according to embodiment 15 of the present invention. This map information processing apparatus includes a car navigation apparatus in which an underpass travel detecting means 32 and an unregistered underpass travel determining means 36 are added to the components of the car navigation apparatus of the map information processing apparatus according to embodiment 7 shown in FIG. 25. An unregistered underpass information storage means 16d is additionally disposed in an HDD 16. The operation of an intersection determining means 23 differs from that of the map information processing apparatus according to embodiment 7.

A video signal processing means 27 converts an image signal acquired by capturing an image using an image capturing device 47 into data which can be processed by each unit of the car navigation apparatus. The underpass travel detecting means 32 detects an elevated structure (e.g., an elevated road (overpass), an elevated railway) which is multi-level crossing a road which a vehicle in which the map information processing apparatus is mounted is currently traveling from the image generated by the video signal processing means 27. The unregistered underpass travel determining means 36 determines whether the vehicle has passed under an elevated structure which is not registered yet. The details of this unregistered underpass travel determining means 36 will be explained below.

Figure 47:
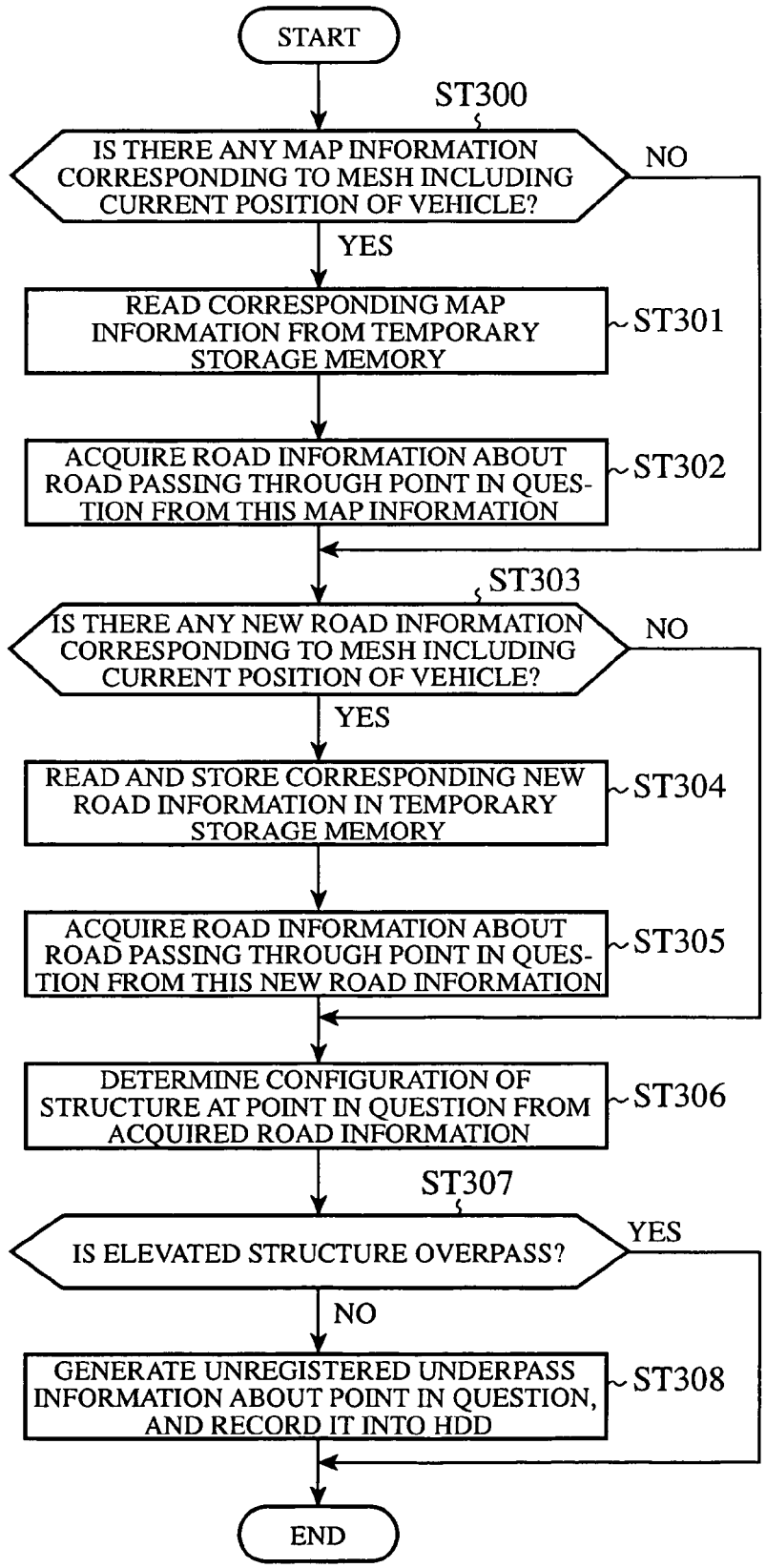
FIG. 47 is a flow chart showing the details of unregistered underpass travel determining processing which is carried out in step ST292 of FIG. 46.
Figure 48:
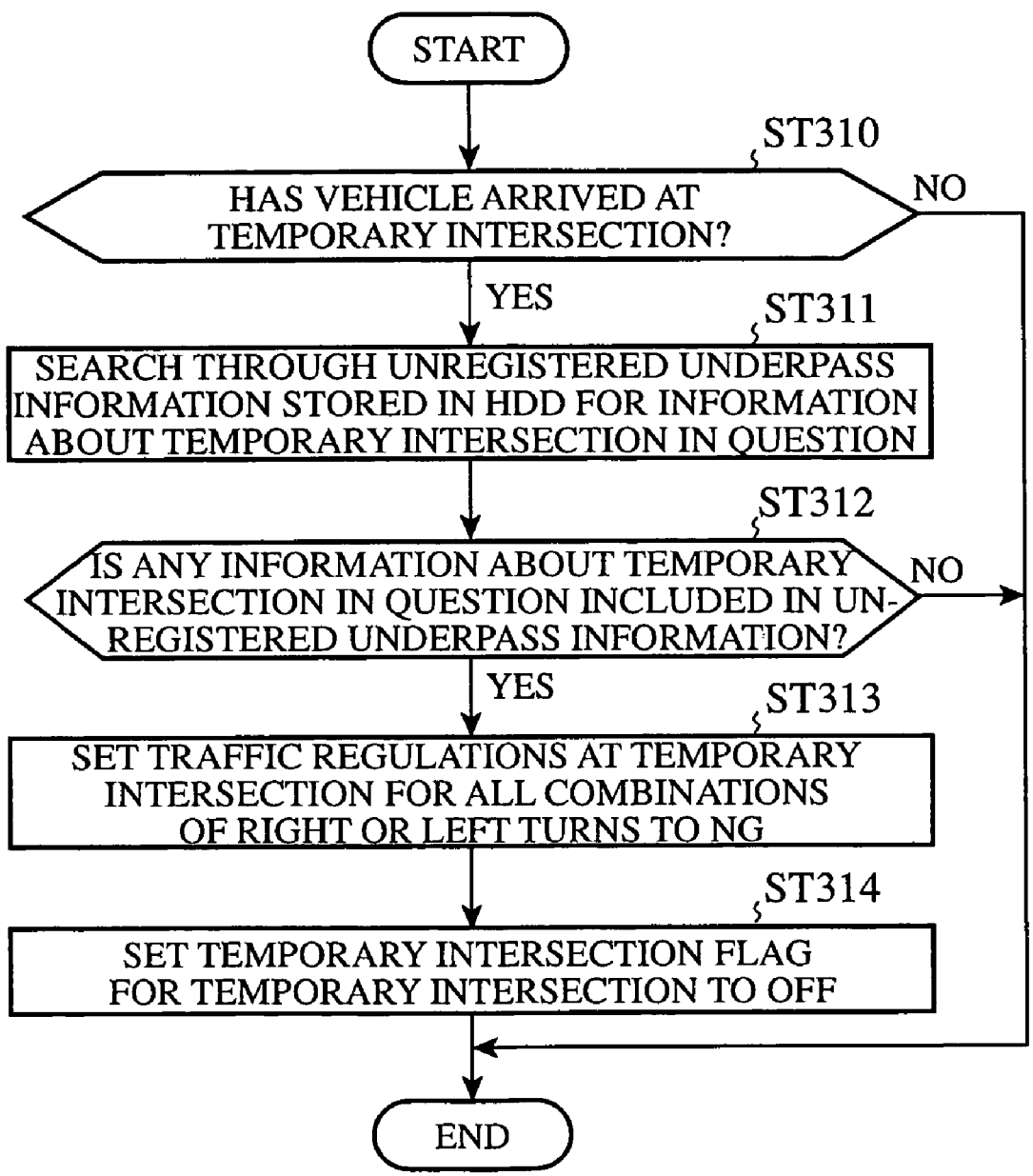
FIG. 48 is a flow chart showing a process of setting the configuration of a temporary intersection which is carried out by the map information processing apparatus in accordance with embodiment 15 of the present invention.

Next, the operation of the map information processing apparatus according to embodiment 15 of the present invention will be explained. FIG. 47 is a flow chart showing a process of generating unregistered underpass information using the image capturing device 47, and FIG. 48 is a flow chart showing the details of unregistered underpass travel determining processing shown in FIG. 47.

First, the operation of the map information processing apparatus will be explained with reference to a flow chart shown in FIG. 46. The image capturing device 47 captures an image of surroundings which are located above the moving object (i.e., the vehicle) to generate an image signal (in step ST290). The video signal processing means 27 generates an electronic image based on the image signal from the image capturing device 47. The underpass travel detecting means then checks to see whether or not there is an elevated structure above the vehicle based on the image generated by the video signal processing means 27 (in step ST291). In other words, the underpass travel detecting means 32 checks to see whether or not there is an elevated structure (e.g., an elevated road (overpass) or an elevated railway) which is multi-level crossing a road which the vehicle is currently traveling from the image generated by the video signal processing means 27. When, in this step ST291, determining that there is no elevated structure above the vehicle, the underpass travel detecting means returns the sequence to step ST290.

When the underpass travel detecting means determines that it has received an end sequence signal, it ends the processing. On the other hand, when the underpass travel detecting means determines that it has not received an end signal yet, it returns the sequence to step ST290 in which the image capturing device captures an image of surroundings which are located above the vehicle again.

Figure 46:
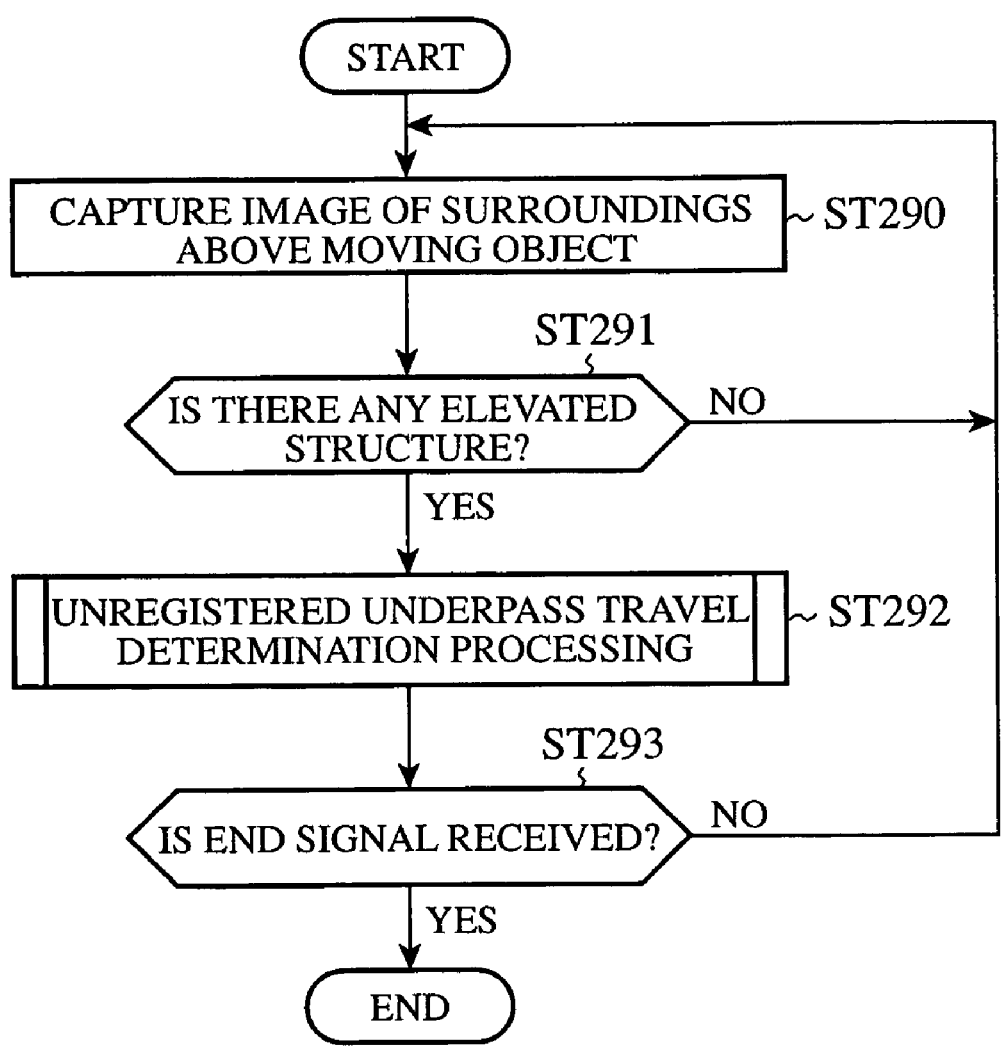
FIG. 46 is a flowchart showing a process of generating unregistered underpass information which is carried out by the map information processing apparatus in accordance with embodiment 15 of the present invention.

FIG. 47 is the flow chart showing the details of the unregistered underpass travel determining processing which is carried out in step ST292 of FIG. 46. This unregistered underpass travel determining processing is carried out by the underpass travel detecting means 32.

In the unregistered underpass travel determining processing, the underpass travel detecting means checks to see whether map information associated with a mesh including the current position of the vehicle exists in a map information storage means 16a of the HDD 16 (in step ST300). When determining that no map information associated with the mesh including the current position of the vehicle exists in the map information storage means, the underpass travel detecting means advances the sequence to step ST303. On the other hand, when determining that map information associated with the mesh including the current position of the vehicle exists in the map information storage means, the underpass travel detecting means reads the map information from the map information storage means and stores it in a temporary storage memory 18 (in step ST301). The underpass travel detecting means then acquires road information about a road which passes through the point in question from the read map information (in step ST302).

The underpass travel detecting means then checks to see whether new road information associated with the mesh including the current position of the vehicle exists in a new road information storage means 16b of the HDD 16 (in step ST303). When determining that no new road information associated with the mesh including the current position of the vehicle exists in the new road information storage means, the underpass travel detecting means advances the sequence to step ST306. On the other hand, when determining that new road information associated with the mesh including the current position of the vehicle exists in the new road information storage means, the underpass travel detecting means reads the new road information from the new road information storage means and stores it in the temporary storage memory 18 (in step ST304). The underpass travel detecting means then acquires road information about a road which passes through the point in question from the read new road information (in step ST305).

The underpass travel detecting means then determines the configuration of the elevated structure in the vicinity of the point in question from both the road information acquired in step ST302, and the road information acquired in step ST305 (in step ST306). The underpass travel detecting means further checks to see whether or not the elevated structure is an overpass based on the determined result in step ST306 (in step ST307). When determining that the elevated structure is an overpass, the underpass travel detecting means ends the processing. On the other hand, when determining that the elevated structure is not an overpass, the underpass travel detecting means generates unregistered underpass information indicating the existence of the elevated structure at the point in question, which is contained in neither of the map information stored in the map information storage means 16a of the HDD 16 and the new road information stored in the new road information storage means 16b of the HDD 16, and stores the unregistered underpass information in the unregistered underpass information storage means 16*d* of the HDD 16 (in step ST308). After that, the underpass travel detecting means ends the processing.

Next, a process of setting the configuration of a temporary intersection using the unregistered underpass information, which is carried out by the intersection determining means 23 of the map information processing apparatus according to embodiment 15 of the present invention, will be explained with reference to a flow chart shown in FIG. 48.

In this process of setting the configuration of a temporary intersection, the intersection determining means checks to see whether the vehicle in which the map information processing apparatus is mounted has arrived at a temporary intersection first (in step ST310). When determining that the vehicle has not arrived at any temporary intersection, the intersection determining means ends the processing. On the other hand, when determining that the vehicle has arrived at a temporary intersection, the intersection determining means searches through the unregistered underpass information stored in the unregistered underpass information storage means 16*d* of the HDD 16 for information about the point in question (in step ST311). The intersection determining mean then checks to see whether the information about the point in question exists based on the searching result obtained in step ST311 (in step ST312).

When, in this step ST312, determining that the information about the point in question does not exist in the unregistered underpass information storage means, the intersection determining mean ends the processing. On the other hand, when determining that the information about the point in question exists in the unregistered underpass information storage means, and the information indicates that the temporary intersection is a crossing with an overpass or underpass, the intersection determining mean changes traffic regulations information for the temporary intersection in question from OK to NG for all combinations of right and left turns (in step ST313). The intersection determining means then changes a temporary intersection flag for the temporary intersection to OFF (in step ST314). After that, the intersection determining mean ends the processing.

As previously explained, the map information processing apparatus according to embodiment 15 of the present invention can determine that a temporary intersection is a crossing with an overpass or underpass automatically by detecting that a new road which is stored in neither the map information storage means 16*a* nor the new road information storage means 16*b* is multi-level crossing an existing road at the temporary intersection.

Embodiment 16

A map information processing apparatus according to embodiment 16 of the present invention is so constructed as to determine whether or not there is a necessity to register a temporary intersection based on altitude information.

The map information processing apparatus according to this embodiment 16 has the same structure as the map information processing apparatus according to embodiment 1 shown in FIG. 1 except for the following points. In other words, road information included in map information stored in a map information storage means 16*a* includes altitude information about the altitude of each node in advance as information associated with each node. New road information stored in a new road information storage means 16*b* includes altitude information about the altitude of each node as information associated with each node. Such altitude information is generated based on GPS signals which a positioning means 15 acquires from a GPS receive antenna 45.

An intersecting judging means 20 judges whether an intersection point is a grade crossing or a crossing with an overpass or underpass using altitude information. A road update information generating means 21 does not generate any temporary intersection. The map information processing apparatus assumes that all intersection points which are judged by the intersecting judging means 20 are grade crossings. Since the road update information generating means does not generate any temporary intersection, this map information processing apparatus does not inquire of the user whether a temporary intersection is a grade crossing or a crossing with an overpass or underpass. Therefore, the map information processing apparatus according to this embodiment does not include the intersection inquiring means 22 of the map information processing apparatus according to embodiment 1. The positioning means 15 carries out three-dimensional positioning including the altitude of a vehicle in which the map information processing apparatus is mounted.

Next, intersection determining processing which is carried out by the intersecting judging means 20 of the map information processing apparatus according to embodiment 16 of the present invention will be explained with reference to a flow chart shown in FIG. 49.

Figure 5:
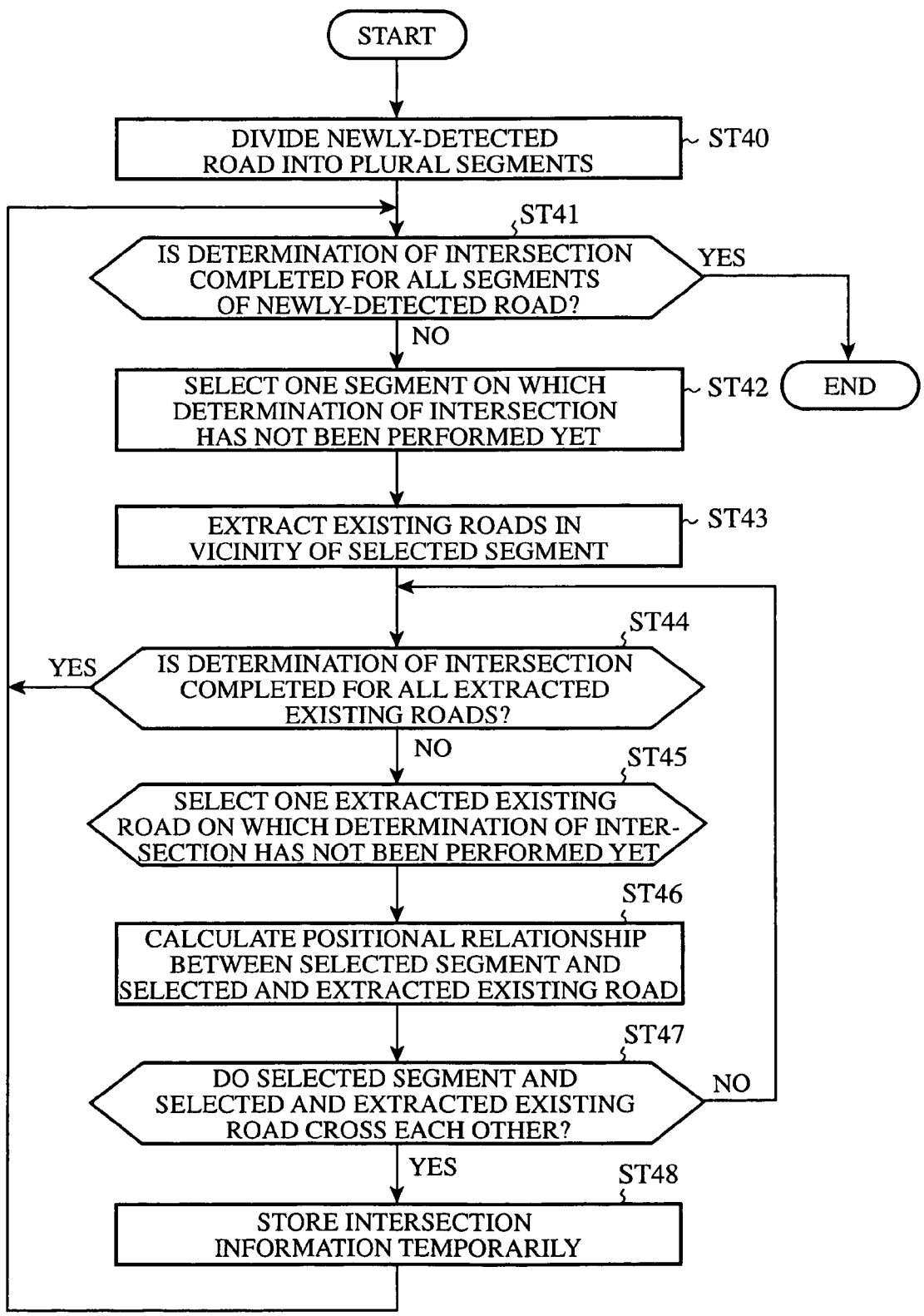
FIG. 5 is a flow chart showing the details of intersecting judging processing shown in FIG. 4.
Figure 49:
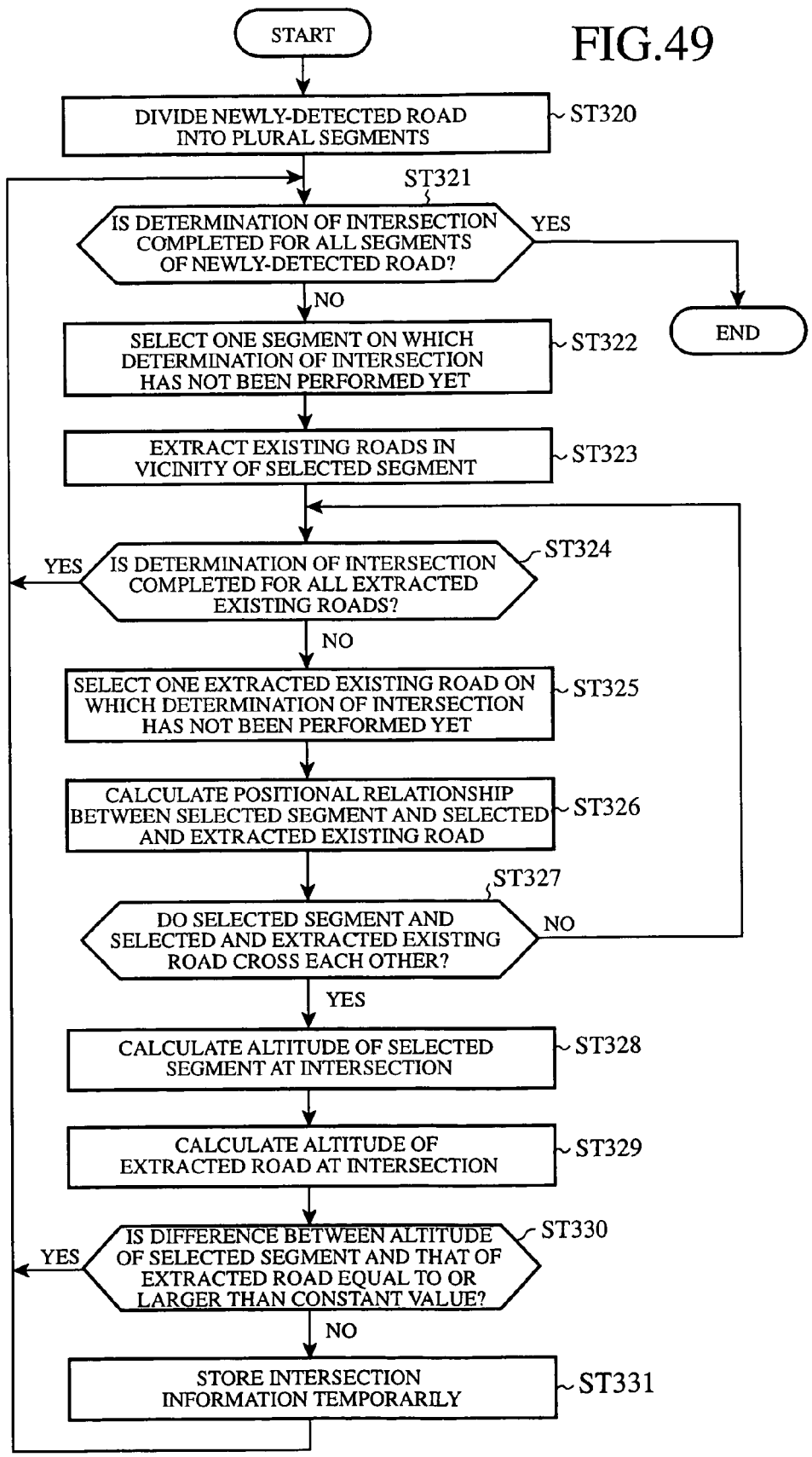
FIG. 49 is a flow chart showing intersecting judging processing which is carried out by a map information processing apparatus in accordance with embodiment 16 of the present invention.

Processes of steps ST320 to ST327 of the intersection determining processing shown in the flow chart of FIG. 49 are the same as those of steps ST40 to ST47 of the intersection determining processing carried out by the map information processing apparatus according to embodiment 1 shown in the flow chart of FIG. 5, respectively. Therefore, only the difference between FIG. 49 and FIG. 5 will be explained hereafter.

When, in step ST327, determining that a selected segment and a selected neighboring road intersect, the intersecting judging means calculates the altitude of the selected segment at an intersection point in question (in step ST328). The altitude of the intersection point is calculated from the altitudes of both ends of the selected segment using the ratio of the distance between one end of the selected segment and the intersection point and the distance between the other end of the selected segment and the intersection point. The intersecting judging means also calculates the altitude of the neighboring road which intersects the selected segment at the intersection point (in step ST329). The altitude of the intersection point is also calculated from the altitudes of both ends of the neighboring road using the ratio of the distance between one end of the neighboring road and the intersection point and the distance between the other end of the neighboring road and the intersection point.

The intersecting judging means then checks to see whether the difference between the altitude calculated in step ST328 and the altitude calculated in step ST329 is equal to or larger than a predetermined constant value (in step ST330). When determining that the difference between the altitude calculated in step ST328 and the altitude calculated in step ST329 is not equal to or larger than the predetermined constant value, the intersecting judging means temporarily stores intersection information about the intersection point in a temporary storage memory 18 (in step ST331). After that, the intersecting judging means returns the sequence to step ST321. On the other hand, when, in step ST330, determining that the difference between the altitude calculated in step ST328 and the altitude calculated in step ST329 is equal to or larger than the predetermined constant value, the intersecting judging means recognizes that the intersection point is a crossing with an overpass or underpass, and returns the sequence to step ST321 without generating any intersection information.

As explained above, since the map information processing apparatus according to embodiment 16 of the present invention intersection information does not store any intersection information about an intersection point when determining that the intersection point is a crossing with an overpass or underpass based on altitude information when detecting a new road, the map information processing apparatus can prevent unnecessary temporary intersections from being generated.

Embodiment 17

A map information processing apparatus according to embodiment 17 of the present invention is so constructed as to determine whether or not there is a necessity to register a temporary intersection based on image information obtained by capturing an image using an image capturing device.

The map information processing apparatus according to this embodiment 17 has the same structure as the map information processing apparatus according to embodiment 7 shown in FIG. 25 except for the following points. In other words, a road update information generating means 21 does not generate any temporary intersection. The map information processing apparatus assumes that all intersection points which are judged by an intersecting judging means 20 are grade crossings. Since the road update information generating means does not generate any temporary intersection, this map information processing apparatus does not inquire of the user whether a temporary intersection is a grade crossing or a crossing with an overpass or underpass. Therefore, the map information processing apparatus according to this embodiment does not include the intersection inquiring means 22 of the map information processing apparatus according to embodiment 1.

Next, intersection determining processing which is carried out by the intersecting judging means 20 of the map information processing apparatus according to embodiment 17 of the present invention will be explained with reference to a flow chart shown in FIG. 50.

Figure 50:
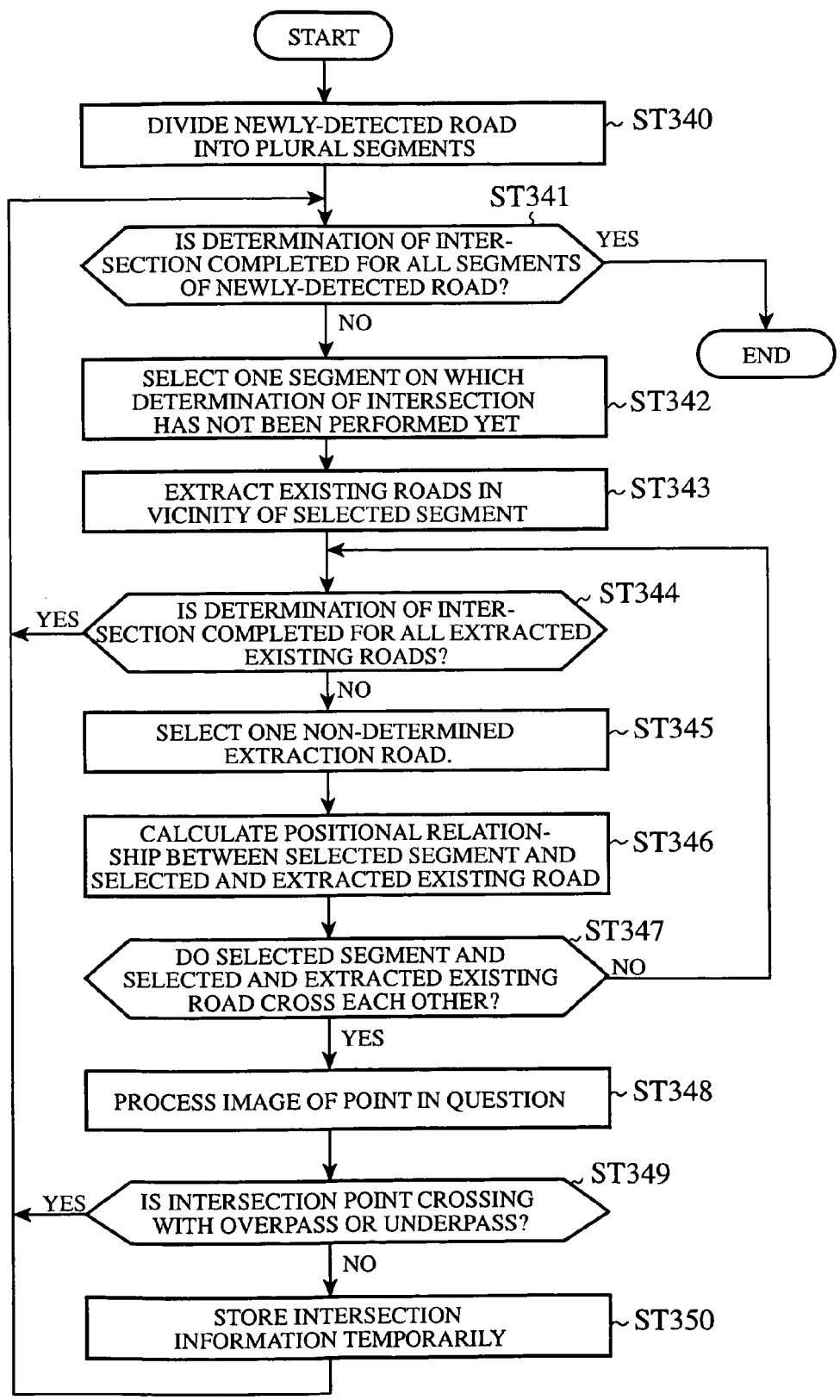
FIG. 50 is a flow chart showing intersecting judging processing which is carried out by a map information processing apparatus in accordance with embodiment 17 of the present invention.

Processes of steps ST340 to ST347 of the intersection determining processing shown in the flow chart of FIG. 50 are the same as those of steps ST40 to ST47 of the intersection determining processing carried out by the map information processing apparatus according to embodiment 1 shown in the flow chart of FIG. 5, respectively. Therefore, only the difference between FIG. 50 and FIG. 5 will be explained hereafter.

When, in step ST347, determining that a selected segment and a selected neighboring road intersect, the intersecting judging means further determines whether an intersection point in question is a crossing with an overpass or underpass or a grade crossing by processing an electronic image obtained by capturing an image of surroundings of a vehicle in which the map information processing apparatus is mounted using the image capturing device 47 (in step ST348). The intersecting judging means then checks to see whether or not the intersection point in question is a crossing with an overpass or underpass based on the result of processing the image in step ST348 (in step ST349). When determining that the intersection point in question is not a crossing with an overpass or underpass (i.e., it is a grade crossing), the intersecting judging means generates intersection information about the intersection point and temporarily stores it in a temporary storage memory 18 (in step ST350). After that, the intersecting judging means returns the sequence to step ST341. On the other hand, when, in step ST349, determining that the intersection point is a crossing with an overpass or underpass, the intersecting judging means returns the sequence to step ST341 without generating any intersection information.

As explained above, since the map information processing apparatus according to embodiment 17 of the present invention intersection information does not store any intersection information about an intersection point when determining that the intersection point is a crossing with an overpass or underpass based on an image obtained using a video camera when detecting a new road, the map information processing apparatus can prevent unnecessary temporary intersections from being generated.

Embodiment 18

A map information processing apparatus according to embodiment 18 of the present invention is so constructed as to determine whether or not there is a necessity to register a temporary intersection based on information which it can acquire when a vehicle in which the map information processing apparatus is mounted travels a toll road.

The map information processing apparatus according to this embodiment 18 has the same structure as the map information processing apparatus according to embodiment 8 shown in FIG. 27 except for the following points. In other words, the intersection inquiring means 22 is removed from the map information processing apparatus according to this embodiment 18.

Next, intersection determining processing which is carried out by an intersecting judging means 20 of the map information processing apparatus according to embodiment 18 of the present invention will be explained with reference to a flow chart shown in FIG. 51.

Figure 51:
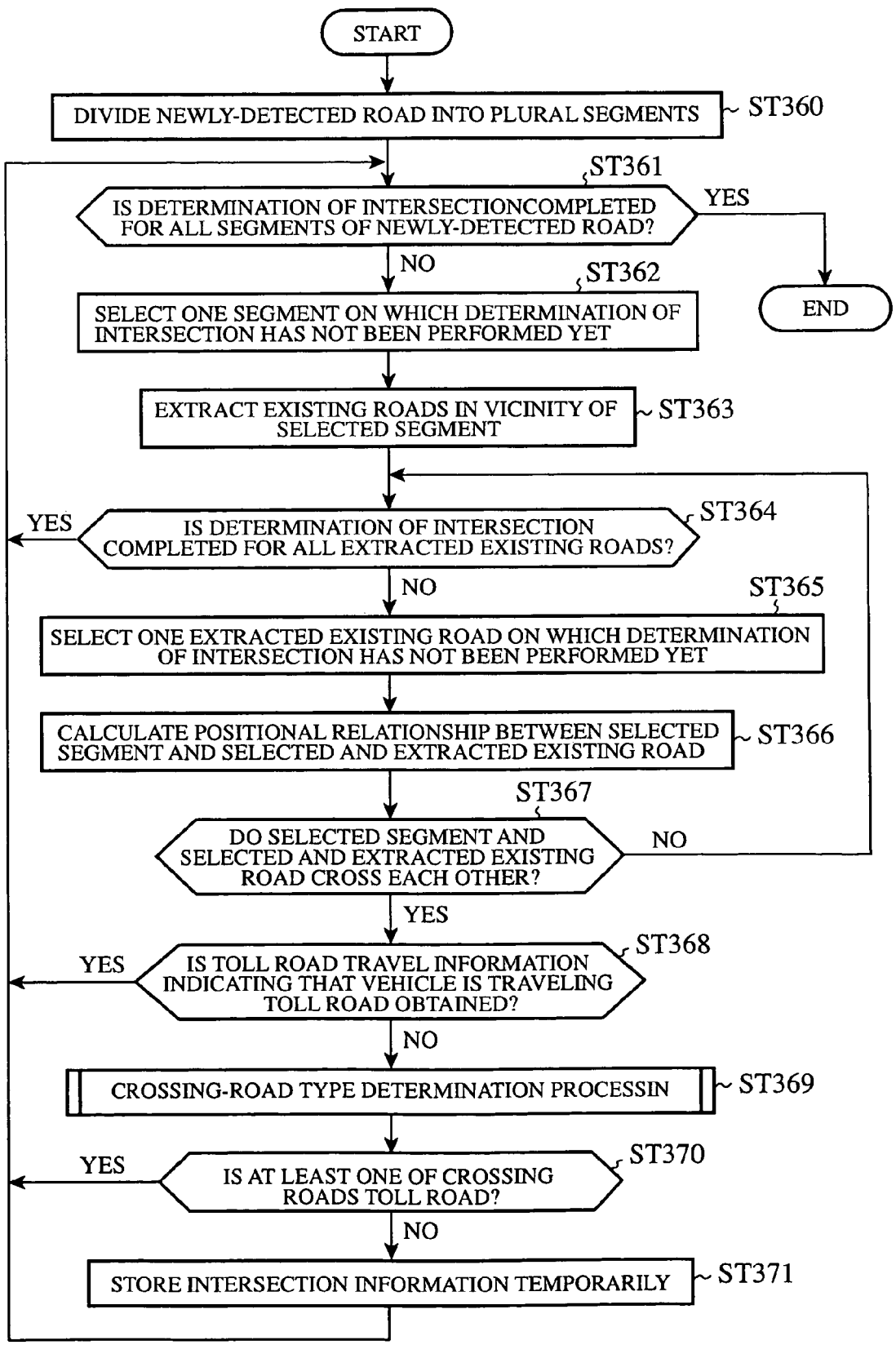
FIG. 51 is a flow chart showing intersecting judging processing which is carried out by a map information processing apparatus in accordance with embodiment 18 of the present invention.

Processes of steps ST360 to ST367 of the intersection determining processing shown in the flow chart of FIG. 51 are the same as those of steps ST40 to ST47 of the intersection determination processing carried out by the map information processing apparatus according to embodiment 1 shown in the flow chart of FIG. 5, respectively. Therefore, only the difference between FIG. 51 and FIG. 5 will be explained hereafter.

When, in step ST367, determining that a selected segment and a selected neighboring road intersect, the intersecting judging means checks to see whether it can acquire toll road travel information indicating that the vehicle is traveling a toll road from a temporary storage memory 18 (in step ST368). When the intersecting judging means determines that it can acquire the toll road travel information from the temporary storage memory 18, it recognizes that the vehicle is traveling a toll road and the intersection point in question is a crossing with an overpass or underpass, and returns the sequence to step ST361 without generating any intersection information.

When the intersecting judging means, in step ST368, determines that it cannot acquire the toll road travel information from the temporary storage memory 18, a temporary intersection road type determining means 30 carries out intersecting-road type determining processing (in step ST369). The details of this intersecting-road type determining processing is already explained in embodiment 8 with reference to the flow chart of FIG. 31. The temporary intersection road type determining means checks to see whether or not an existing road which intersects a new road at the intersection point in question is of toll road type based on the determination result in step ST369 (in step ST370).

When, in step ST370, determining that the existing road is of toll road type, the intersecting judging means recognizes that the intersection point in question is a crossing with an overpass or underpass, and returns the sequence to step ST361 without generating any intersection information. On the other hand, when, in step ST370, determining that the existing road is not of toll road type, the intersecting judging means recognizes that the intersection point in question is a grade crossing, generates intersection information about the intersection point, and temporarily stores it in the temporary storage memory 18 (in step ST371). After that, the intersecting judging means returns the sequence to step ST361.

As explained above, the map information processing apparatus according to embodiment 18 of the present invention can prevent unnecessary temporary intersections from being generated when detecting a new road.

Embodiment 19

A map information processing apparatus according to embodiment 18 of the present invention is so constructed as to determine whether or not there is a necessity to register a temporary intersection based on information indicating that a vehicle in which the map information processing apparatus is mounted has passed through an underpass.

The map information processing apparatus according to this embodiment 19 has the same structure as the map information processing apparatus according to embodiment 9 shown in FIG. 32 except for the following points. In other words, when generating a travel history from the position of the vehicle which is obtained by a positioning means 15, a new road detecting means 19 incorporates information about the amount of light applied to the vehicle at the current position, which is measured by an illuminance measurement means 31, into the travel history.

Next, intersection determining processing which is carried out by an intersecting judging means 20 of the map information processing apparatus according to embodiment 19 of the present invention will be explained with reference to flow charts shown in FIGS. 52 and 53.

Figure 52:
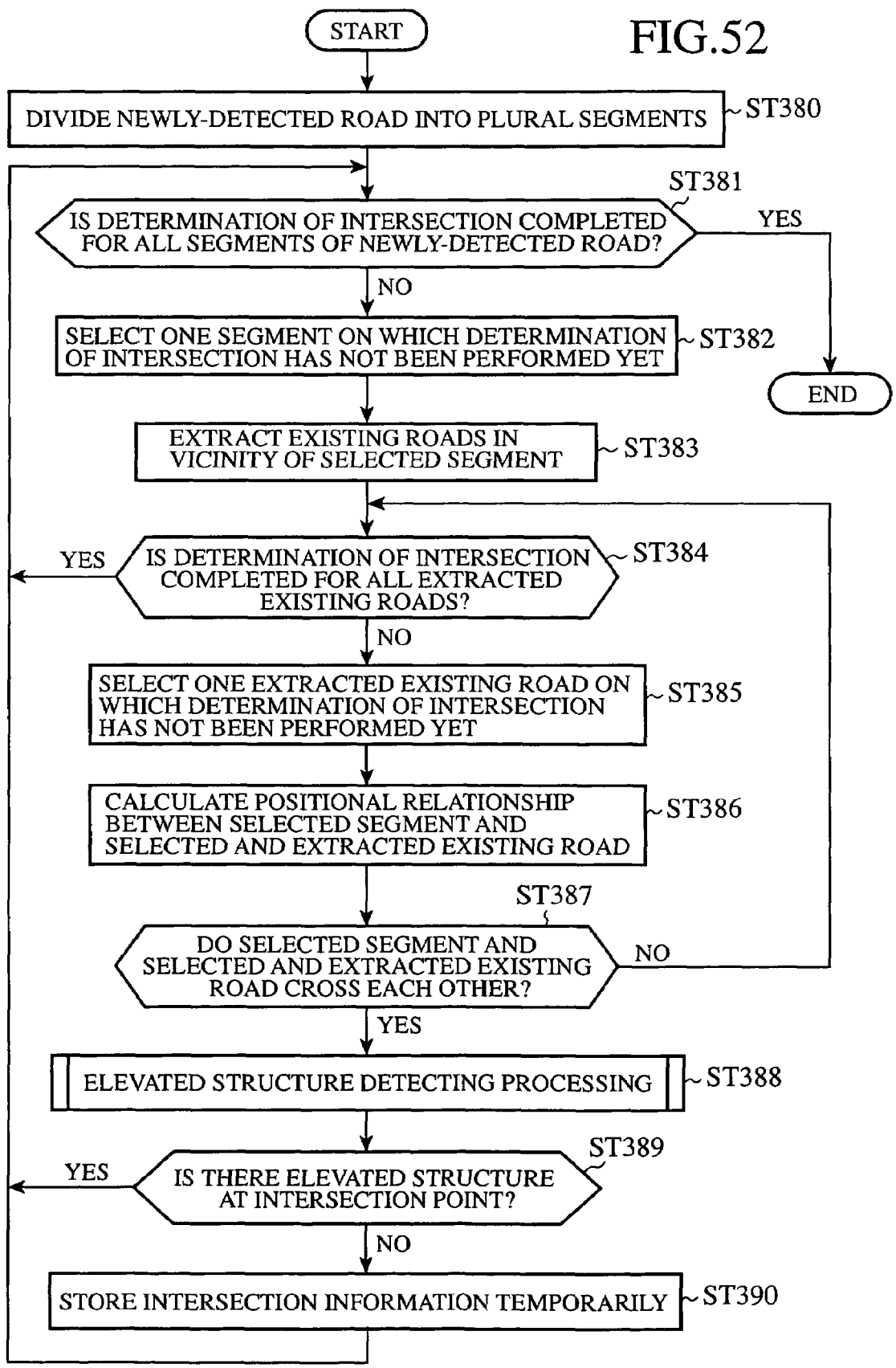
FIG. 52 is a flow chart showing intersecting judging processing which is carried out by a map information processing apparatus in accordance with embodiment 19 of the present invention.
Figure 53:
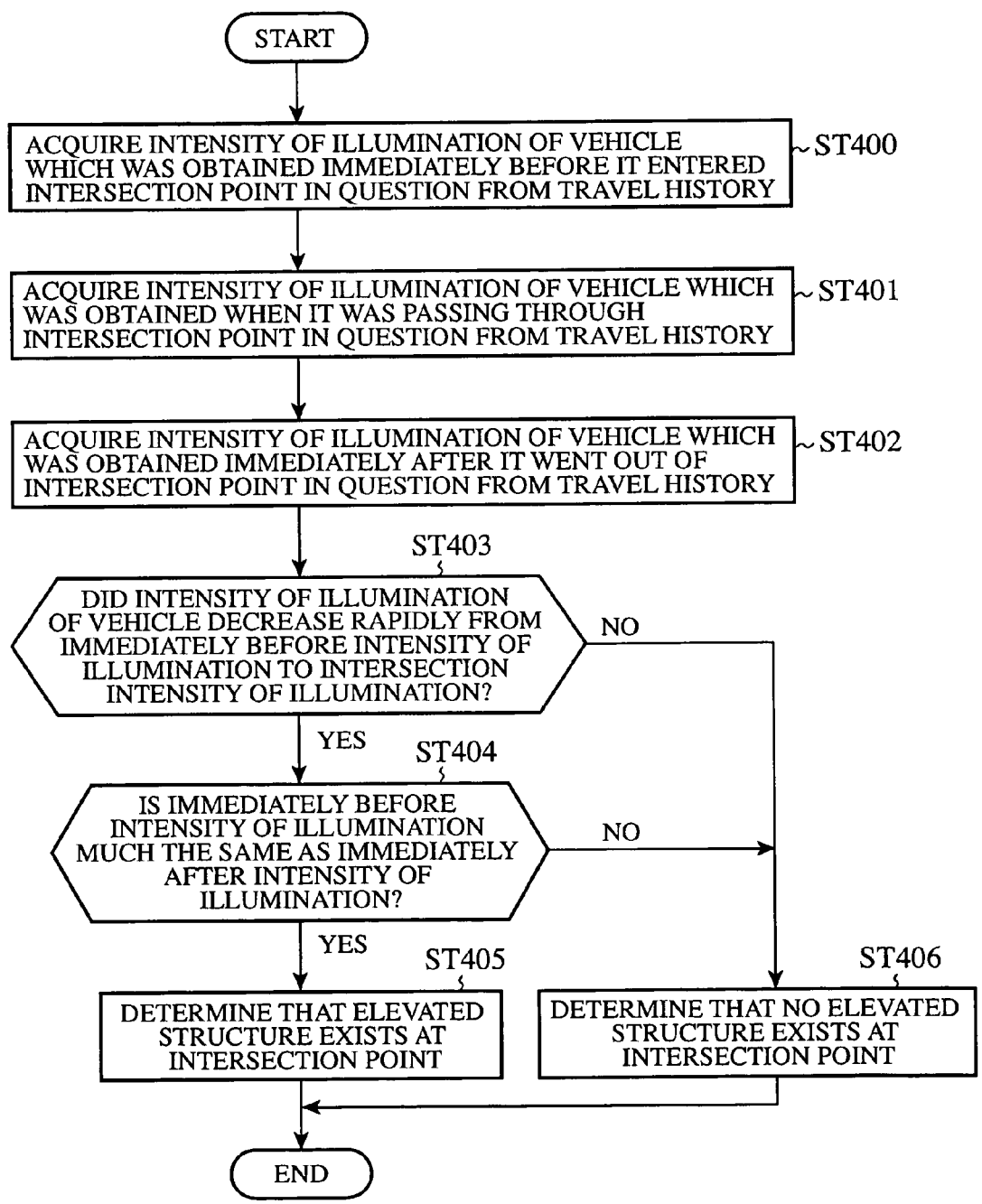
FIG. 53 is a flow chart showing the details of elevated structure detecting processing which is carried out in step ST388 of FIG. 52.

Processes of steps ST380 to ST387 of the intersection determining processing shown in the flow chart of FIG. 52 are the same as those of steps ST40 to ST47 of the intersection determining processing carried out by the map information processing apparatus according to embodiment 1 shown in the flow chart of FIG. 5, respectively. Therefore, only the difference between FIG. 52 and FIG. 5 will be explained hereafter.

When the intersecting judging means, in step ST387, determines that a selected segment and a selected neighboring road intersect, an underpass travel detecting means 32 carries out elevated structure detecting processing (in step ST388). The details of this elevated structure detecting processing will be explained below. The intersecting judging means then checks to see whether there is an elevated structure at the intersection point in question based on the result of the elevated structure detecting processing in step ST388 (in step ST389). When determining that there is an elevated structure at the intersection point, the intersecting judging means returns the sequence to step ST381. On the other hand, when, in step ST389, determining that there is no elevated structure at the intersection point, the intersecting judging means recognizes that the intersection point is a grade crossing, generates intersection information about the intersection point, and temporarily stores it in a temporary storage memory 18 (in step ST390). After that, the intersecting judging means returns the sequence to step ST381.

Next, the details of the elevated structure detecting processing which is carried out in above-mentioned step ST388 will be explained with reference to the flow chart shown in FIG. 53.

In the elevated structure detecting processing, the underpass travel detecting means acquires illuminance information which was obtained immediately before the vehicle entered the intersection point in question from the travel history (in step ST400). The underpass travel detecting means then acquires illuminance information which was obtained when the vehicle entered the intersection point in question from the travel history (in step ST401). The underpass travel detecting means further acquires illuminance information which was obtained immediately after the vehicle went out of the intersection point in question from the travel history (in step ST402). The underpass travel detecting means then checks to see whether the amount of light applied to the vehicle rapidly decreased from the immediately before illuminance which was obtained immediately before the vehicle entered the intersection point to the intersection illuminance which was obtained when the vehicle entered the intersection point (in step ST403). When determining that the amount of light applied to the vehicle did not decrease rapidly from the immediately before illuminance to the intersection illuminance, the underpass travel detecting means advances the sequence to step ST406 and determines that no elevated structure is crossing at the intersection point.

On the other hand, when, in step ST403, determining that the amount of light applied to the vehicle decreased rapidly from the immediately before illuminance to the intersection illuminance, the underpass travel detecting means further check to see whether or not the immediately after illuminance which was obtained immediately after the vehicle went out of the intersection point is much the same as the immediately before illuminance (in step ST404). When determining that the immediately after illuminance is not much the same as the immediately before illuminance, the underpass travel detecting means advances the sequence to step ST406 in which it determines that no elevated structure is crossing at the intersection point. On the other hand, when, in step ST404, determining that the immediately after illuminance is much the same as the immediately before illuminance, the underpass travel detecting means advances the sequence to step ST405 in which it determines that an elevated structure is crossing at the intersection point.

As previously explained, the map information processing apparatus according to embodiment 19 of the present invention can determine whether or not the vehicle has passed under an elevated structure based on a change in the amount of light applied to the vehicle when detecting a new road, and can therefore prevent unnecessary temporary intersections from being generated.

Embodiment 20

A map information processing apparatus according to embodiment 20 of the present invention is so constructed as to determine whether or not there is a necessity to register a temporary intersection based on whether or not it can capture signals from GPS satellites and a quasi-zenith satellite.

The map information processing apparatus according to this embodiment 20 has the same structure as the map information processing apparatus according to embodiment 10 shown in FIG. 35 except for the following points. In other words, when generating a travel history from the position of a vehicle which is obtained by a positioning means 15, a new road detecting means 19 incorporates information about capturable satellites which are detected by a capturable satellite detecting means 33 into the travel history. To be more specific, the new road detecting means incorporates ID information which specifying the satellites which can be captured by the capturable satellite detecting means at the position in question, and the directions of the satellites into the travel history.

Next, intersection determining processing which is carried out by an intersecting judging means 20 of the map information processing apparatus according to embodiment 20 of the present invention will be explained with reference to a flow chart shown in FIG. 54.

The processing carried out by the intersecting judging means 20 of the map information processing apparatus according to this embodiment 20 is the same as that of the map information processing apparatus according to embodiment 19 shown in the flow chart of FIG. 52 except for elevated structure detecting processing (in step ST388 of FIG. 52). Therefore, only the elevated structure detecting processing will be explained hereafter.

Figure 54:
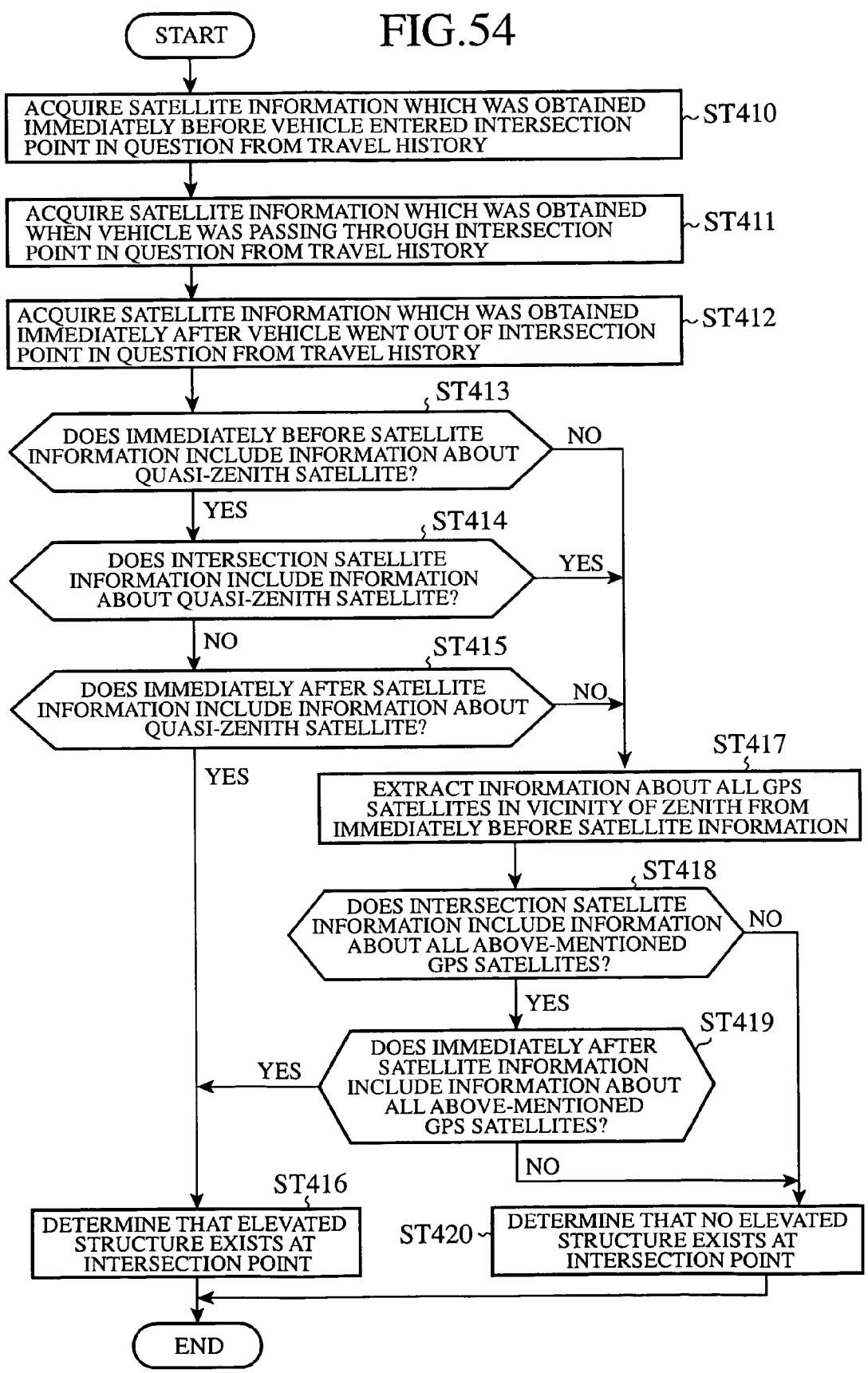
FIG. 54 is a flow chart showing intersecting judging processing which is carried out by a map information processing apparatus in accordance with embodiment 20 of the present invention.

In the elevated structure detecting processing shown in the flow chart of FIG. 54, an underpass travel detecting means acquires satellite information which was obtained immediately before the vehicle entered the intersection point in question from the travel history (in step ST410). The underpass travel detecting means then acquires satellite information which was obtained when the vehicle entered the intersection point in question from the travel history (in step ST411). The underpass travel detecting means further acquires satellite information which was obtained immediately after the vehicle went out of the intersection point in question from the travel history (in step ST412). The underpass travel detecting means then refers to the immediately before satellite information stored in the temporary storage memory 18 and checks to see whether the immediately before satellite information includes information indicating that a quasi-zenith satellite was detected (in step ST413). When, in this step ST413, determining that the immediately before satellite information includes information indicating that a quasi-zenith satellite was detected, the underpass travel detecting means further refers to the intersection satellite information stored in the temporary storage memory 18 and checks to see whether the intersection satellite information includes information indicating that the quasi-zenith satellite was detected (in step ST414).

When, in this step ST414, determining that the intersection satellite information includes no information indicating that the quasi-zenith satellite was detected, the underpass travel detecting means further refers to the immediately after satellite information stored in the temporary storage memory 18 and checks to see whether the immediately after satellite information includes information indicating that the quasi-zenith satellite was detected (in step ST415). When, in this step ST415, determining that the immediately after satellite information includes information indicating that the quasi-zenith satellite was detected, the underpass travel detecting means advances the sequence to step ST416 in which it determines that an elevated structure is crossing at the intersection point.

When, in above-mentioned step ST413, determining that the immediately before satellite information includes no information indicating that the quasi-zenith satellite was detected, when, in above-mentioned step ST414, determining that the intersection satellite information includes information indicating that the quasi-zenith satellite was detected, or when, in above-mentioned step ST415, determining that the immediately after satellite information includes no information indicating that the quasi-zenith satellite was detected, the underpass travel detecting means refers to the immediately before satellite information and extracts information about all detected GPS satellites which exist in the vicinity of the zenith (in this case, a range in the vicinity of the zenith is predetermined, for example, a range at elevation angles of 75 degrees or more is predetermined) from the immediately before satellite information (in step ST417). The underpass travel detecting means then refers to the intersection satellite information stored in the temporary storage memory 18, and checks to see whether the intersection satellite information includes information about all the GPS satellites extracted in step ST417 (in step ST418). When determining that the intersection satellite information does not include information about all the GPS satellites extracted in step ST417, the underpass travel detecting means further checks to see whether the immediately after satellite information stored in the temporary storage memory 18 includes information about all the extracted GPS satellites (in step ST419).

When, in this step ST419, determining that the immediately after satellite information includes information about all the extracted GPS satellites, the underpass travel detecting means advances the sequence to step ST416 in which it determines that an elevated structure is crossing at the intersection point. On the other hand, when, in step ST419, determining that the immediately after satellite information does not include information about all the extracted GPS satellites, the underpass travel detecting means advances the sequence to step ST420 in which it determines that no elevated structure is crossing at the intersection point.

As explained above, the map information processing apparatus according to embodiment 20 of the present invention can determine whether or not the vehicle has passed under an elevated structure based on a change in information about satellites which it can capture when detecting a new road, and can therefore prevent unnecessary temporary intersections from being generated.

Embodiment 21

A map information processing apparatus according to embodiment 21 of the present invention is so constructed as to determine whether or not there is a necessity to register a temporary intersection based on information indicating whether or not a vehicle in which the map information processing apparatus is mounted has passed through an underpass which is prestored in the map information processing apparatus.

The map information processing apparatus according to this embodiment 21 has the same structure as the map information processing apparatus according to embodiment 15 shown in FIG. 45.

Figure 55:
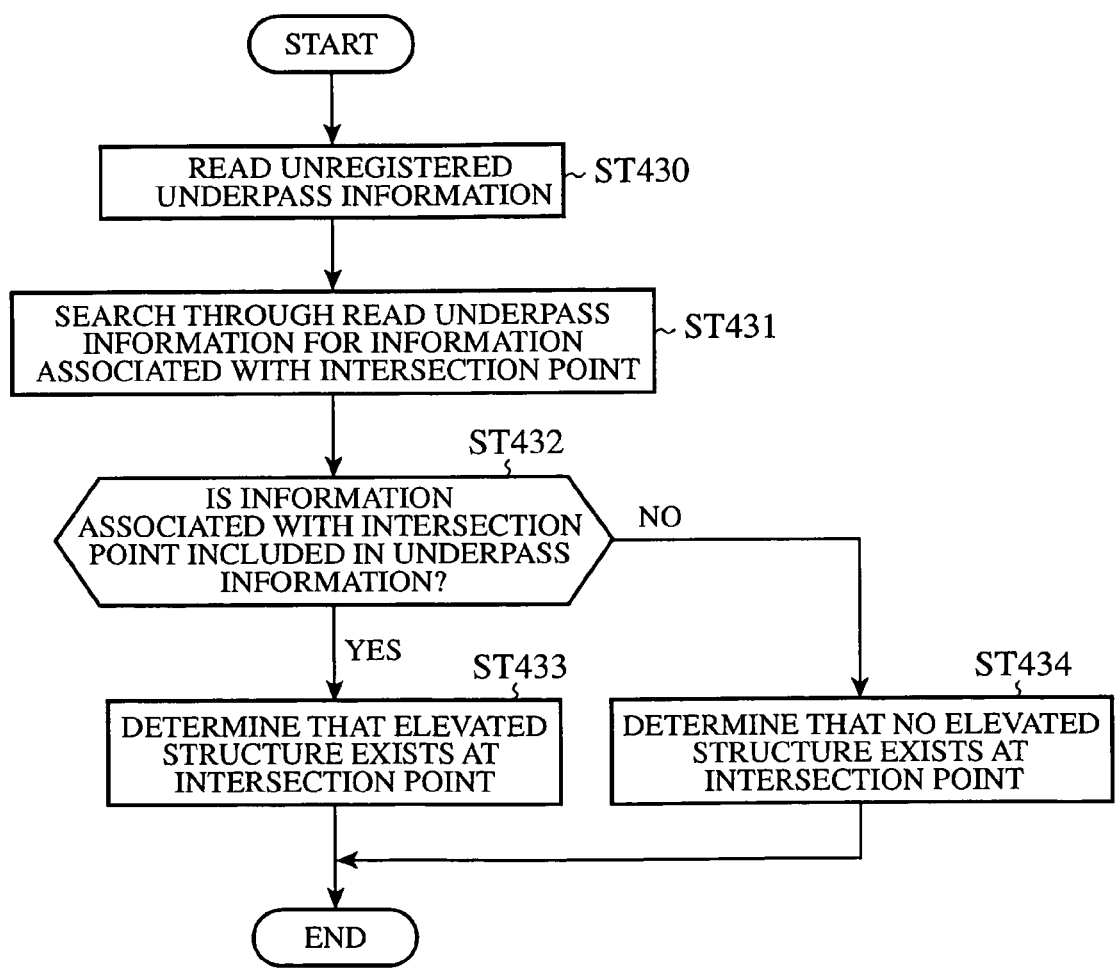
FIG. 55 is a flowchart showing the details of elevated structure detecting processing which is carried out by a map information processing apparatus in accordance with embodiment 21 of the present invention.

The operation of the map information processing apparatus according to embodiment 21 of the present invention will be explained. Intersection determining processing which is carried out by an intersecting judging means 20 of the map information processing apparatus according to this embodiment is the same as that of the map information processing apparatus according to embodiment 19 shown in the flow chart of FIG. 52 except for elevated structure detecting processing (in step ST388). Therefore, only the elevated structure detecting processing will be explained hereafter with reference to a flow chart shown in FIG. 55.

In the elevated structure detecting processing, an underpass travel detecting means reads unregistered underpass information stored in an unregistered underpass information storage means 16d of an HDD 16 first (in step ST430). The underpass travel detecting means searches through the unregistered underpass information read in step ST430 for information associated with the intersection point in question (in step ST431). The underpass travel detecting means checks to see whether corresponding information exists in the unregistered underpass information storage means (in step ST432). When determining that the corresponding information exists in the unregistered underpass information storage means, the underpass travel detecting means advances the sequence to step ST433 in which it determines that an elevated structure is crossing at the intersection point. On the other hand, when determining that the corresponding information does not exist in the unregistered underpass information storage means, the underpass travel detecting means advances the sequence to step ST434 in which it determines that no elevated structure is crossing at the intersection point.

As previously explained, since the map information processing apparatus according to embodiment 21 of the present invention can determine whether or not a new road stored in neither a map information storage means 16a nor a new road information storage means 16b is multi-level crossing an existing road at an intersection point, and can therefore prevent unnecessary temporary intersections from being generated.

Embodiment 22

A map information processing apparatus according to embodiment 22 of the present invention is so constructed as to support a case where it detects a new road which extends over two or more meshes.

Figure 56:
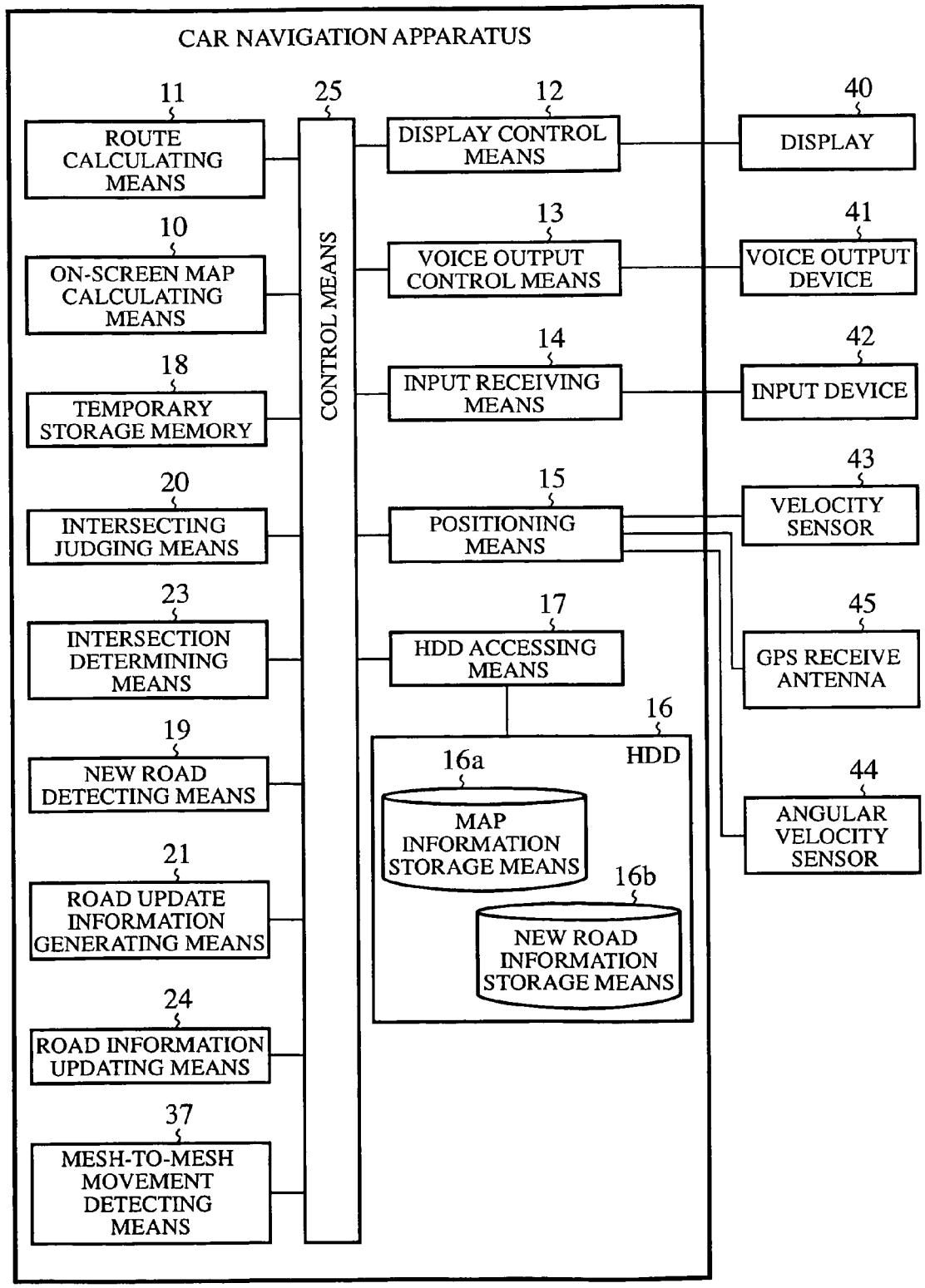
FIG. 56 is a block diagram showing the structure of a map information processing apparatus in accordance with embodiment 22 of the present invention.

FIG. 56 is a block diagram showing the structure of the map information processing apparatus according to embodiment 22 of the present invention. This map information processing apparatus includes a car navigation apparatus in which a mesh-to-mesh movement detecting means 37 is added to the components of the car navigation apparatus of the map information processing apparatus according to embodiment 1 shown in FIG. 1.

The mesh-to-mesh movement detecting means 37 corresponds to a map area movement detecting means of the present invention, grasps a mesh in which a vehicle in which the map information processing apparatus is mounted is currently being located, and determines whether the vehicle has moved to another mesh which is adjacent to the grasped mesh based on a positioning result obtained by a positioning means 15. When determining that the vehicle has moved to the adjacent mesh, the mesh-to-mesh movement detecting means also generates information for specifying the adjacent mesh.

Figure 57:
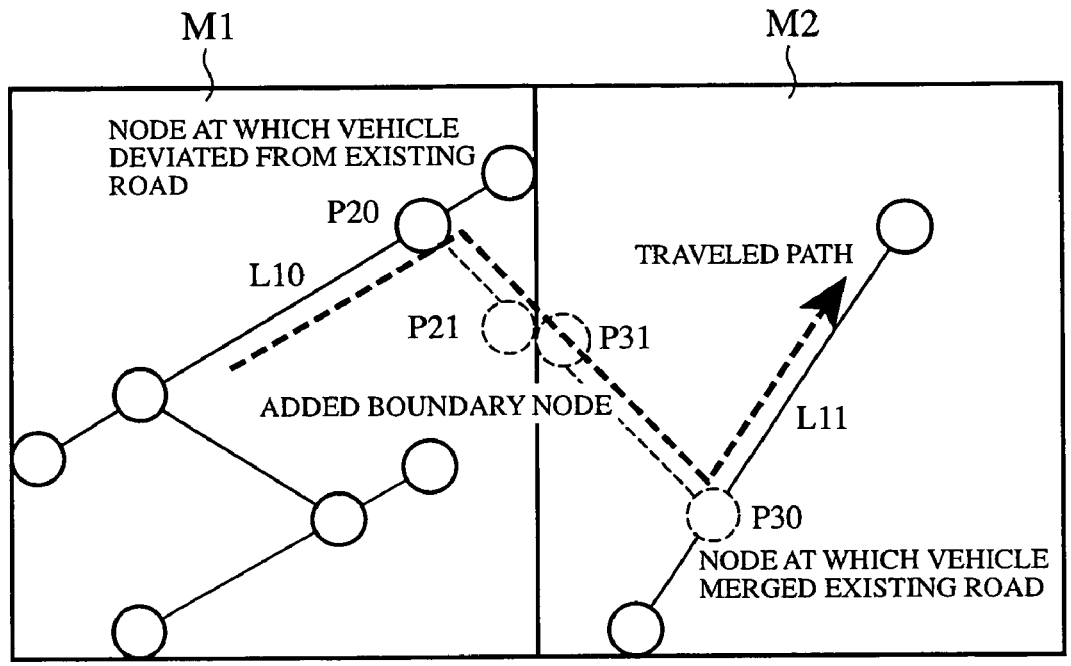
FIG. 57 is a diagram for explaining the operation of the map information processing apparatus in accordance with embodiment 22 of the present invention.

Next, the operation of the map information processing apparatus according to embodiment 22 of the present invention will be explained by taking, as an example, a case as shown in FIG. 57 in which the vehicle deviates from an existing road link L10 in a mesh M1 at a point P20, and then enters another existing road link L11 in another mesh M2 adjacent to the mesh M1 at a point P30.

In a state in which a new road detecting means 19 determines that the vehicle has deviated from the existing road link L10 at P20 and information about the fact is stored as a travel history, the mesh-to-mesh movement detecting means 37 carries out comparison between the positioning result and the area of the mesh M1. When the positioning result deviates from the area of the mesh M1 as a result of this comparison, the mesh-to-mesh movement detecting means identifies the mesh M2 to which the vehicle has moved from the direction in which the positioning result deviates from the area of the mesh M1. At this time, the mesh-to-mesh movement detecting means stops storing the position information about the current position of the vehicle in the travel history temporarily, and records a boundary endpoint P21 at which the vehicle has deviated from the area of the mesh M1 into the travel history. The mesh-to-mesh movement detecting means then defines a segment extending from the point P0 to the point P21 as a new road in the mesh M1.

Next, the mesh-to-mesh movement detecting means shifts to processing on the adjacent mesh M2, and generates a boundary endpoint P31 corresponding to the point P21 in the mesh M1. The mesh-to-mesh movement detecting means then stores information which it has obtained until it detects that the vehicle enters an existing road at the point P30 in the travel history again. When determining that the vehicle has entered an existing road at the point P30, the mesh-to-mesh movement detecting means defines a segment extending from the point P31 to the point P30 as a new road in the mesh M2.

A road update information generating means 21 generates road update information based on the travel history which has been generated by the new road detecting means 19 on a mesh-by-mesh basis. That is, the road update information generating means 21 defines the segment between the point P20 and the points P21 as one link, and also defines the segment between the point P31 and the point P30 as another link.

As previously explained, when detecting a new road which extends over two or more meshes, the map information processing apparatus according to embodiment 22 of the present invention can add a corresponding new road to each of plural pieces of map information which are separated on a mesh-by-mesh basis.

Embodiment 23

A map information processing apparatus according to embodiment 23 of the present invention is so constructed as to output (display or guidance by voice) information about a new road and information about a temporary intersection in a form different from that in which a normal road and an intersection are output.

The map information processing apparatus according to this embodiment 23 has the same structure as the map information processing apparatus according to embodiment 1 shown in FIG. 1.

Figure 58:
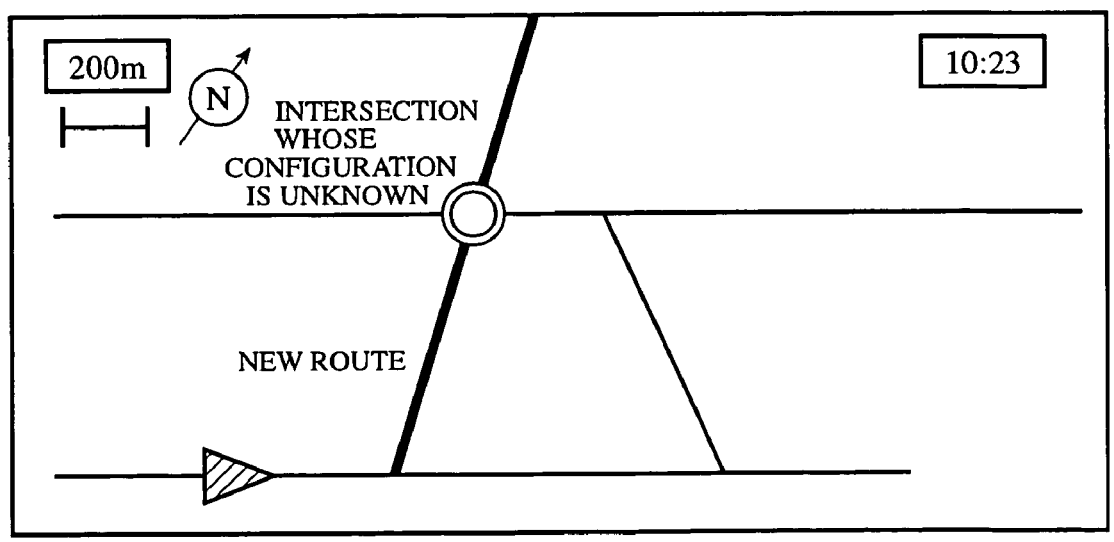
FIG. 58 is a diagram showing a screen display example on a display of a map information processing apparatus in accordance with embodiment 23 of the present invention.

FIG. 58 shows a screen display example on a display 40 of the map information processing apparatus according to this embodiment 23. When generating a map image for display from both map information and new road information, an on-screen map calculating means 10 displays roads included in the map information and new roads included in the new road information in different forms, e.g., in forms in which those roads are displayed with different line widths and/or in different colors, and new roads are designated by character strings. When a temporary intersection exists in a range of the generated map image, the on-screen map calculating means places a special mark on the position of the temporary intersection on the image to indicate that the temporary intersection exists in the map image so that the user can easily recognize that the temporary intersection differs from normal intersections.

While a vehicle in which the map information processing apparatus is mounted is traveling a road connected to a temporary intersection, when the distance from the vehicle to the temporary intersection becomes a predetermined distance, the on-screen map calculating means shows by voice that whether the temporary intersection which the vehicle is getting near is a grade crossing or a crossing with an overpass or underpass is unknown.

As previously explained, the map information processing apparatus according to embodiment 23 of the present invention can show a temporary intersection which cannot be determined to be either a normal grade crossing or a crossing with an overpass or underpass in an emphasized form. The map information processing apparatus according to embodiment can also emphasize a new road.

Embodiment 24

A map information processing apparatus according to embodiment 24 of the present invention has a function of determining whether a temporary intersection is a grade crossing or a crossing with an overpass or underpass using a change in the vertical position of a vehicle carrying the map information processing apparatus in addition to the functions of the map information processing apparatus according to embodiment 3.

Figure 59:
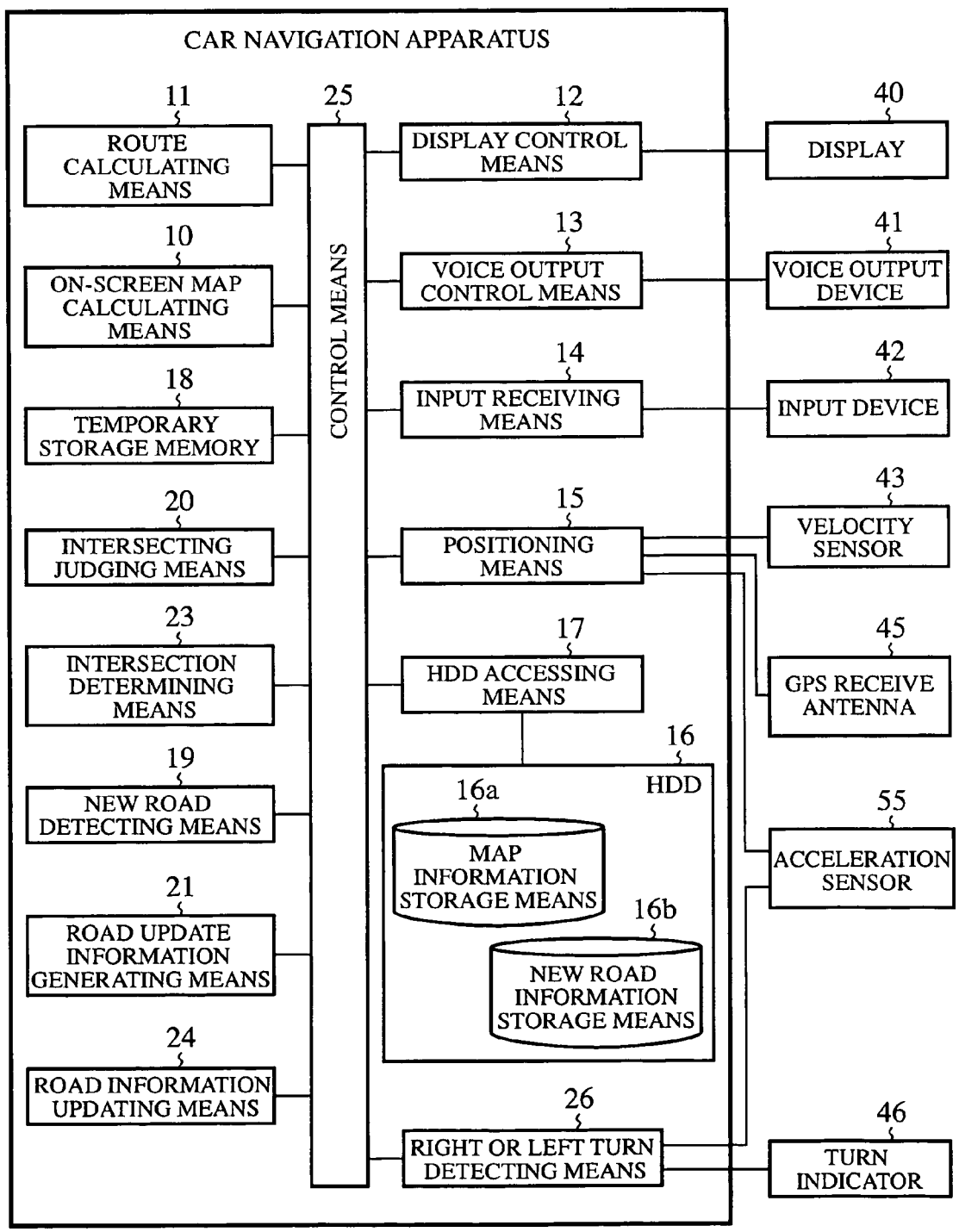
FIG. 59 is a block diagram showing the structure of a map information processing apparatus in accordance with embodiment 24 of the present invention.

FIG. 59 is a block diagram showing the structure of the map information processing apparatus according to embodiment 24. In FIG. 59, the same blocks as shown in FIG. 19 used for the explanation of embodiment 3 basically perform the same operations as those done by those of embodiment 3, respectively, with the exception that blocks shown below perform different operations.

An acceleration sensor 55 detects a three-dimensional acceleration including an acceleration in the direction of the altitude of the vehicle. The map information processing apparatus shown in FIG. 19 uses a two-dimensional angular velocity sensor instead of this block, as previously mentioned. A positioning means 15 measures the current position of the vehicle including a change in the vertical position of the vehicle using the three-dimensional acceleration of the vehicle detected by the acceleration sensor 55.

A road update information generating means 21 adds a change in the vertical position of the vehicle, as information about each coordinate point of a new road, as well as the two-dimensional coordinates of each coordinate point, to each coordinate point of the new road. For a generated temporary intersection, the road update information generating means sets an initial value of traffic regulations which disables the vehicle to travel toward all directions other than a straight forward direction. An intersection determining means 23 uses information about the change in the vertical position of the vehicle, as well as right or left turn information.

Figure 60:
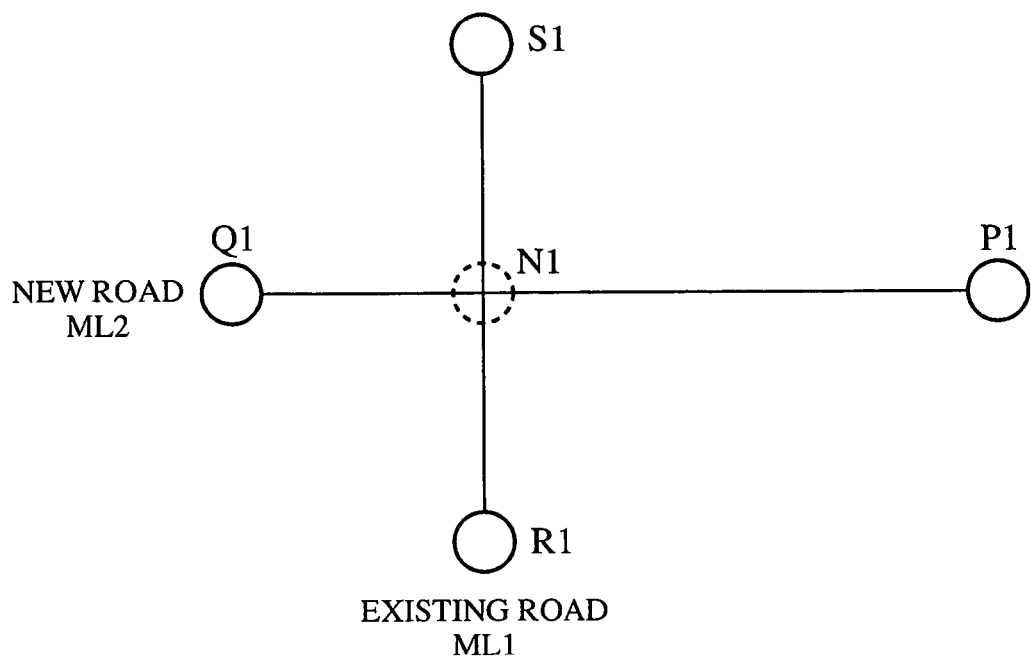
FIG. 60 is a diagram for explaining detection of a new road by the map information processing apparatus in accordance with embodiment 24 of the present invention.

FIG. 60 is a diagram for explaining detection of a new road which is carried out by the map information processing apparatus according to embodiment 24 of the present invention. When a new road detecting means 19 detects a new road ML2 which crosses an existing road ML1, as shown in FIG. 60, a road update information generating means 21 generates a temporary intersection N1 as shown in FIG. 60 and generates the new road while disabling the vehicle to make any of right and left turns at the temporary intersection, whereas enabling the vehicle to go straight forward at the temporary intersection, since the road update information generating means does not know whether the two-dimensional intersection point N1 is a grade crossing or a crossing with an overpass or underpass. At this time, the new road information can also contain a change in the vertical position of the vehicle in the direction of the altitude of the new road ML2, as "altitude change information", which occurs along a direction along which the new road has been detected (in this case, the new road has been detected along the direction from P1 to Q1). The change in the vertical position of the vehicle in the direction of the altitude of the new road is referred to as 1.

Figure 61:
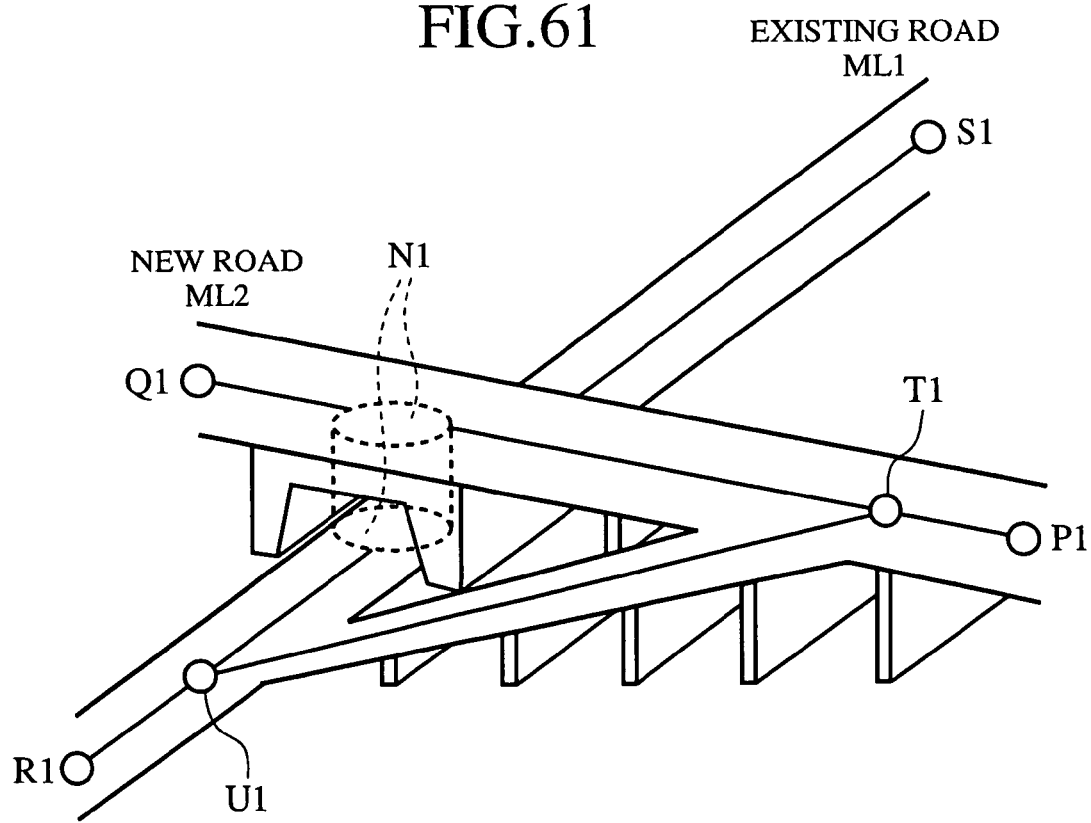
FIG. 61 is a diagram showing a crossing with an overpass or underpass (or two-level crossing) at which the new road shown in of FIG. 60 and an existing road cross each other, which is determined by the map information processing apparatus in accordance with embodiment 24 of the present invention.

FIG. 61 is a diagram showing a crossing with an overpass or underpass at which the new road and the existing road shown in FIG. 60 intersect, which is determined by the map information processing apparatus according to embodiment 24 of the present invention. Assume that the above-mentioned new road ML2 is actually crossing the existing road in two levels, as shown in FIG. 61. In addition, assume that the new road ML2 is stored in a new road information storage means 16b, as mentioned above.

Furthermore, assume that there occurs a change δ2 in the vertical position of the vehicle in the direction of the altitude of the new road when the vehicle moves toward the intersection N1 from P1 again, but deviates from the overpass of the new road ML2 to a bypass at T1, then goes down the bypass toward a T-shaped junction U1 of the existing road ML1, makes a right turn at the T-shaped junction U1, and moves toward S1. The already-stored altitude change information indicating the change in the vertical position of the vehicle which is assumed to occur immediately before the vehicle makes a right turn from the new road ML2, i.e., while the vehicle travels from P1 to the temporary intersection N1 (i.e., the change δ1 in the vertical position of the vehicle in the direction of the altitude of the new road) does not match with the currently-detected change in the vertical position of the vehicle in the direction of the altitude of the new road (i.e., the change δ2 in the vertical position of the vehicle in the direction of the altitude of the new road), which has occurred immediately before the vehicle makes a right turn at the junction as mentioned above, i.e., the vehicle travels from P1, via T1, to the T-shaped junction U1.

Figure 62:
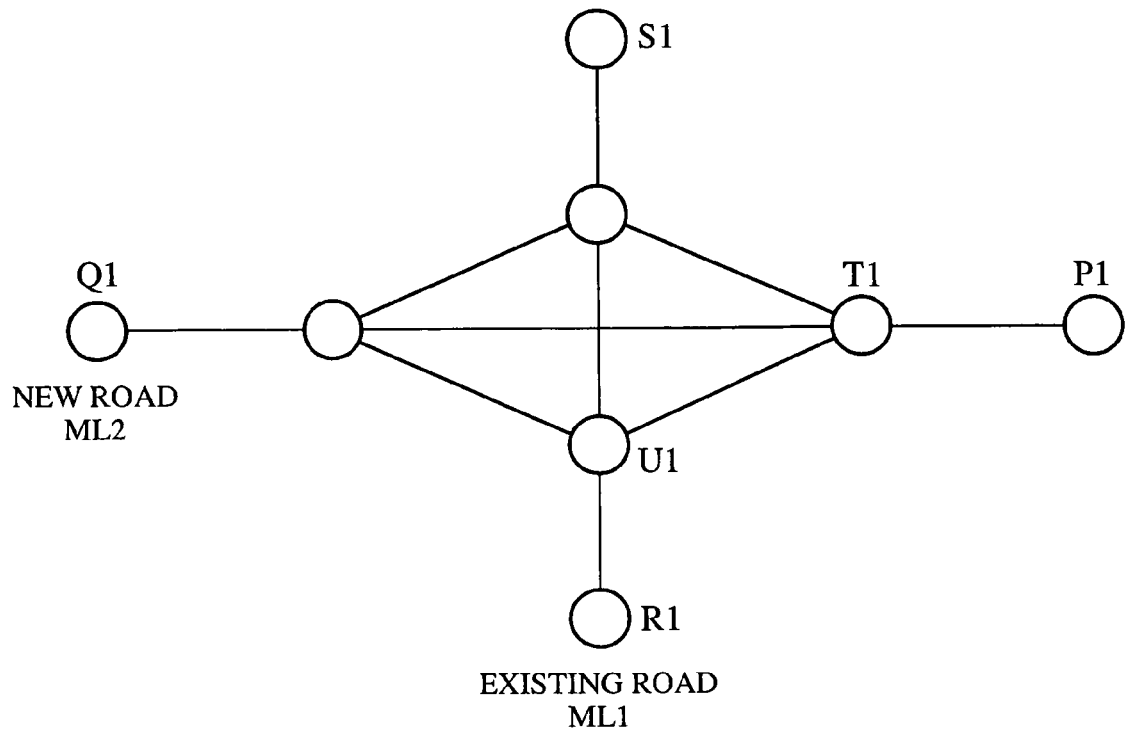
FIG. 62 is a diagram for explaining a process of determining a temporary intersection at which the new road shown in of FIG. 60 and an existing road cross each other, which is carried out by the map information processing apparatus in accordance with embodiment 24 of the present invention.

FIG. 62 is a diagram for explaining a process of determining whether or not a temporary intersection at which a new road and an existing road, as shown in FIG. 60, intersect is a crossing with an overpass or underpass, which is carried out by the map information processing apparatus according to embodiment 24 of the present invention. In the above-mentioned case, the intersection determining means 23 determines that the new road ML2 is crossing the existing road ML1 in two levels. In other words, the intersection determining means 23 determines that the temporary intersection N1 is a crossing with an overpass or underpass (two-level crossing). The intersection determining means 23 then constructs road information as shown in FIG. 62, and stores it in both a map information storage means 16a and a new road information storage means 16b of FIG. 59.

Next, a case where the temporary intersection N at which the new road ML2 and existing road ML1, which are detected as shown in FIG. 60, intersect is a normal grade crossing will be explained. When the temporary intersection N1 is a grade crossing, a change in the vertical position of the vehicle in the direction of the altitude of the new road which occurs immediately before the vehicle enters the temporary intersection N1 matches with the already-stored altitude change information regardless of whether the vehicle makes a right or left turn, or goes straight forward at the temporary intersection. Therefore, the intersection determining means 23 determines that the temporary intersection N1 is a normal grade crossing, and changes the traffic regulations for this intersection to negotiable for all directions or all combinations of the incoming road in question and outgoing roads.

Figure 63:
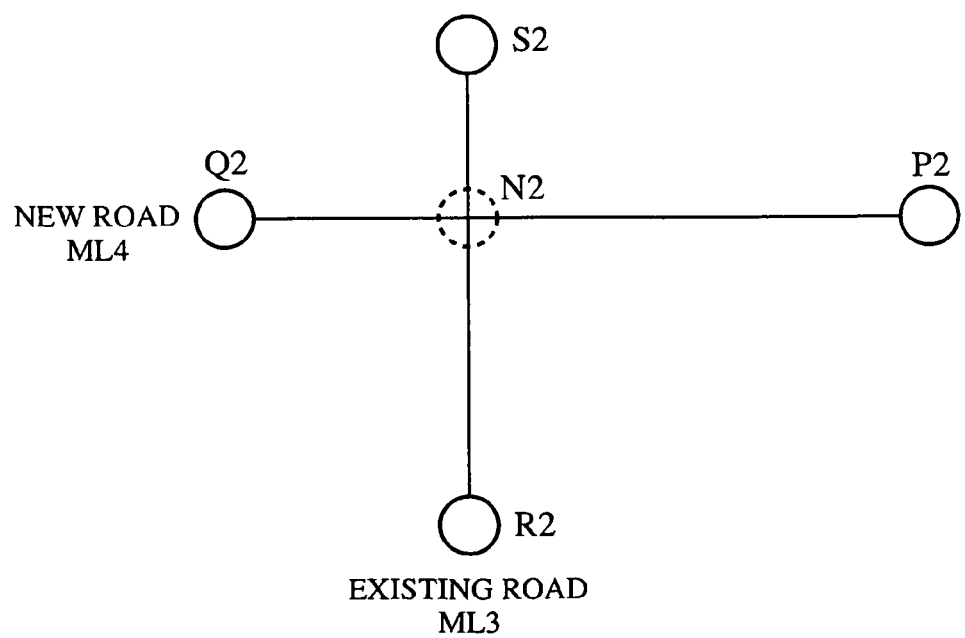
FIG. 63 is a diagram for explaining detection of a new road by the map information processing apparatus in accordance with embodiment 24 of the present invention.

FIG. 63 is a diagram for explaining detection of a new road which is carried out by the map information processing apparatus according to embodiment 24 of the present invention. When the new road detecting means 19 detects a new road ML4 which crosses an existing roadML3, as shown in FIG. 63, the road update information generating means 21 generates a temporary intersection N2 as shown in FIG. 63 and generates the new road while disabling the vehicle to make any of right and left turns at the temporary intersection, whereas enabling the vehicle to go straight forward at the temporary intersection, since the road update information generating means does not know whether the two-dimensional intersection point N2 is a grade crossing or a crossing with an overpass or underpass. At this time, the new road information can also contain a change in the vertical position of the vehicle in the direction of the altitude of the new road ML4, as "altitude change information", which occurs along a direction along which the new road has been detected (in this case, the new road has been detected along the direction from P2 to Q2). The change in the vertical position of the vehicle in the direction of the altitude of the new road is referred to as $\delta 3$.

Figure 64:
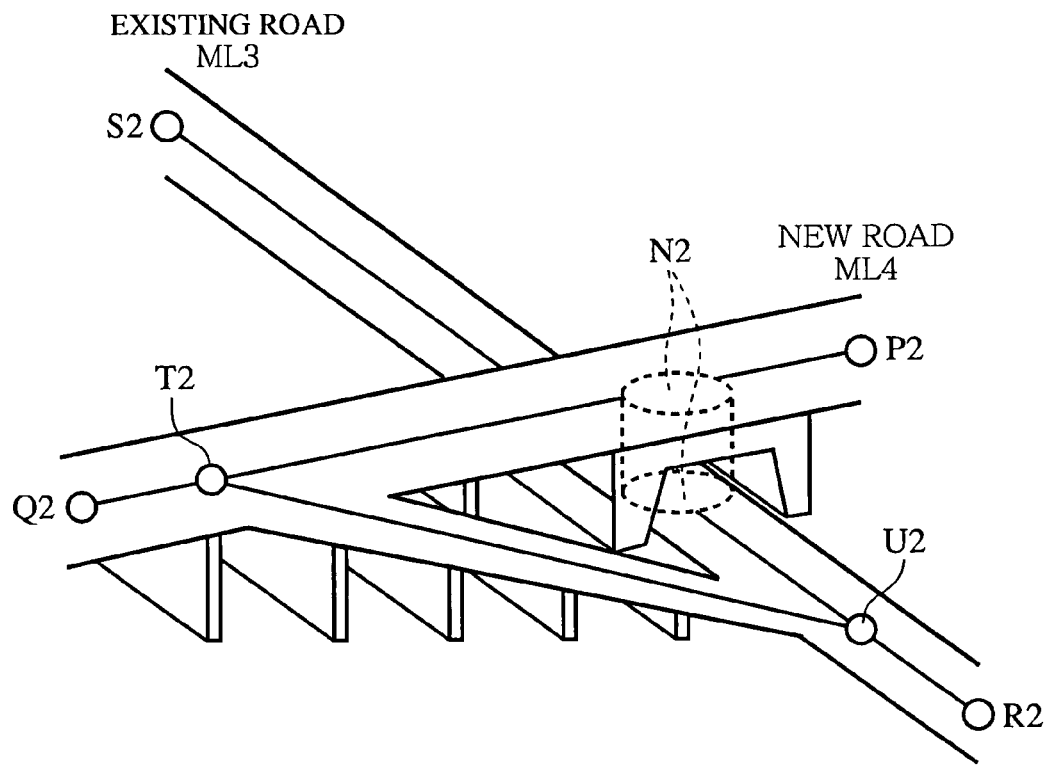
FIG. 64 is a diagram showing a crossing with an overpass or underpass at which the new road shown in of FIG. 63 and an existing road cross each other, which is determined by the map information processing apparatus in accordance with embodiment 24 of the present invention.

FIG. 64 is a diagram showing a crossing with an overpass or underpass at which the new road and the existing road shown in FIG. 63 intersect, which is determined by the map information processing apparatus according to embodiment 24 of the present invention. Assume that the above-mentioned new road ML4 is actually crossing the existing road in two levels, as shown in FIG. 64. In addition, assume that the new road ML4 is stored in the new road information storage means 16b, as mentioned above.

Furthermore, assume that there occurs a change $\delta 4$ in the movement of the vehicle in the direction of the altitude of the new road when the vehicle moves toward this temporary intersection N2 from R2, makes a left turn from the existing road ML3 at a T-shaped junction U2 to deviate from the existing road toward a bypass, goes upward along the bypass, enters the new road ML4 at T2, and then moves toward Q2. The already-stored altitude change information showing a change which may occur when the vehicle travels from the temporary intersection N2 to Q2 along the new road ML4 (i.e., the change $\delta 3$ in the movement of the vehicle in the direction of the altitude of the new road) does not match with the currently-detected change $\delta 4$ in the movement of the vehicle in the direction of the altitude of the new road, which occurs immediately after the vehicle has made a left turn, i.e., the vehicle has traveled from the T-shaped junction U2, via T2, to Q2.

Figure 65:
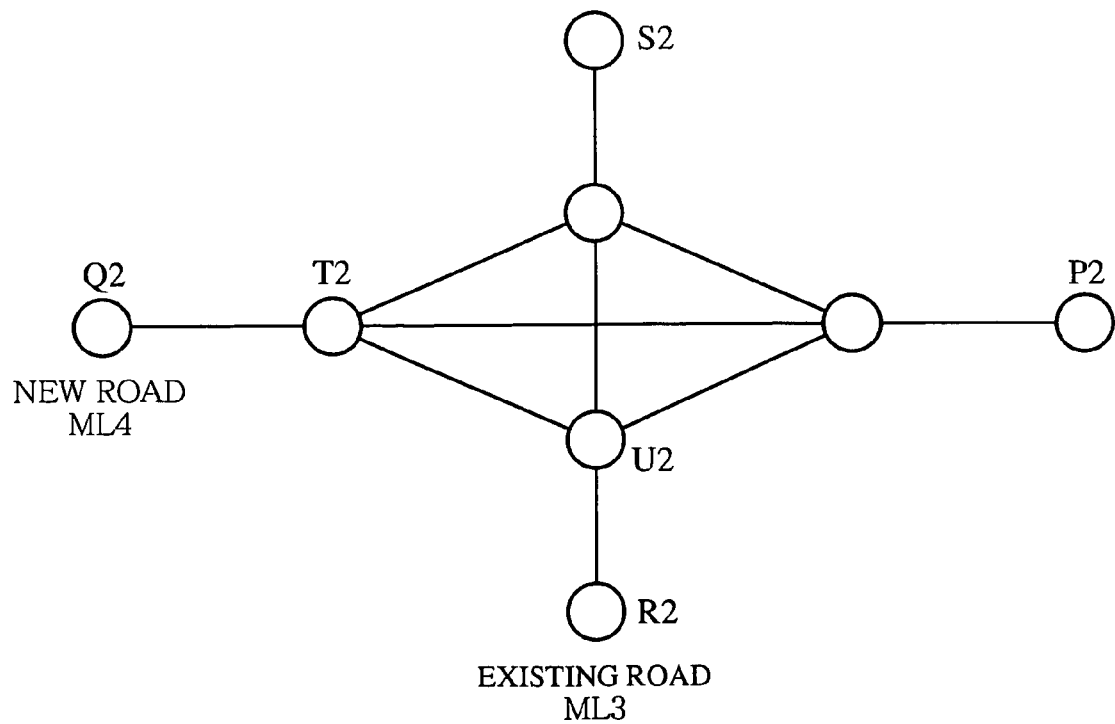
FIG. 65 is a diagram for explaining a process of determining a temporary intersection at which the new road shown in of FIG. 63 and an existing road cross each other, which is carried out by the map information processing apparatus in accordance with embodiment 24 of the present invention.

FIG. 65 is a diagram for explaining a process of determining whether or not a temporary intersection at which a new road and an existing road, as shown in FIG. 63, cross each other is a crossing with an overpass or underpass in the map information processing apparatus according to embodiment 24 of the present invention. In the above-mentioned case, the intersection determining means 23 determines that the new road ML4 crosses the existing road ML3 in two levels. In other words, the intersection determining means 23 determines that the temporary intersection N2 is a crossing with an overpass or underpass. The intersection determining means 23 then constructs road information as shown in FIG. 65, and stores it in both the map information storage means 16a and new road information storage means 16b of FIG. 59.

When the temporary intersection N2 is a grade crossing, a change in the movement of the vehicle in the direction of the altitude of the new road which occurs immediately before the vehicle enters the temporary intersection N2 matches with the already-stored altitude change information regardless of whether the vehicle makes a right or left turn, or goes straight forward at the temporary intersection. Therefore, the intersection determining means 23 determines that the temporary intersection N2 is a grade crossing, and changes the traffic regulations for this intersection to negotiable for all directions or all combinations of the incoming road in question and outgoing roads.

Figure 66:
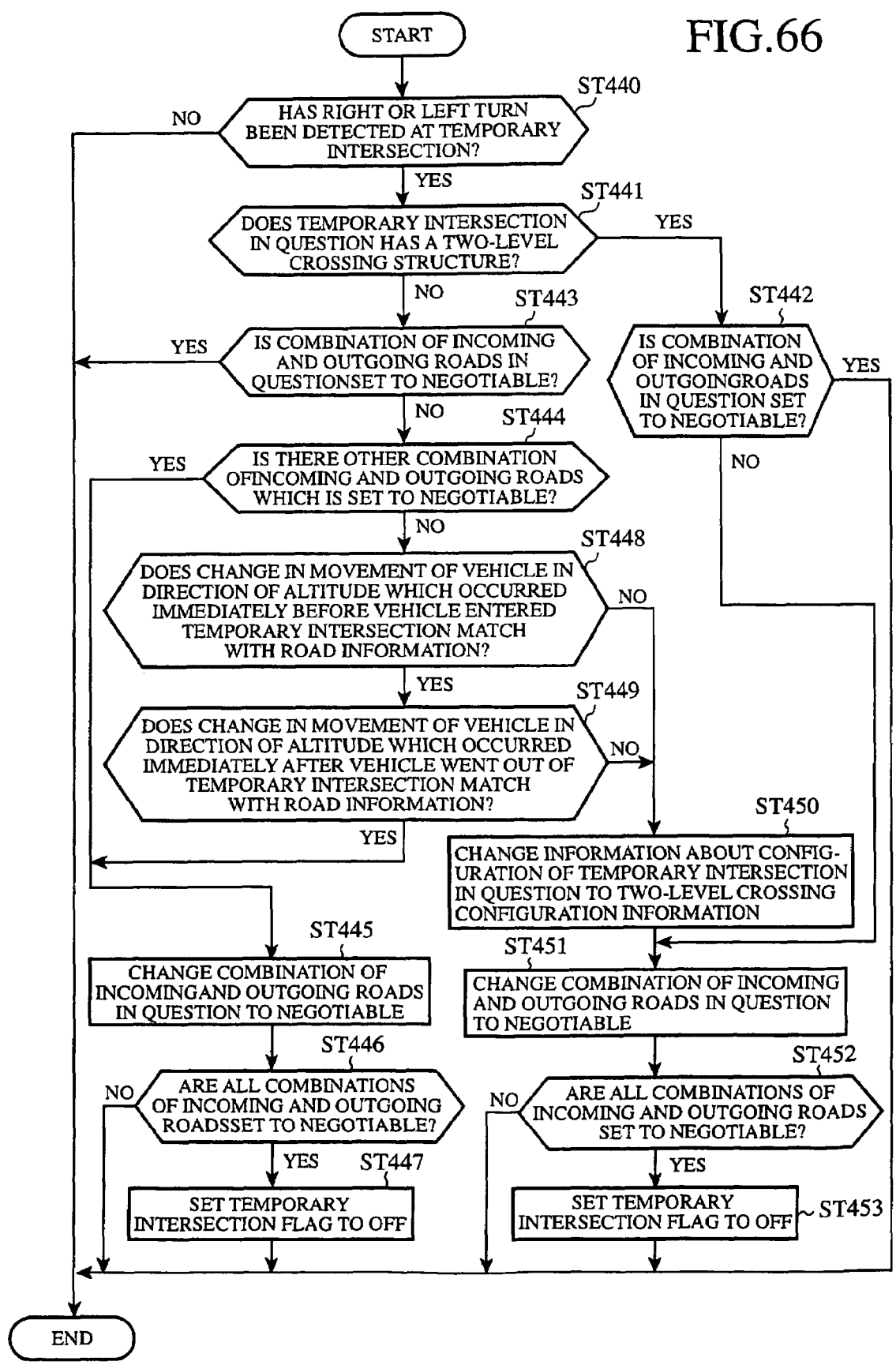
FIG. 66 is a flow chart showing a process of setting the configuration of a temporary intersection which is carried out by the map information processing apparatus in accordance with embodiment 24 of the present invention.

Next, a process of setting the configuration of a temporary intersection which is carried out by the intersection determining means 23 of the map information processing apparatus according to embodiment 24 of the present invention will be explained with reference to a flow chart shown in FIG. 66. "Combinations of incoming and outgoing roads" in FIG. 66 means "traffic regulations on outgoing roads via which the vehicle entering the temporary intersection via the incoming road can go out of the temporary intersection."

First, when a right or left turn detecting means 26, in step ST440, detects a right or left turn at the temporary intersection, the intersection determining means advances to step ST441. On the other hand, when the right or left turn detecting means 26 does not detect a right or left turn, the intersection determining means ends the processing. In step ST441, the intersection determining means refers to a two-level crossing attribute of the temporary intersection in question, and, when the temporary intersection in question has a two-level crossing structure, advances to step ST442, and advances to step ST443 otherwise. When generating the temporary intersection, the intersection determining means sets the two-level crossing attribute to "grade crossing." When setting the two-level crossing attribute to grade crossing, the intersection determining means carries out the same processing as shown in step ST92 (embodiment 3) of FIG. 20. The intersection determining means, in step ST442, refers to traffic regulations information on the traffic regulations on the temporary intersection in question, and defines, as TL1, a road via which the vehicle entered the temporary intersection in question after making a right or left turn, and also defines, as TL2, a road via which the vehicle has gone out of the temporary intersection in question. When traffic regulations on a route in which the vehicle enters the temporary intersection in question from TL1, and goes out of the temporary intersection in question via TL2 are set to negotiable, the intersection determining means ends the processing. Otherwise, the intersection determining means advances to step ST451. A process of step ST451 will be mentioned below.

When, in step ST443, determining that the traffic regulations on the route in which the vehicle enters the temporary intersection in question from TL1, and goes out of the temporary intersection in question via TL2 are set to negotiable, the intersection determining means ends the processing. Otherwise, the intersection determining means advances to step ST444. When, in step ST444, determining that there are other traffic regulations on another route passing through the temporary intersection in question, which are determined to be negotiable, other than the traffic regulations on the route in which the vehicle enters the temporary intersection in question from TL1, and goes out of the temporary intersection in question via TL2, the intersection determining means advances to step ST445. Otherwise, the intersection determining means advances to step ST448. A process of step ST448 will be mentioned below.

The intersection determining means then, in step ST445, changes the traffic-regulations information about the traffic regulations on the other route which are determined to be negotiable in step ST444 to "negotiable", as the traffic regulations on routes passing through the intersection in question, and advances to step ST446. When, in step ST446, determining that traffic regulations on all routes passing through the temporary intersection in question are set to negotiable, the intersection determining means advances to step ST447. Otherwise, the intersection determining means ends the processing. The intersection determining means then, in step ST447, sets an temporary intersection flag for the temporary intersection to OFF, and ends the processing.

Next, the process of above-mentioned step ST448 will be explained. When, in step ST448, determining that a history of the change in the movement of the vehicle in the direction of the altitude of the vehicle which occurs immediately before the vehicle enters the temporary intersection (in step ST440) matches with the pattern of the change in the movement of the vehicle in the direction of the altitude of the vehicle which occurs when the vehicle travels along the incoming road extending to the temporary intersection (i.e., altitude change information), the intersection determining means advances to step ST449. Otherwise, the intersection determining means advances to step ST450 (refer to FIGS. 60 to 62). In performing step ST448, the intersection determining means refers to either the map information storage means 16*a* or new road information storage means 16*b* of FIG. 59 to retrieve the altitude change information about the incoming road extending to the temporary intersection.

When, in step ST449, determining that a history of the change in the movement of the vehicle in the direction of the altitude of the vehicle which occurs immediately after the vehicle goes out of the temporary intersection (in step ST440) matches with the pattern of the change in the movement of the vehicle in the direction of the altitude of the vehicle which occurs when the vehicle travels along an outgoing road extending from the temporary intersection (i.e., altitude change information), the intersection determining means advances to step ST445. Otherwise, the intersection determining means advances to step ST450 (refer to FIGS. 63 to 65). Processes of steps ST445 to 447 are carried out as mentioned above. In performing step ST449, the intersection determining means refers to either the map information storage means 16*a* or new road information storage means 16*b* of FIG. 59 to retrieve the altitude change information about the outgoing road extending from the temporary intersection.

The intersection determining means then, in step ST450, changes information indicating the configuration of the temporary intersection in question to information indicating a two-level crossing, that is, changes the two-level crossing attribute of the temporary intersection to "two-level crossing", and advances to step ST451. The intersection determining means, in step ST451, changes the traffic regulations (in step ST440) on the route in which the vehicle enters the temporary intersection in question from TL1, and goes out of the temporary intersection in question via TL2 to "negotiable", and constructs road information and stores it in both the map information storage means 16*a* and new road information storage means 16*b*. The intersection determining means then advances to step ST452. When, in step ST452, determining that traffic regulations on all routes passing through the temporary intersection in question are set to negotiable, the intersection determining means advances to step ST453. Otherwise, the intersection determining means ends the processing. The intersection determining means then, in step ST453, sets an temporary intersection flag for the temporary intersection to OFF, and ends the processing.

Even when ML1 is a new road and ML2 is an existing road in the example of FIG. 61, the map information processing apparatus in accordance with embodiment 24 can provide the same advantages. In addition, even when ML3 is a new road and ML4 is an existing road in the example of FIG. 64, the map information processing apparatus in accordance with embodiment 24 can provide the same advantages.

As explained above, the map information processing apparatus according to embodiment 24 of the present invention can determine whether a temporary intersection is a grade crossing or a crossing with an overpass or underpass with a higher degree of accuracy (so that the user can recognize the actual configuration of the temporary intersection). As a result, since the map information processing apparatus does not provide the user with information about any temporary intersection whose configuration: whether it is a grade crossing or a crossing with an overpass or underpass is not clear, the map information processing apparatus can prevent itself from providing the user with a route guidance which urges the user to make a right or left turn at an intersection point of an existing road and a new road which is actually a crossing with an overpass or underpass.

INDUSTRIAL APPLICABILITY

As mentioned above, the map information processing apparatus in accordance with the present invention can be applied to navigation apparatus which can be mounted in vehicles in order to assist drivers.

The invention claimed is:

1. A map information processing apparatus comprising:
a position detecting means for detecting a position of the map information processing apparatus itself;
a map information storage means for storing map information including road information;
a map information acquiring means for acquiring the map information from said map information storage means;
a new road detecting means for determining whether or not a road corresponding to the position of the map information processing apparatus detected by said position detecting means is a new road which does not exist in the road information included in the map information acquired by said map information acquiring means;
a new road information storage means for storing new road information;
an intersecting judging means for identifying intersection points where the new road detected by said new road detecting means intersects either roads included in the map information acquired by said map information acquiring means or roads previously detected by said new road detecting means, other than start and end points of the new road;
a road update information generating means for generating new road information indicating the new road detected by said new road detecting means, and for generating road update information including information for updating said new road information stored in said new road information storage means and the road information included in the map information stored in said map information storage means; and
a road information updating means for updating the road information included in the map information stored in said map information storage means, and road information included in the new road information stored in said new road information storage means based on the road update information generated by said road update information generating means, and for writing the new road information into said new road information storage means.

2. The map information processing apparatus according to claim 1, characterized in that said road update information generating means generates the road update information by defining the intersection points identified by said intersecting judging means as temporary intersections each of which is not determined to be either a grade crossing or a crossing with an overpass or underpass.

3. The map information processing apparatus according to claim 2, characterized in comprising an intersection determining means for determining whether each of temporary intersections included in the road information included in the map information stored in said map information storage means and those included in the new road information stored in said new road information storage means is a grade crossing or a crossing with an overpass or underpass.

4. The map information processing apparatus according to claim 3, characterized in that said map information processing apparatus comprises an intersection inquiring means for inquiring whether a temporary intersection is a grade crossing or a crossing with an overpass or underpass, and said intersection determining means determines that said temporary intersection is a grade crossing or a crossing with an overpass or underpass according to a response to the inquiry from said intersection inquiring means.

5. The map information processing apparatus according to claim 4, characterized in that said map information processing apparatus comprises a route calculating means for calculating a recommended route between two points, and, when the recommended route calculated by said route calculating means includes a temporary intersection and causes said map information processing apparatus to make a right or left turn at said temporary intersection, said intersection inquiring means inquires whether said temporary intersection is a grade crossing or a crossing with an overpass or underpass.

6. The map information processing apparatus according to claim 4, characterized in that the intersection inquiring means inquires whether the temporary intersection is a grade crossing or a crossing with an overpass or underpass when said map information processing apparatus stops its operation.

7. The map information processing apparatus according to claim 4, characterized in that the intersection inquiring means inquires whether the temporary intersection is a grade crossing or a crossing with an overpass or underpass when said map information processing apparatus starts operating.

8. The map information processing apparatus according to claim 3, characterized in that said map information processing apparatus comprises a right or left turn detecting means for detecting whether said map information processing apparatus itself has made a right or left turn at a temporary intersection, and the intersection determining means determines that the temporary intersection is a grade crossing when the right or left turn detecting means detects that said map information processing apparatus has made a right or left turn at the temporary intersection.

9. The map information processing apparatus according to claim 8, characterized in that the road update information generating means generates new road information including an amount of vertical movement of said map information processing apparatus at a time when traveling the new road, the position detecting means detects the position of said map information processing apparatus, the position including an amount of vertical movement of said map information processing apparatus, and the intersection determining means determines whether the temporary intersection is a grade crossing or a crossing with an overpass or underpass from both a history of change in the position of said map information processing apparatus detected by said position detecting means, the position including an amount of vertical movement of said map information processing apparatus, and information about change in an altitude of the new road which intersects an existing road at the temporary intersection when the right or left turn detecting means detects that said map information processing apparatus has made a right or left turn at the temporary intersection.

10. The map information processing apparatus according to claim 8, characterized in that said map information processing apparatus has a turn indicator for informing a third party of a right-hand or left-hand direction toward which said map information processing apparatus is going to make a turn, and the right or left turn detecting means detects that said map information processing apparatus has made a right or left turn based on information from said turn indicator.

11. The map information processing apparatus according to claim 9, characterized in that said map information processing apparatus has a turn indicator for informing a third party of a right-hand or left-hand direction toward which said map information processing apparatus is going to make a turn, and the right or left turn detecting means detects that said map information processing apparatus has made a right or left turn based on information from said turn indicator.

12. The map information processing apparatus according to claim 3, characterized in that the map information storage means stores the map information including the road information in which altitude information is included, the position detecting means detects a three-dimensional position of said map information processing apparatus, the three-dimensional position including altitude information, the road update information generating means generates the road update information including the altitude information detected by said position detecting means as the road update information about the temporary intersection, and the intersection determining means determines that the temporary intersection is a grade crossing when a difference at the temporary intersection between altitude information about the new road detected by the new road detecting means and altitude information about a road indicated by the road information included in the map information stored in the map information storage means falls within a predetermined range, and determines that the temporary intersection is a crossing with an overpass or underpass otherwise.

13. The map information processing apparatus according to claim 12, characterized in that the new road information storage means stores the new road information including altitude information, and the intersection determining means determines that the temporary intersection is a grade crossing when a difference at the temporary intersection between altitude information about the new road detected by the new road detecting means and altitude information about a road indicated by the road information included in the map information stored in the map information storage means falls within a predetermined range, and determines that the temporary intersection is a crossing with an overpass or underpass otherwise.

14. The map information processing apparatus according to claim 1, characterized in that the map information storage means stores the map information including the road information in which altitude information is included, the position detecting means detects a three-dimensional position of said map information processing apparatus, the three-dimensional position including altitude information, the road update information generating means generates the road update information including the altitude information detected by said position detecting means as the road update information about the temporary intersection, and, even when detecting an intersection where the new road detected by said new road detecting means intersects either a road indicated by the road information included in the map information acquired by said map information acquiring means or a road previously detected by said new road detecting means, the intersection determining means assumes that the detected intersection has not been detected if a difference at the intersection between altitude information about the new road and altitude information about the road which intersects the new road does not fall within a predetermined range.

15. The map information processing apparatus according to claim 3, characterized in that said map information processing apparatus comprises a velocity detecting means for detecting a velocity of said map information processing apparatus, and a travel-history-information storage means for storing travel history information including a history of both the position of said map information processing apparatus detected by the position detecting means and the velocity of said map information processing apparatus which is detected by said velocity detecting means when the position of said map information processing apparatus is detected, and the intersection determining means retrieves travel information about travel of said map information processing apparatus when it enters a temporary intersection from said travel history information stored in said travel-history-information storage means, and determines that said temporary intersection is a grade crossing when the retrieved travel information indicates that said map information processing apparatus was held at a velocity of zero within a predetermined area extending from the temporary intersection for a predetermined time period.

16. The map information processing apparatus according to claim 3, characterized in that the intersection determining means determines that a temporary intersection is a grade crossing when detecting that said map information processing apparatus has moved from a new road stored in the new road information storage means to a road indicated by the road information included in the map information stored in the map information storage means at the temporary intersection, based on the position of said map information processing apparatus detected by the position detecting means.

17. The map information processing apparatus according to claim 3, characterized in that the intersection determining means determines that a temporary intersection is a grade crossing when detecting that said map information processing apparatus has moved from a road indicated by the road information included in the map information stored in the map information storage means at the temporary intersection to a new road stored in the new road information storage means, based on the position of said map information processing apparatus detected by the position detecting means.

18. The map information processing apparatus according to claim 16, characterized in that the intersection determining means determines that a temporary intersection is a grade crossing when detecting that said map information processing apparatus has moved from a road indicated by the road information included in the map information stored in the map information storage means at the temporary intersection to a new road stored in the new road information storage means, based on the position of said map information processing apparatus detected by the position detecting means.

19. The map information processing apparatus according to claim 3, characterized in that the intersection determining means determines that a temporary intersection is a grade crossing when detecting that said map information processing apparatus has moved from a new road stored in the new road information storage means to another new road stored in the new road information storage means at the temporary intersection, based on the position of said map information processing apparatus detected by the position detecting means.

20. The map information processing apparatus according to claim 16, characterized in that the intersection determining means determines that a temporary intersection is a grade crossing when detecting that said map information processing apparatus has moved from a new road stored in the new road information storage means to another new road stored in the new road information storage means at the temporary intersection, based on the position of said map information processing apparatus detected by the position detecting means.

21. The map information processing apparatus according to claim 17, characterized in that the intersection determining means determines that a temporary intersection is a grade crossing when detecting that said map information processing apparatus has moved from a new road stored in the new road information storage means to another new road stored in the new road information storage means at the temporary intersection, based on the position of said map information processing apparatus detected by the position detecting means.

22. The map information processing apparatus according to claim 3, characterized in that said map information processing apparatus comprises an image capturing device for capturing an image of surroundings of said map information processing apparatus, and an image signal processing means for processing an image signal indicating the image captured by said image capturing device, and the intersection determining means determines whether a temporary intersection is a grade crossing or a crossing with an overpass or underpass from the image signal processed by said image signal processing means.

23. The map information processing apparatus according to claim 1, characterized in that said map information processing apparatus comprises an image capturing device for capturing an image of surroundings of said map information processing apparatus, and, even when detecting an intersection point where a new road detected by said new road detecting means intersects either a road indicated by the road information included in the map information acquired by said map information acquiring means or a road previously detected by said new road detecting means, the intersection determining means assumes that the detected intersection point has not been detected if determining that the intersection point is a crossing with an overpass or underpass from the image captured by said image capturing device.

24. The map information processing apparatus according to claim 3, characterized in that said map information processing apparatus has a toll road travel determining means for determining whether or not said map information acquiring means is traveling a toll road, and, if said toll road run determining means determines that said map information acquiring means is traveling a toll road when said map information acquiring means arrives at a temporary intersection, the intersection determining means determines that said temporary intersection is a crossing with an overpass or underpass.

25. The map information processing apparatus according to claim 1, characterized in that said map information processing apparatus has a toll road travel determining means for determining whether or not said map information acquiring means is traveling a toll road, and, even when detecting an intersection point where a new road detected by said new road detecting means intersects either a road indicated by the road information included in the map information acquired by said map information acquiring means or a road previously detected by said new road detecting means, the intersection determining means assumes that the detected intersection point has not been detected if said toll road travel determining means determines that said map information acquiring means is traveling a toll road.

26. The map information processing apparatus according to claim 3, characterized in that said map information processing apparatus has a temporary intersection road type determining means for determining a type of a road which intersects at a temporary intersection, and, when said temporary intersection road type determining means determines that at least one of roads which intersect at a temporary intersection included in a new road stored in the new road information storage means is a highway, the intersection determining means determines that the temporary intersection is a crossing with an overpass or underpass.

27. The map information processing apparatus according to claim 1, characterized in that said map information processing apparatus has a temporary intersection road type determining means for determining a type of a road which intersects at a temporary intersection, and, even when detecting an intersection point where a new road detected by said new road detecting means intersects either a road indicated by the road information included in the map information acquired by said map information acquiring means or a road previously detected by said new road detecting means, the intersection determining means assumes that the detected intersection point has not been detected if said temporary intersection road type determining means determines that the road which intersects the new road at the intersection point is a highway.

28. The map information processing apparatus according to claim 3, characterized in that said map information processing apparatus has an underpass travel detecting means for detecting an elevated structure under which a road which said map information processing apparatus is traveling is located, and, when said underpass travel detecting means detects an elevated structure when said map information processing apparatus is passing through a temporary intersection, the intersection determining means determines that said temporary intersection is a crossing with an overpass or underpass.

29. The map information processing apparatus according to claim 1, characterized in that said map information processing apparatus has an underpass travel detecting means for detecting an elevated structure under which a road which said map information processing apparatus is traveling is located, and, even when detecting an intersection point where a new road detected by said new road detecting means intersects either a road indicated by the road information included in the map information acquired by said map information acquiring means or a road previously detected by said new road detecting means, the intersection determining means assumes that the detected intersection point has not been detected when said underpass travel detecting means detects an elevated structure.

30. The map information processing apparatus according to claim 28, characterized in that said map information processing apparatus has an illuminance measurement means for measuring an amount of light applied to said map information processing apparatus, and the underpass travel detecting means detects an elevated structure by detecting a change in the amount of light measured by said illuminance measurement means.

31. The map information processing apparatus according to claim 29, characterized in that said map information processing apparatus has an illuminance measurement means for measuring an amount of light applied to said map information processing apparatus, and the underpass travel detecting means detects an elevated structure by detecting a change in the amount of light measured by said illuminance measurement means.

32. The map information processing apparatus according to claim 28, characterized in that said map information processing apparatus has a capturable satellite detecting means for detecting satellites from which said map information processing apparatus can capture signals, and the underpass travel detecting means detects an elevated structure by detecting a change in information about satellites in a direction of zenith which are detected by said capturable satellite detecting means.

33. The map information processing apparatus according to claim 29, characterized in that said map information processing apparatus comprises a capturable satellite detecting means for detecting satellites from which said map information processing apparatus can capture signals, and the underpass travel detecting means detects an elevated structure by detecting a change in information about satellites in a direction of zenith which are detected by said capturable satellite detecting means.

34. The map information processing apparatus according to claim 3, characterized in that said map information processing apparatus has a receiving means for receiving information indicating whether a temporary intersection is a grade crossing or a crossing with an overpass or underpass from outside said map information processing apparatus, and the intersection determining means determines whether a temporary intersection included in the new road information stored in the new road information storage means is a grade crossing or a crossing with an overpass or underpass based on the information received by said receiving means.

35. The map information processing apparatus according to claim 3, characterized in that said map information processing apparatus comprises: an underpass travel detecting means for, while said map information processing apparatus is traveling either a road indicated by the road information included in the map information stored in the map information storage means, or a road indicated by the new road information stored in the new road information storage means, detecting whether an elevated structure is crossing above the road which said map information processing apparatus is traveling; an unregistered underpass travel determining means for, when the elevated structure detected by said underpass travel detecting means matches with neither any structure contained in the map information stored in said map information storage means nor any road indicated by the new road information stored in said new road information storage means, determining that the road which said map information processing apparatus is traveling is an underpass which is located under the unregistered elevated structure, and for generating unregistered underpass information including position information on a position of a point under the unregistered elevated structure; and an unregistered underpass information storage means for storing the unregistered underpass information generated by said unregistered underpass travel determining means, and characterized in that when the unregistered underpass information corresponding to the temporary intersection is stored in said unregistered underpass information storage means, the intersection determining means determines that the temporary intersection is a crossing with an overpass or underpass.

36. The map information processing apparatus according to claim 1, characterized in that said map information processing apparatus comprises: an underpass travel detecting means for, while said map information processing apparatus is traveling either a road indicated by the road information included in the map information stored in the map information storage means, or a road indicated by the new road information stored in the new road information storage means, detecting whether an elevated structure is crossing above the road which said map information processing apparatus is traveling; an unregistered underpass travel determining means for, when the elevated structure detected by said underpass travel detecting means matches with neither any structure contained in the map information stored in said map information storage means nor any road indicated by the new road information stored in said new road information storage means, determining that the road which said map information processing apparatus is traveling is an underpass which is located under the unregistered elevated structure, and for generating unregistered underpass information including position information on a position of a point under the unregistered elevated structure; and an unregistered underpass information storage means for storing the unregistered underpass information generated by said unregistered underpass travel determining means, and characterized in that even when detecting an intersection point where a new road detected by said new road detecting means intersects either a road indicated by the road information included in the map information acquired by said map information acquiring means or a road previously detected by said new road detecting means, the intersection determining means assumes that the detected intersection point has not been detected when corresponding unregistered underpass information is stored in said unregistered underpass information storage means.

37. The map information processing apparatus according to claim 1, characterized in that said map information processing apparatus comprises a map area movement detecting means for detecting whether or not said map information processing apparatus is moving from a map area to another map area, and the map information storage means stores the map information which is divided into plural pieces of map information about a plurality of map areas, when said map area movement detecting means detects that said map information processing apparatus is moving from a map area to another map area, the new road detecting means records a current position of said map information processing apparatus, as a map area boundary point, into a travel history, and the road update information generating means divides the new road detected by said new road detecting means into two parts at said map area boundary point to generate road update information for each of the map areas.

38. The map information processing apparatus according to claim 1, characterized in that said map information processing apparatus comprises an output means for outputting the map information stored in the map information storage means and the new road information stored in the new road information storage means, and, when outputting either the road information included in the map information stored in said map information storage means or the new road information stored in said new road information storage means, said output means shows a temporary intersection included in either said road information or said new road information in a form different from that in which a grade crossing or a crossing with an overpass or underpass is shown.

39. The map information processing apparatus according to claim 1, characterized in that said map information processing apparatus comprises an output means for outputting the map information stored in the map information storage means and the new road information stored in the new road information storage means, and said output means outputs the new road information stored in said new road information storage means in a form different from that in which the road information included in the map information stored in said map information storage means is output.

40. The map information processing apparatus according to claim 38, characterized in that said output means outputs the new road information stored in said new road information storage means in a form different from that in which the road information included in the map information stored in said map information storage means is output.

* * * * *